(12) United States Patent
Hofbauer et al.

(10) Patent No.: US 8,763,583 B2
(45) Date of Patent: Jul. 1, 2014

(54) OPPOSED-PISTON, OPPOSED-CYLINDER ENGINE WITH COLLINEAR CYLINDERS

(75) Inventors: Peter Hofbauer, West Bloomfield, MI (US); Adrian Tusinean, Windsor (CA)

(73) Assignee: EcoMotors, Inc., Allen Park, MI (US)

( * ) Notice: Subject to any disclaimer, the term of this patent is extended or adjusted under 35 U.S.C. 154(b) by 319 days.

(21) Appl. No.: 13/368,390

(22) Filed: Feb. 8, 2012

(65) Prior Publication Data

US 2012/0204841 A1    Aug. 16, 2012

Related U.S. Application Data

(60) Provisional application No. 61/441,915, filed on Feb. 11, 2011, provisional application No. 61/471,236, filed on Apr. 4, 2011, provisional application No. 61/478,736, filed on Apr. 25, 2011, provisional application No. 61/549,678, filed on Oct. 20, 2011.

(51) Int. Cl.
*F02B 75/32* (2006.01)
*F16C 7/00* (2006.01)
*F02B 75/18* (2006.01)
*F02B 75/22* (2006.01)

(52) U.S. Cl.
USPC ..... 123/197.3; 123/52.1; 123/52.2; 123/52.3; 123/52.5; 123/53.3; 123/53.4; 123/53.5; 123/53.6; 123/55.2; 123/55.4; 123/55.6; 123/55.7; 123/58.1; 123/197.4

(58) Field of Classification Search
CPC .............. F16C 7/00; F16C 7/023; F16C 7/06; F16C 9/02; F16C 19/04
USPC ........... 123/52.1–52.3, 52.5, 53.3–53.6, 55.2, 123/55.4–55.7, 58.1, 197.3, 197.4; 74/579 R, 593

See application file for complete search history.

(56) References Cited

U.S. PATENT DOCUMENTS

| | | | | |
|---|---|---|---|---|
| 655,775 | A | * | 8/1900 | Gollings .......................... 91/181 |
| 1,285,106 | A | * | 11/1918 | Fregoso ..................... 123/51 BB |
| 1,286,852 | A | | 12/1918 | Watson |
| 1,322,824 | A | | 11/1919 | Royce |
| 2,815,682 | A | * | 12/1957 | Kolbe et al. ..................... 74/603 |
| 3,241,896 | A | | 3/1966 | Pinkerton |
| 5,630,340 | A | * | 5/1997 | Iikura .......................... 74/579 E |
| 5,785,029 | A | * | 7/1998 | Fischer ...................... 123/197.3 |
| 6,427,657 | B1 | * | 8/2002 | Egleston ..................... 123/192.2 |
| 7,469,664 | B2 | * | 12/2008 | Hofbauer et al. ............. 123/54.1 |
| 8,499,726 | B2 | * | 8/2013 | Cox .......................... 123/51 BC |
| 2004/0123817 | A1 | * | 7/2004 | Kiriljuk ........................ 123/44 R |
| 2004/0159177 | A1 | * | 8/2004 | Rummel ..................... 74/579 R |
| 2004/0177824 | A1 | * | 9/2004 | Decuir ....................... 123/192.2 |
| 2006/0278182 | A1 | * | 12/2006 | Fountain ....................... 123/55.2 |
| 2008/0282838 | A1 | * | 11/2008 | Weaver ....................... 74/579 E |
| 2008/0314688 | A1 | * | 12/2008 | Lemke et al. .................. 184/6.8 |

(Continued)

*Primary Examiner* — Lindsay Low
*Assistant Examiner* — Tea Holbrook
(74) *Attorney, Agent, or Firm* — Diana D. Brehob

(57) ABSTRACT

An opposed-piston, opposed-cylinder OPOC engine is disclosed in which the central axis of the two cylinders is collinear. In four-stroke engines, this is possible with a built up crankshaft. Disclosed are connecting rod configurations that are suitable for a two-stroke engine that can be assembled to a unitary crankshaft, including both pullrods in tension and pushrods in compression. The configuration includes pistons arranged symmetrically, but with offset timing of the intake and exhaust pistons. The offset timing leads to a slight imbalance which can be partially overcome by having the center of gravity of the crankshaft offset from the axis of rotation.

18 Claims, 35 Drawing Sheets

(56) References Cited

U.S. PATENT DOCUMENTS

| | | | |
|---|---|---|---|
| 2011/0030650 A1* | 2/2011 | Wilkins | 123/197.3 |
| 2011/0030651 A1* | 2/2011 | Dalke | 123/197.4 |
| 2011/0226220 A1* | 9/2011 | Wilkins | 123/48 B |
| 2012/0247419 A1* | 10/2012 | Hofbauer et al. | 123/197.3 |

* cited by examiner

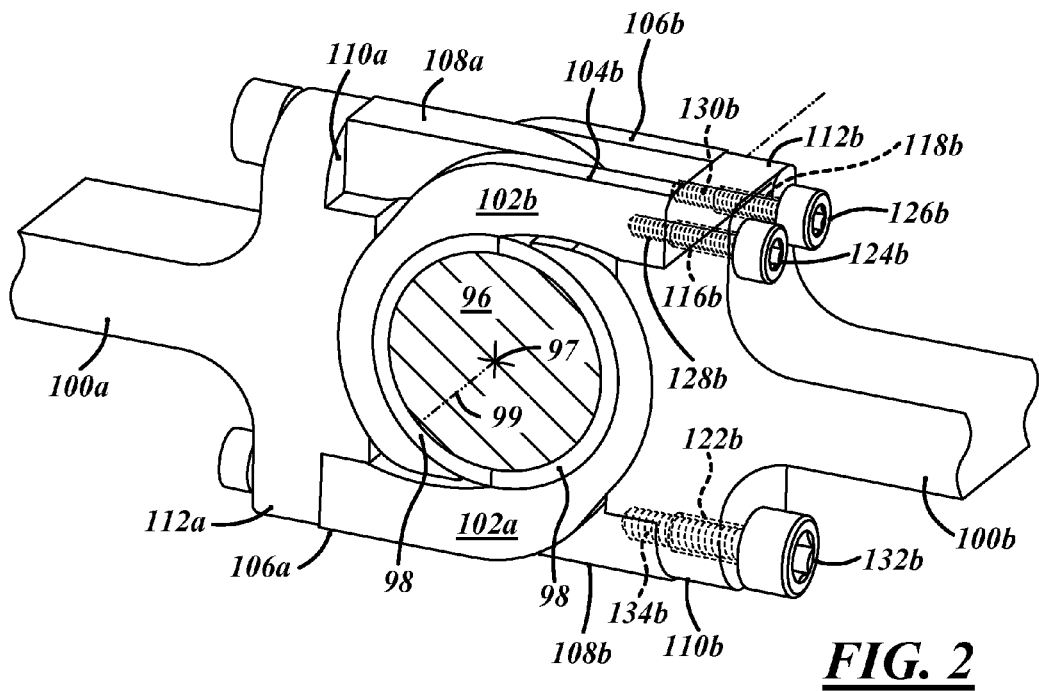
FIG. 2
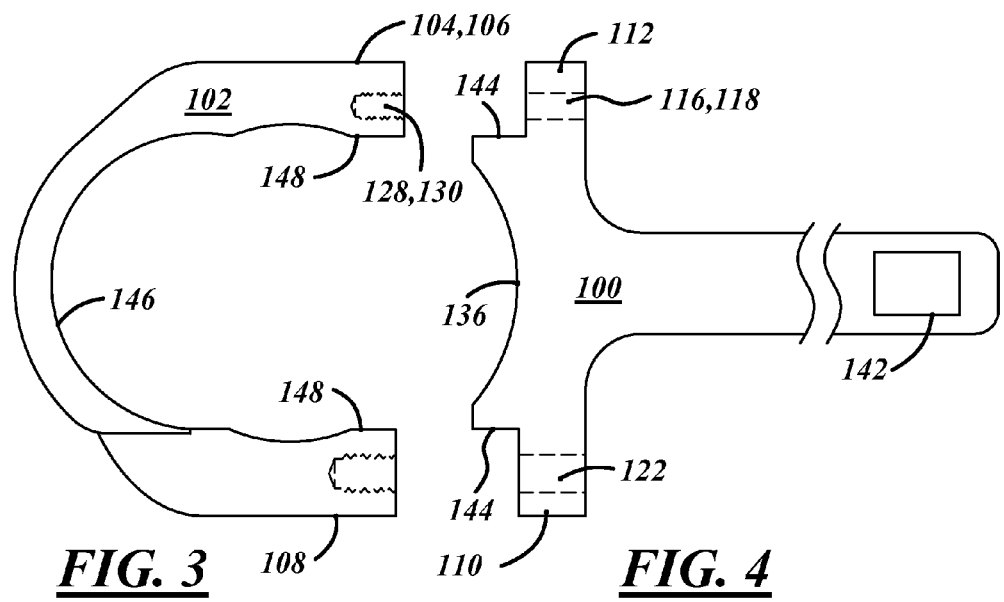
FIG. 3  FIG. 4

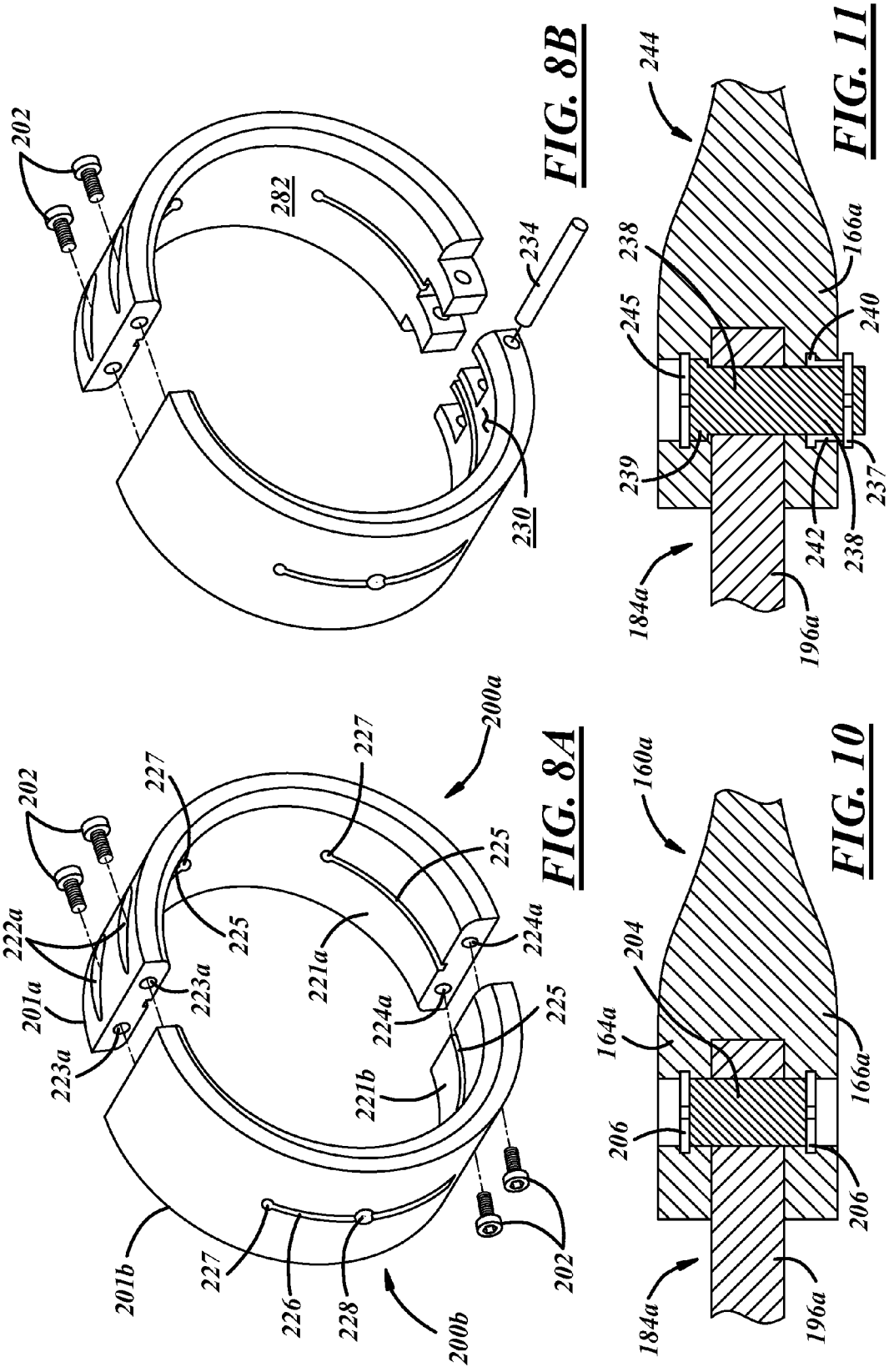

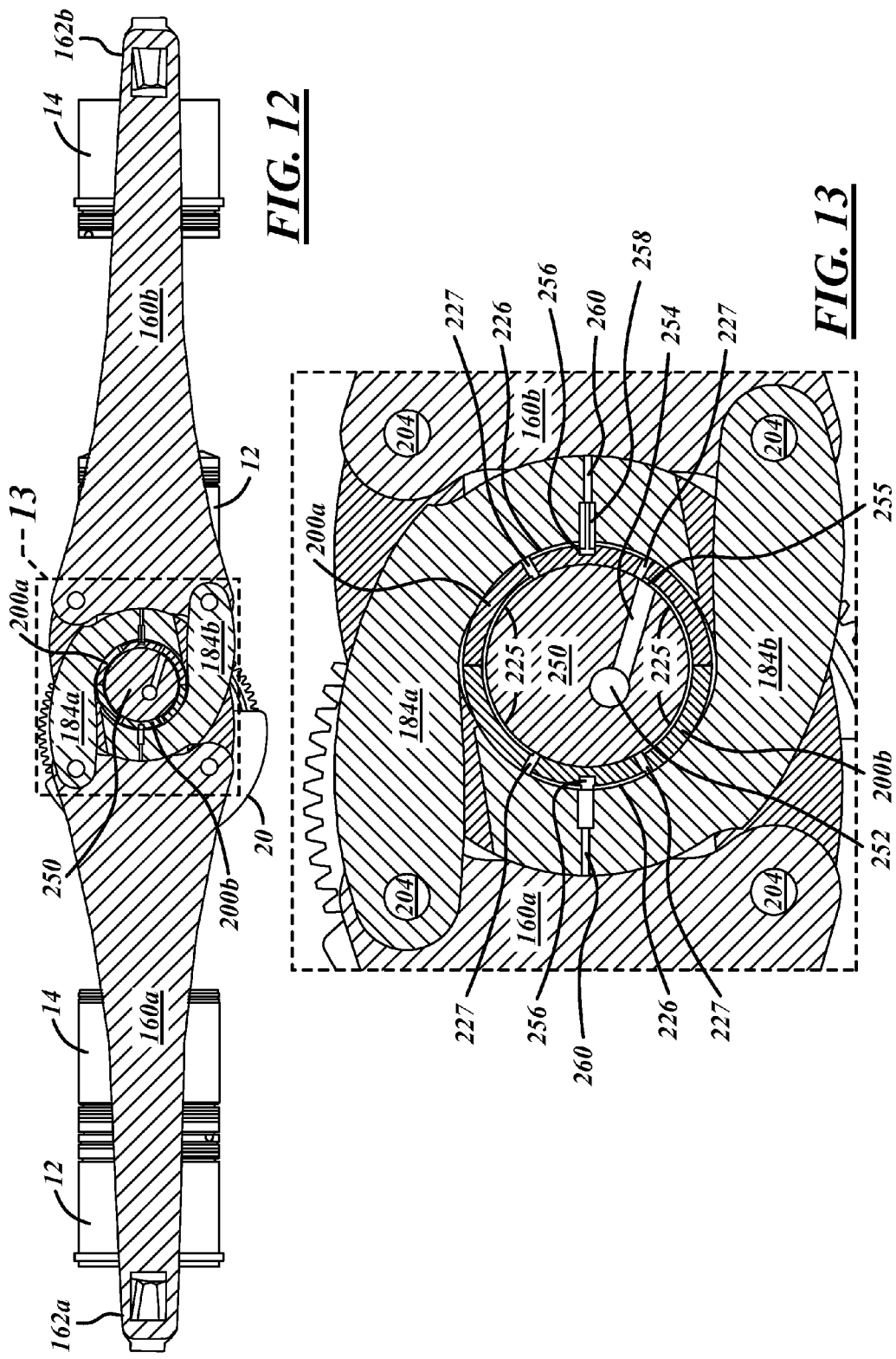

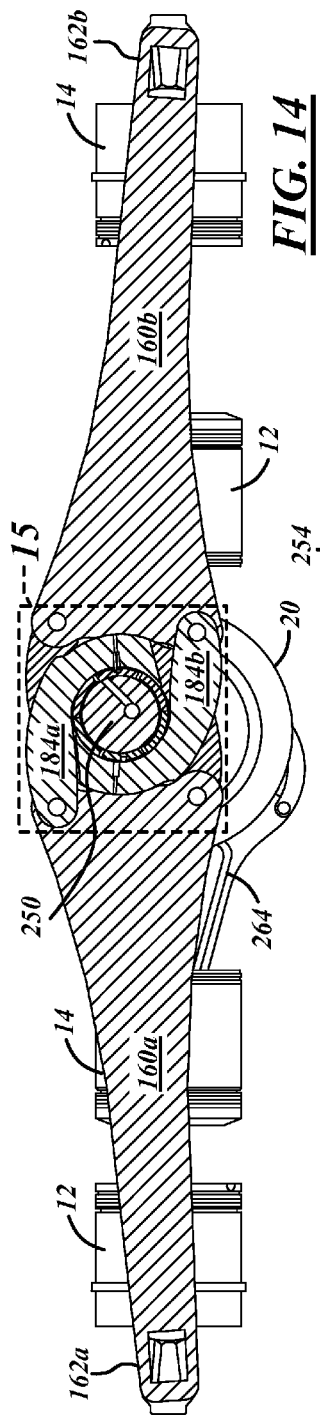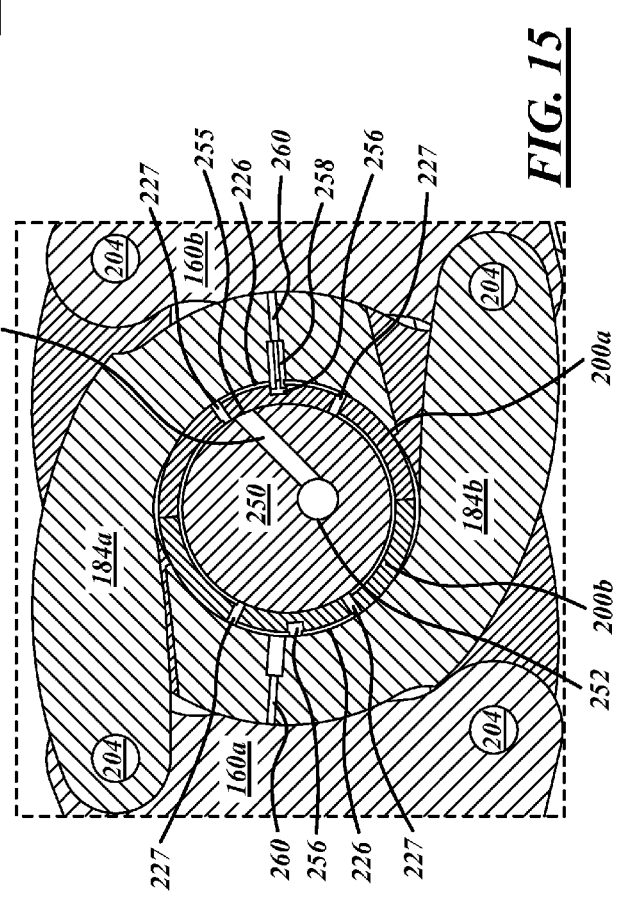

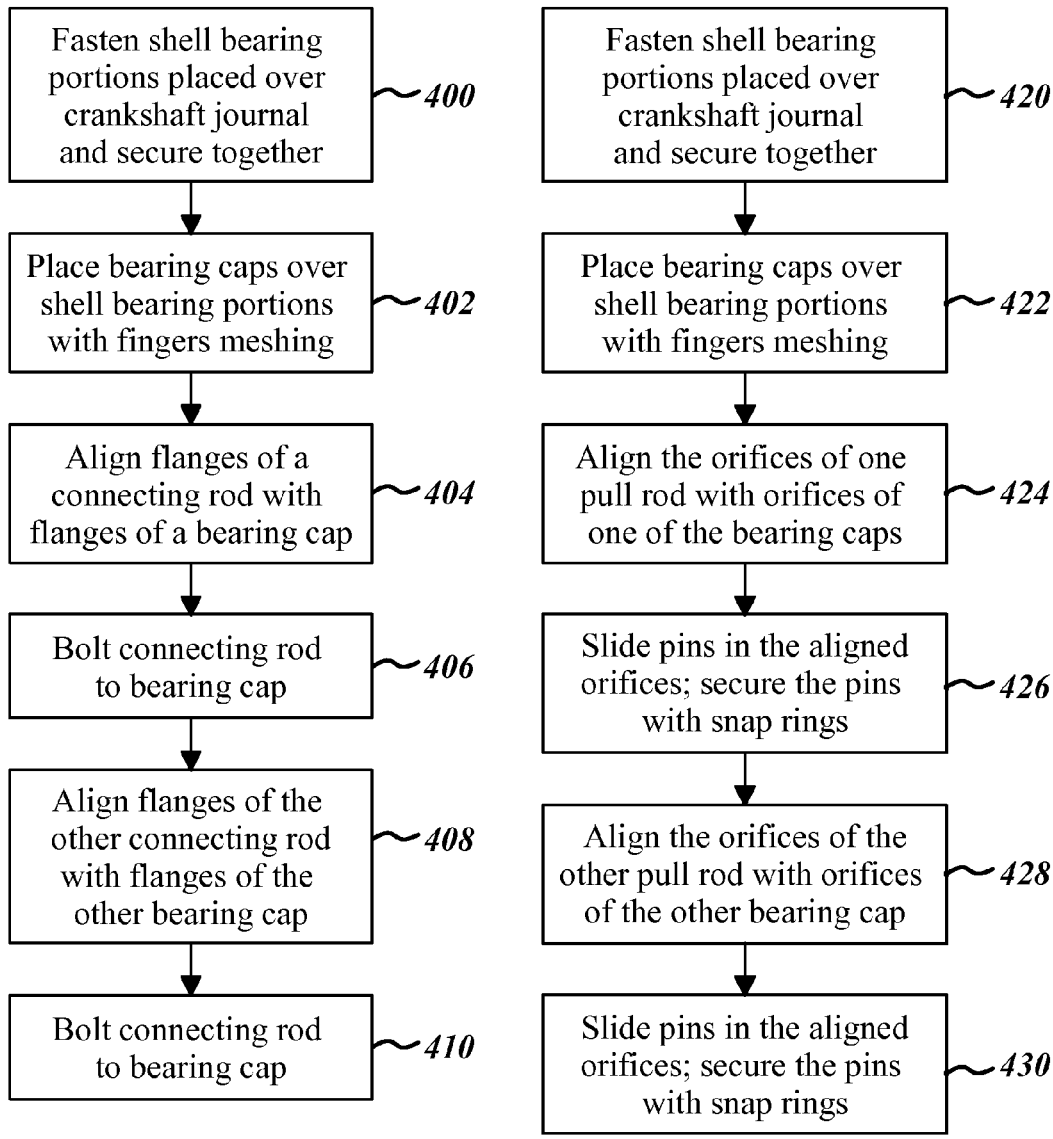

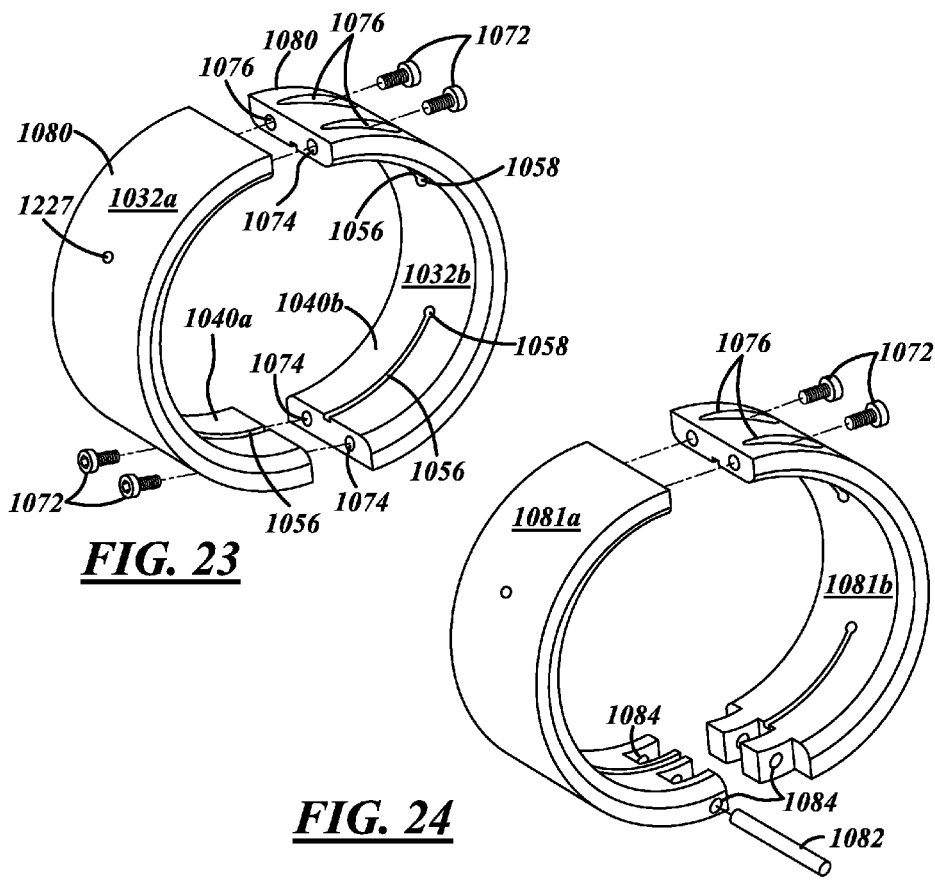
FIG. 23
FIG. 24
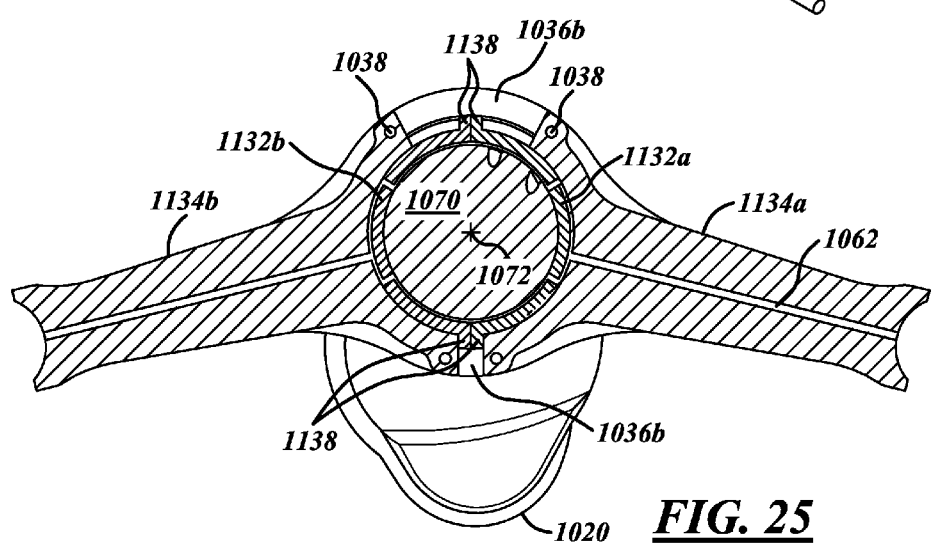
FIG. 25

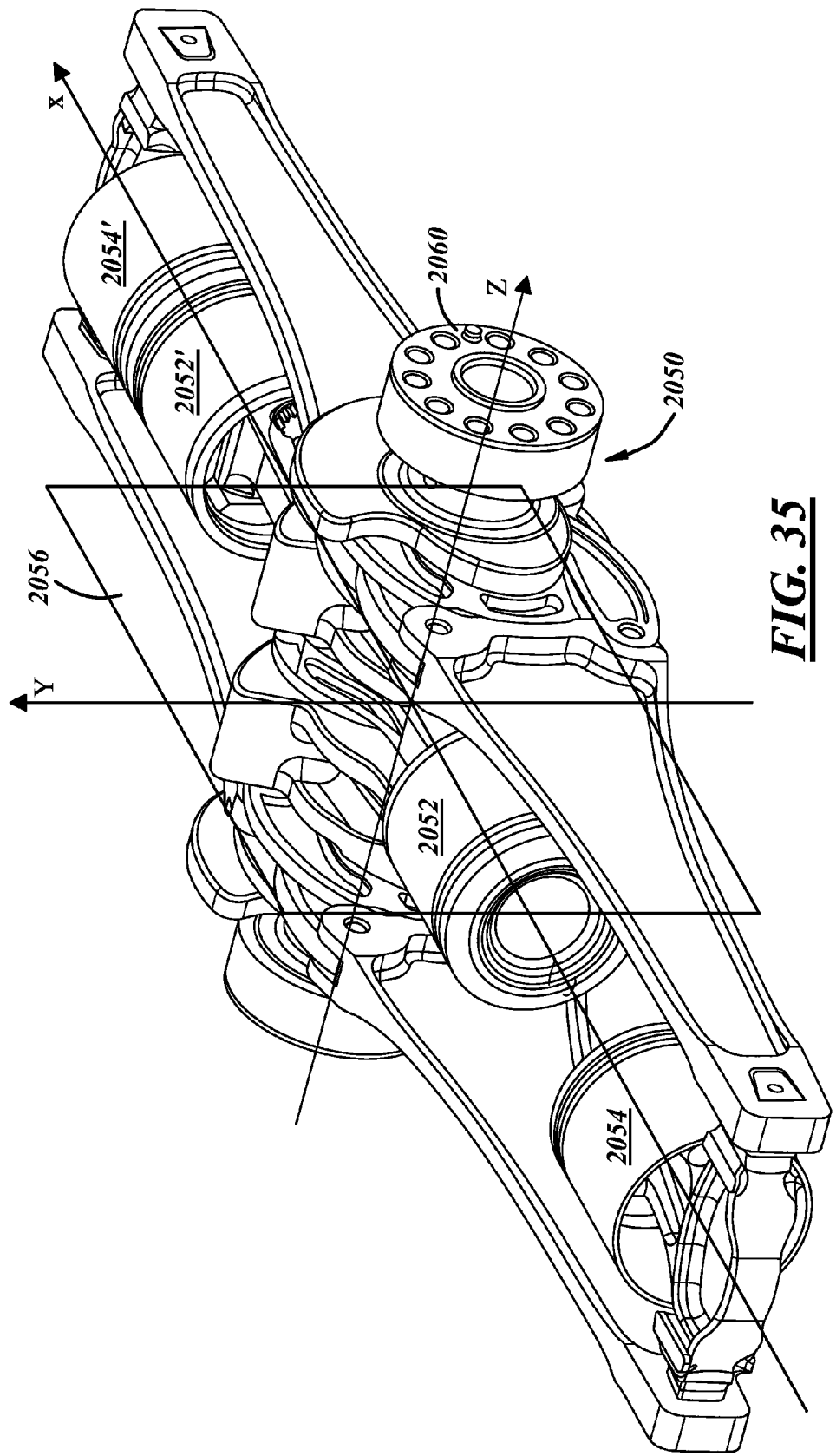

OPPOSED-PISTON, OPPOSED-CYLINDER ENGINE WITH COLLINEAR CYLINDERS

CROSS REFERENCE TO RELATED APPLICATIONS

The present application claims priority benefit from U.S. provisional patent Applications: 61/441,915 filed 11 Feb. 2011, 61/471,236 filed 4 Apr. 2011, 61/478,736 filed 25 Apr. 2011, and 61/549,678 filed 20 Oct. 2011.

FIELD

The present disclosure relates to an opposed-piston, opposed-cylinder (OPOC), internal-combustion engine in which central axes of the cylinders are collinear.

BACKGROUND

An OPOC engine 10, as disclosed in U.S. Pat. No. 6,170,443, and incorporated herein in its entirety, is an asymmetrical configuration. Such an OPOC engine 10 is shown isometrically in FIG. 1. A first intake piston 12' is the inner piston in one of the cylinders and a second intake piston 12 is the outer piston in the other cylinder. A first intake piston 12 and a first exhaust piston 14 reciprocate within a first cylinder; and a second intake piston 12' and a second exhaust piston 14' reciprocate with a second cylinder (cylinders not shown to facilitate viewing pistons). Exhaust piston 14 and intake piston 12' couple to a journal (not visible) of crankshaft 20 via pushrods 16 (only one of which is visible). Intake piston 12 and exhaust piston 14' couple to two journals (not visible) of crankshaft 20 via pullrods 18, with each of intake piston 12 and exhaust piston 14' having two pullrods 18. Because the pullrods and pushrods sit adjacent to each other, a central axis 22' of the left cylinder is parallel to, but offset from a central axis 22 of the right cylinder. Thus, the engine is wider than it would otherwise be.

One alternative to overcome the offset cylinders is a forked rod, such as is described in U.S. Pat. No. 1,322,824, invented by F. Royce. By employing a forked rod/blade rod configuration within the engine of FIG. 1, the length of the journal (or crank pin) can be reduced. Also, the cylinders are collinear. The width of the engine can be reduced and the unbalanced forces are reduced. However, a disadvantage of such a configuration is that the piston in one cylinder couples with the crankshaft by a forked rod and the corresponding piston in the opposing cylinder couples with the crankshaft by a blade rod thereby increasing part count for the engine. A system for coupling the rods to the crankshaft is desired which allows common parts to be used in the two cylinder, such as is possible with the configuration shown in FIG. 1, while allowing collinear cylinders, such as that shown U.S. Pat. No. 1,322,824.

However, an issue associated with the crankshaft proposed shown in U.S. Pat. No. 1,322,824 is that the crankshaft is built up from multiple parts to allow assembly. That is, for a conventional four-stroke engine in which two connecting rods are coupled to substantially the same portion of the journal of the crankshaft, the connecting rod is subject to both tension and compression. The forked connecting rod encircles the crankshaft and thus is slipped onto the journal at an end of the journal before the crankshaft is fully assembled. The crankshaft can be assembled by welding, fastening, or press fitting together. There are minimal forces acting on the crankshaft in the axial direction so that such a press fit can be sufficient. However, assembly of the crankshaft must ensure that the components are coaxial. It is desirable to avoid an assembled crankshaft to ensure the desired geometry and to simplify the engine assembly process.

SUMMARY

In an OPOC engine, the connecting rods associated with the outer pistons are primarily in tension and the connecting rods associated with the inner pistons are primarily in compression. Thus, the connecting rod need not wrap around the journals in the same manner as in a four-stroke engine in which the connecting rod alternates between tension and compression. Embodiments of the present disclosure take advantage of this difference and allowing a unitary crankshaft to which the two-stroke connecting rods can be assembled.

An opposed-piston, opposed-cylinder engine is disclosed that has a first cylinder having a first inner piston and a first outer piston disposed therein, a second cylinder having a second inner piston and a second outer piston disposed therein, the second cylinder having a central axis substantially collinear with a central axis of the first cylinder, and a unitary crankshaft disposed between the first and second cylinders. The crankshaft has a first main bearing, a first outer eccentric journal, a center eccentric journal, a second outer eccentric journal and a second main bearing. The engine also has a first pushrod coupling the first inner piston with the center eccentric journal, a second pushrod coupling the second inner piston with the center eccentric journal, a first pullrod with a first end of the first pullrod coupled to the first outer piston and a second end of the first pullrod wrapped around a portion of the first outer eccentric journal, a second pullrod with a first end of the second pullrod coupled to the first outer piston and a second end of the second pullrod wrapped around a portion of the second outer eccentric journal, a third pullrod with a first end of the third pullrod coupled to the second outer piston and a second end of the third pullrod wrapped around a portion of the first outer eccentric journal, and a fourth pullrod with a first end of the fourth pullrod coupled to the second outer piston and a second end of the fourth pullrod wrapped around a portion of the second outer eccentric journal.

In one embodiment, the unitary crankshaft is a single forged piece. Alternatively, the unitary crankshaft is machined from a single piece.

At least partially due to the cylinders being collinear, the first and second pushrods are substantially included in a plane that radially bisects the center eccentric journal. Similarly, the first and third pullrods are substantially included in a plane that radially bisects the first outer eccentric journal and the second and fourth pullrods are substantially included in a plane that radially bisects the second outer eccentric journal.

The bearings are arranged with the main bearings outside of the outer eccentric bearings and the center eccentric bearing between the outer eccentric bearings.

The engine further includes a first bearing cap secured to the first pullrod, a second bearing cap secured to the second pullrod, a third bearing cap secured to the third pullrod, and a fourth bearing cap secured to the fourth pullrod. The first, second, third, and fourth bearing caps each having three fingers. A pair of the fingers of the first bearing cap mesh with a finger of the third bearing cap. A pair of the fingers of the third bearing cap mesh with a finger of the first bearing cap. A pair of the fingers of the second bearing cap mesh with a finger of the fourth bearing cap. A pair of the fingers of the fourth bearing cap mesh with a finger of the second bearing cap.

Also disclosed is an OPOC engine having a first cylinder having a first intake piston and a first exhaust piston disposed therein, a second cylinder having a second intake piston and a second exhaust piston disposed therein, the second cylinder having a central axis substantially collinear with a central axis of the first cylinder, a crankshaft comprised of a single piece disposed between the first and second cylinders, the crankshaft having a first outer main bearing, a first outer eccentric journal, a center eccentric journal, a second outer eccentric journal and a second outer main bearing, a first pushrod coupling the first exhaust piston with the center eccentric journal, a second pushrod coupling the second exhaust piston with the center eccentric journal, a first pullrod with a first end of the first pullrod coupled to the first intake piston and a second end of the first pullrod coupled to the first outer eccentric journal via a first bearing cap, a second pullrod with a first end of the second pullrod coupled to the first intake piston and a second end of the second pullrod coupled to the second outer eccentric journal via a second bearing cap, a third pullrod with a first end of the third pullrod coupled to the second intake piston and a second end of the third pullrod coupled to the first outer eccentric journal via a third bearing cap, and a fourth pullrod with a first end of the fourth pullrod coupled to the second intake piston and a second end of the fourth pullrod coupled to the second outer eccentric journal via a fourth bearing cap.

The first, second, third, and fourth bearing caps each having three fingers in which a pair of the fingers of the first bearing cap mesh with a finger of the third bearing cap, a pair of the fingers of the third bearing cap mesh with a finger of the first bearing cap, a pair of the fingers of the second bearing cap mesh with a finger of the fourth bearing cap, and a pair of the fingers of the fourth bearing cap mesh with a finger of the second bearing cap.

In some embodiments, the eccentric journals are arranged on the crankshaft such that the exhaust pistons reach their extreme in travel before the intake pistons with a phase angle difference in the range of 5 to 25 crank angle degrees.

In some embodiments, the engine includes a plurality of intake ports defined in the first and second cylinders and the phase angle difference is in the range of 15-25 crank angle degrees in engine intakes in which intake flow is unimpeded by a valve proximate the intake ports.

In other embodiments, a first plurality of intake ports are defined in the first and second cylinders at a first predetermined distance from an axis of rotation of the crankshaft and a second plurality of intake ports are defined in the first and second cylinders at a second predetermined distance from the axis of rotation of the crankshaft. Normally-closed, unidirectional flow valves are disposed upstream of the first plurality of intake ports. The unidirectional valves open when pressure on the upstream side of the unidirectional valves exceeds pressure on the downstream side of the unidirectional valves. In such embodiments, the phase angle difference is in the range of 5-15 crank angle degrees.

A center of gravity of the crankshaft is displaced from the axis of rotation of the crankshaft and the location of the center of gravity is chosen to counteract roughly half of an unbalanced inertia force that is generated due to the phase angle difference between the intake and exhaust pistons.

Also disclosed is a method to couple pistons to a crankshaft of an opposed-piston, opposed-cylinder engine, including: placing first and second portions of a pushrod bearing shell onto the center eccentric journal, fastening the first and second pushrod bearing shell portions together, placing a first pushrod over a center eccentric journal of the crankshaft, placing a second pushrod over a center eccentric journal of the crankshaft, placing a first retainer over the center eccentric journal opposite the first pushrod, engaging the first retainer with a shoulder on the second pushrod, placing a second retainer over the center eccentric journal opposite the second pushrod, and engaging the second retainer with a shoulder on the first pushrod. The first pushrod is coupled to a first inner piston on an end of the first pushrod distal from the crankshaft and the second pushrod is coupled to a second inner piston an end of the second pushrod.

The method may further include placing first and second portions of a pullrod bearing shell onto the first outer eccentric journal, placing third and fourth portions of a pullrod bearing shell onto the second outer eccentric journal, and placing a first bearing cap over a first outer eccentric journal. The first bearing cap has first and second fingers extending away from a top of the first bearing cap and a third finger extending away from a bottom of the first bearing cap. The method further includes meshing a second bearing cap with the first bearing cap. The second bearing cap has first and second fingers extending away from the bottom of the second bearing cap and a third finger extending away from a top of the second bearing cap. Meshing means: the third finger of the first bearing cap slides into a gap between the first and second fingers of the second bearing cap and the third finger of the second bearing cap slides into a gap between the first and second fingers of the first bearing cap.

The method may further include placing a third bearing cap over a second outer eccentric journal. The third bearing cap has first and second fingers extending away from a top of the third bearing cap and a third finger extending away from a bottom of the third bearing cap. The method may include meshing a fourth bearing cap with the third bearing cap. The fourth bearing cap has first and second fingers extending away from the bottom of the fourth bearing cap and a third finger extending away from a top of the fourth bearing cap. Meshing occurs when the third finger of the third bearing cap slides into a gap between the first and second fingers of the fourth bearing cap and the third finger of the third bearing cap slides into a gap between the first and second fingers of the fourth bearing cap.

The method further includes placing a first pullrod onto an outside surface of the second bearing cap. A first end of the first connecting rod is adapted to couple with a first outer piston. A first corner on a second end of the first pullrod has a single tab having an orifice. A second corner on a second end of the first pullrod has two tabs each having an orifice. The single tab meshing with the second and third fingers of the second bearing cap. The first finger of the second bearing cap meshing with the two tabs. The method further includes inserting a first pin through the orifice in the single tab of the first pullrod and the orifices in the second and third fingers of the first bearing cap and inserting a second pin through the orifices in the two tabs of the first pullrod and the orifice in the first finger of the first bearing cap. The method may further include placing a second pullrod onto an outside surface of the first bearing cap. A first end of the second pullrod is adapted to couple with a reciprocating element. A first corner on a second end of the second pullrod has a single tab having an orifice. A second corner on a second end of the second pullrod has two tabs each having an orifice. The single tab meshes with the second and third fingers of the first bearing cap. The first finger of the first bearing cap meshes with the two tabs. A third pin is inserted through the orifice in the single tab of the second pullrod and the orifices in the second and third fingers of the second bearing cap. A fourth pin is inserted through the orifices in the two tab of the second pullrod and the orifice in the first finger of the second bearing cap.

The method further includes installing a first snap ring proximate the first pin, installing a second snap ring proximate the second pin, installing a third snap ring proximate the third pin, and installing a fourth snap ring proximate the fourth pin.

An advantage according to some embodiments is that the disclosed connecting rods and bearing caps suitable for a two-stroke OPOC engine can be assembled to a unitary crankshaft while maintaining collinear cylinders. In one embodiment, the intake pistons are outboard and the exhaust pistons are inboard with the exhaust pistons preceding the intake pistons to the extreme positions by 5 to 25 degrees. Such a configuration imparts a slight imbalance. This can be partially overcome by causing the center of gravity of the crankshaft to be displaced from the axis of rotation of the crankshaft.

In some embodiments, there are first and second pluralities of intake ports with reed valves coupled to the first plurality of intake ports. By doing so, more flexibility in port heights and placement are possible. In such a configuration, the phase angle between the intake and exhaust piston movement can be in the 5 to 15 degree range. The amount of imbalance imparted to the engine is much less with a phase angle that is closer to zero.

BRIEF DESCRIPTION OF THE DRAWINGS

FIG. 2 is an isometric view of a connecting rod to crankshaft journal connection according to an embodiment of the present disclosure;

FIGS. 3 and 4 show a connecting rod and a bearing cap related to the components illustrated in FIG. 2;

FIG. 8A illustrates the bearing shell portions of FIG. 5;

FIG. 8B illustrates an alternative embodiment to secure the bearing shell portions;

FIGS. 10 and 11 illustrated various embodiments for pinning the pullrod with the bearing cap;

FIGS. 12, 14, and 17 illustrate the arrangement of the pistons and connecting rods in different angles of crank rotation;

FIGS. 13 and 15 show a detail of the crank connection at two crank positions according to one embodiment for pinning a shell bearing portion;

FIGS. 19 and 20 are flowcharts of the assembly processes for two embodiments of the disclosure;

FIG. 23 illustrates the bearing shell portions of FIG. 21;

FIG. 24 illustrates an alternative embodiment to secure the bearing shell portions;

FIG. 25 illustrates a cross section of the pushrod-to-crankshaft assembly;

FIG. 35 is an isometric view of an OPOC engine in which the intake and exhaust pistons are symmetrically arranged;

DETAILED DESCRIPTION

Figure 1:
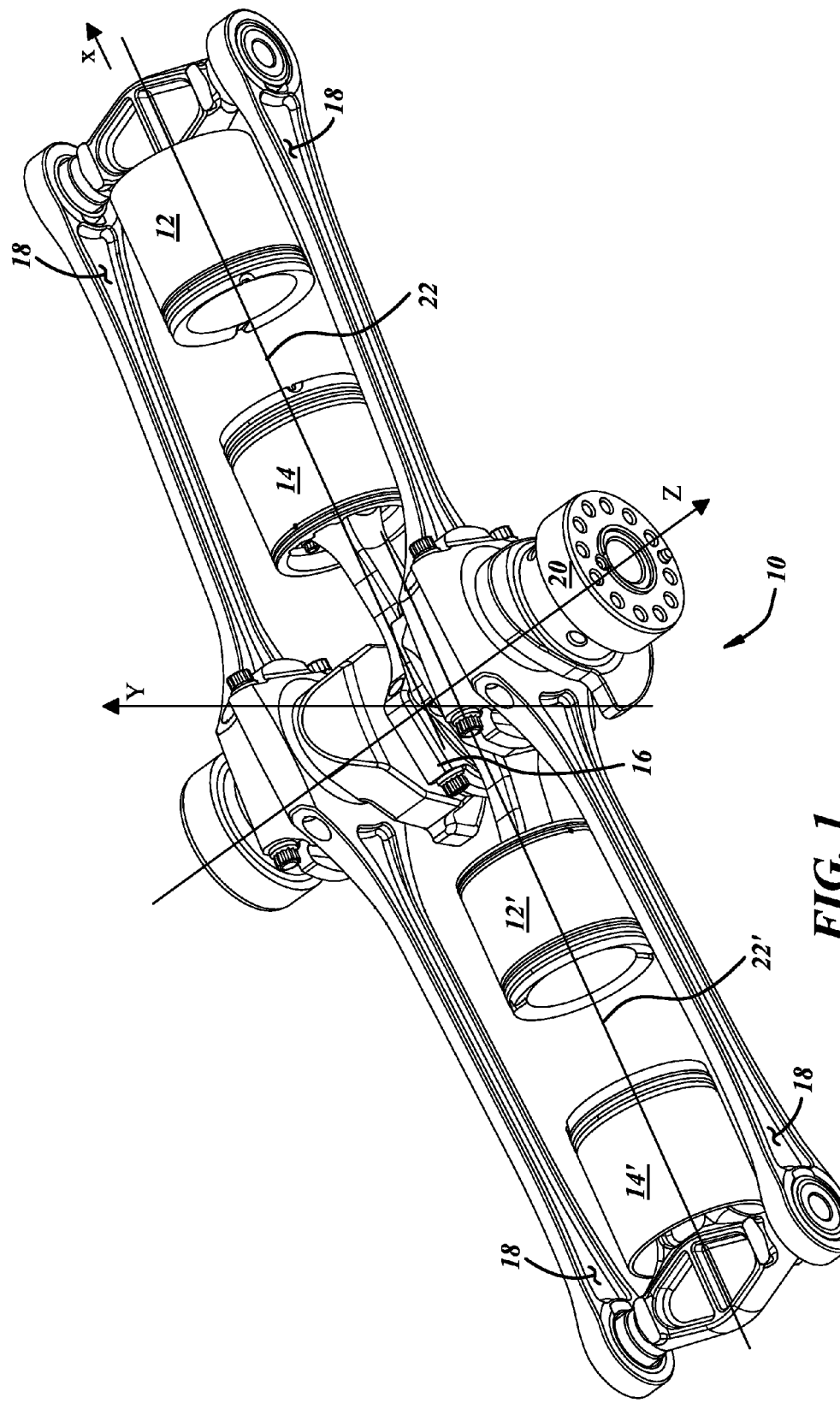
FIG. 1 is an isometric view of an OPOC engine in which the intake and exhaust pistons are asymmetrically arranged.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

To achieve a collinear arrangement of the cylinder axes in the OPOC engine, both pullrod pushrod configurations to achieve this with a unitary crankshaft are described below.

Pullrod Disclosure

In FIG. 2 an isometric view of a journal 96 with a central axis 99 that coincides with a center 97 of journal 96 is shown. Journal 96 is coupled to two connecting rod portions 100a and 100b via respective bearing caps 102a and 102b. Two bearing shell portions 98a, 98b are included between bearing caps 102a, 102b and journal 96. Each of bearing caps 102a and 102b has a first finger 104a (not visible in FIG. 2) and 104b, a second finger 106a and 106b, and a third finger 108a, and 108b. First finger 104a and second finger 106a of bearing cap 102a mesh with third finger 108b of bearing cap 102b. A gap between first finger 104a and second finger 106a is substantially equal to the width of third finger 108b. Furthermore, the width of first finger 104a is approximately equal to the width of second finger 106a.

Connecting rod 100a has a first flange 110a and a second flange 112a; connecting rod 100b has first and second flanges 110b, 112b. Through holes 116b and 118b are provided in flange 112b; through hole 122b is provided in flange 110b. Bolts 124b, 126b are slid into through holes 116b and 118b, respectively, and engaged with threaded holes 128b, 130b in fingers 104b and 106b, respectively. Bolt 132b is slid into through hole 122b and engaged with a threaded hole 134b.

In FIG. 3, a single pullrod 100 is shown having a first flange 110 with a hole 122 and a second flange 112 with two orifices 116 and 118 (as the two orifices are in line, only one is shown in phantom). A concave surface 136 forms a portion of a cylinder. Pullrod 100 also has a rod portion with a small end portion 142 at one end. Pullrod 100 also has bearing surfaces 144. Bearing surfaces 144 lie in planes parallel to each other and are located at ends of concave surface 136. Bearing surfaces 144 face outwardly. Pullrod 100 can be described as having a piston connection portion (alternatively referred to as small end portion 142), journal connection portion 143, and rod portion 145 between the two connection portions. FIG. 4 illustrates a bearing cap 102 that can be coupled to pullrod 100. Of first and second fingers 104 and 106, only one is visible in this view. On the other end of bearing cap 102 is third finger 108. Threaded hole 134 aligns with through hole 110 of pullrod 100. Threaded holes 128 and 130 align with through holes 116 and 118 of pullrod 100. Bearing cap has a concave surface 146 that forms a portion of a cylinder. Extending from the ends of concave surface 146 are bearing surfaces 148 which are parallel and face each other. When bearing cap 102 is assembled with pullrod 100, bearing surfaces 144 of pullrod 100 bear against bearing surfaces 148 of bearing cap 102. Bearing surfaces 144 support bearing cap 102 from crushing as it is pulled at fingers 104, 106, and 108. If bearing cap 102 is even slightly deformed, it becomes out of round and increases friction in the journal.

Figure 5:
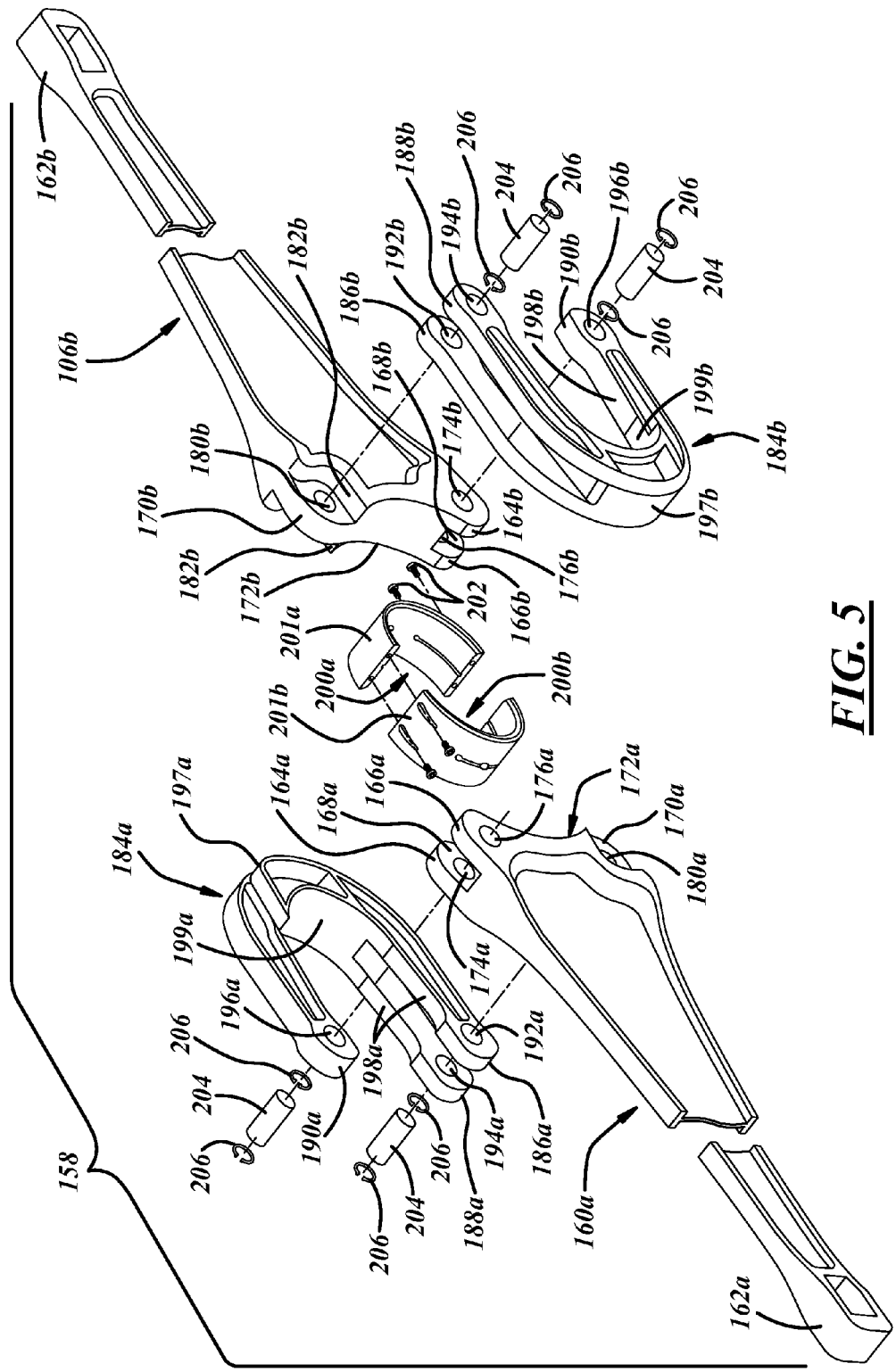
FIG. 5 is an exploded view of a connecting rod/bearing cap system according to an embodiment of the present disclosure.

An alternative embodiment of a pullrod/bearing cap system 158 is shown in FIG. 5 in an isometric, exploded view. Pullrods 160a and 160b have small ends 162a and 162b adapted to couple with reciprocating elements, such as pistons. Pullrod 160a has a first tab 164a and a second tab 166a separated by a gap 168a of a predetermined width. Pullrod 160a has a third tab 170a. Each of first, second, and third tabs 164a, 166a, and 170a has orifices: 174a, 176a, and 180a, respectively, each of a predetermined diameter. Pullrods 160a and 160b have concave surfaces 172a and 172b that form a portion of a cylinder. Pullrod 160a and 160b have bearing surfaces that are in contact with bearing surfaces of the bearing caps. Most of these bearing surfaces are not visible in FIG. 5, except for bearing surface 182b of pullrod 160b. A corner of bearing surface 180b is visible on the far side of third tab 170b; another bearing surface (not visible) is provided between first and second tabs 164b and 166b. Pullrod 160a has similar bearing surfaces as pullrod 160b, but none of such bearing surfaces on pullrod 160a are visible in this view. These bearing surfaces are provided to prevent crushing of the bearing cap, as will be described in more detail below.

Also shown in FIG. 5 is a bearing cap 184a that has first and second fingers 186a and 188a separated by a gap of the predetermined width (substantially the same width as the gap between first and second tabs, i.e., gap between 164a and 166a; and gap between 164b and 166b. Bearing cap 184a also has a third finger 190a having a width of the predetermined width. Fingers 186a, 188a, and 190a each have an orifice, 192a, 194a, and 196a, respectively. First and second fingers 186a and 188a are substantially the same width; third finger 190a is approximately twice the width of first finger 186a. The gap between first and second fingers 186a and 188a is substantially the same as the width of third finger 190a. Bearing cap 184a has three bearing surfaces: two bearing surfaces 198a on first and second fingers 186a and 188a and one bearing surface (not visible) on third finger 190a. The bearing surface on third finger 190a is substantially parallel with and faces toward bearing surfaces 198a on first and second fingers 186a and 188a. Bearing cap 184b is identical to bearing cap 184; however, as oriented in FIG. 8, only one of three bearing surfaces 198b is visible, i.e., bearing surface 198b associated with third finger 190b.

Bearing surfaces 198a and 198b of bearing caps 184a and 184b bear against bearing surfaces 182a and 182b of pullrods 160a and 160b, respectively. Bearing caps 184a and 184b have concave surfaces 199a and 199b that are portions of a cylinder. Also shown in FIG. 5 are bearing shell portions 200a and 200b. Concave surfaces 172a and 172b of pullrods 160a and 160b mate with convex surfaces 197a (197a not visible in FIG. 5) and 197b of bearing caps 184a and 184b, respectively. Concave surfaces 199a and 199b of and bearing caps 184a and 184b mate upon convex surfaces 201a and 201b of bearing shell portions 200a and 200b, respectively.

To assemble the connecting rod assembly, bearing shell portions 200a and 200b are placed over a cylindrical journal (not shown in FIG. 5). Bearing shell portions 200a and 200b are coupled via screws 202, four shown in FIG. 5. Bearing caps 184a and 184b are placed over bearing shell portions 200a and 200b with fingers of the bearing caps meshing: first and second fingers of one bearing cap meshing with the third finger of the other bearing cap and vice versa. One of the pullrods is placed over one of the bearing caps such that orifices in the tips of the pullrods align with orifices in fingers of the bearing cap. A pin 204 is placed through the aligned orifices, one at the top and one at the bottom, and secured with snap rings 206, one at each end of pins 204, per the embodiment in FIG. 5. The other pullrod is similarly secured to the other bearing cap.

One advantage of embodiments of the present disclosure is that pullrod 160a is identical to pullrod 160b just as bearing cap 184a is identical with bearing cap 184b. In FIG. 5, pullrod 160a is "upside down" with respect to pullrod 160b such that the corner of pullrod 160b has the corner with the single tab, i.e., 170b pointing upwardly and pullrod 160a has the corner with the single tab, i.e., 170a pointing downwardly in FIG. 5. In the embodiment in FIG. 3, pullrods 100a and 100b are identical; and bearing caps 102a and 102b are identical. By having identical parts, the number of unique parts to assemble an engine is reduced thereby reducing cost of the product.

Another advantage of the assembly shown in FIG. 5 is that pins 204 are in shear. These can be made rather smaller in diameter than other connection schemes. Smaller pins facilitate smaller orifices in the pullrod and the bearing cap thereby allowing smaller tabs and smaller fingers, respectively. The mass of the parts can be reduced and the assembly is more compact. Reducing mass of the rotating components present many advantages: less unbalanced force, reduced cost due to reduced material, reduced size of related parts, e.g., mounts, bearings. Yet a further advantage is reduced machining and assembly steps, thereby further reducing cost of manufacture.

Figure 6:
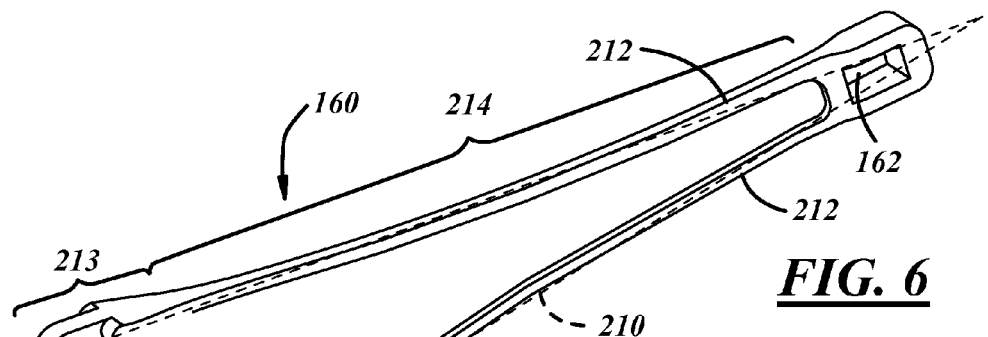
FIG. 6 is an illustration of the connecting rod of FIG. 5.
Figure 7:
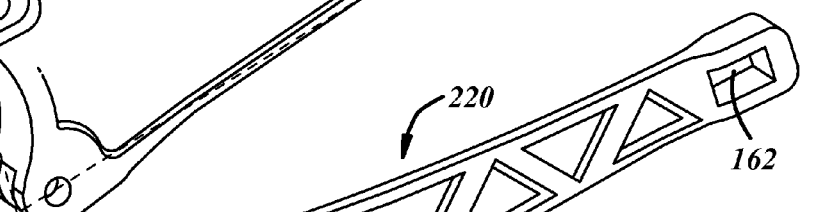
FIG. 7 is an alternative connecting rod.
Figure 9:
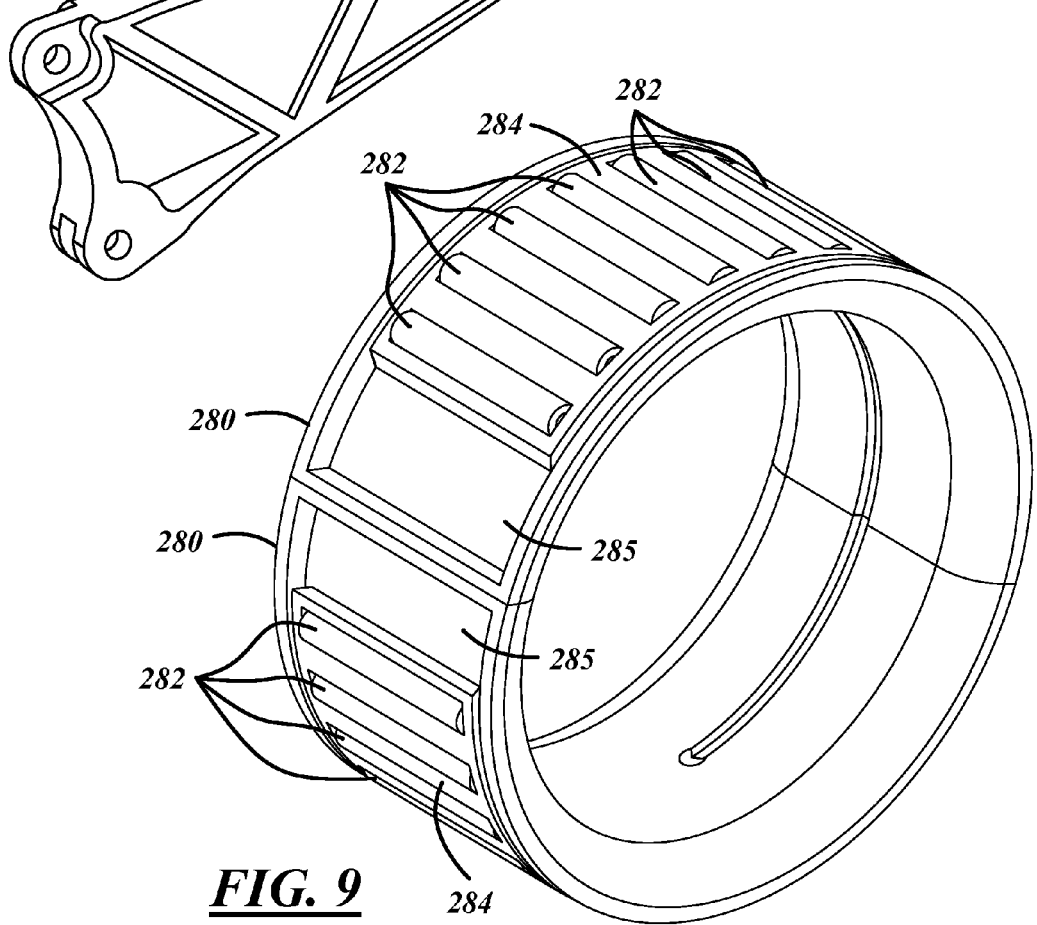
FIG. 9 illustrates an alternative roller bearing embodiment.

In FIG. 6, it can be seen that pullrod 160 is shaped roughly in the shape of an isosceles triangle 210 with small end portion 162 at one point of the triangle. Other edges 212 on the long sides of the roughly triangular shape are thicker than the center portion of pullrod 160. Pullrod 160 can be considered to include a piston connection portion (which is alternatively the small end portion 162), a journal connection portion 213, and a rod portion 214 between the two connection portions. In another embodiment shown in FIG. 7, pullrod 220 forms a lattice in the central region.

An isometric drawing of the bearing shell portions in an exploded view is shown in FIG. 8A. Bearing shell portions 200a and 200b are fastened by screws 202 that pass into through holes 222a which are large enough to accommodate the head of screws 202 and into through holes 223a and then into threaded holes (not visible in this view) associated with bearing shell portion 200b, similar to threaded holes 224a. Lubrication grooves 225 are provided in the concave surfaces 211a and 221b in the bearing shell caps 200a and 200b. Oil supply to lubrication grooves 225 is shown in more detail in FIGS. 8, 13, 15, 16, and 18. Oil supplied to oil grooves 225 passes through oil holes 227 to oil grooves 226 formed in the convex surfaces 201a and 201b (oil groove 226 in bearing cap 200a is not visible in FIG. 8A).

In alternative embodiment illustrated in FIG. 8B, bearing shell portions 230 and 232 have interlocking fingers at one end with holes through the fingers so that a pin 234 may be inserted through the holes. In one embodiments, shell bearing portions 230 and 232 are installed on a journal of a crankshaft with the crankshaft having weights on either side of the journal so that pin 234 cannot fall out. In other embodiments without features holding the pin in place, the pin may have a head on one end and a snap ring on the other end. Alternatively, the pin may be secured by snap rings in an internal fashion. Any suitable way of securing the pin can be used.

In yet another embodiment, the shell bearing portions are eliminated altogether. In some alternatives, either the journal or the bearing cap inner cylindrical surface is provided with a surface coating that is suitable to serve as a bearing material. Furthermore, oil grooves may be included to allow passage of the oil to bearing surfaces.

FIGS. 8A and 8B illustrate bearing shell portions that are fixed together. This ensures that the lubrication passes through the lubrication grooves, as described below. If the pullrod is always under tension, then there is no need to secure the bearing shell portions to each other as the forces in the system cause the bearing shell portions to remain pressed against the journal. Thus, in one embodiment, there are no screws or pins holding the two together. In assembly, the bearing shell portions can be held onto the journal by a thicker oil or grease until secured in place when the bearing caps and connecting rods are installed. Even in a system with momentary instances of a loss of the pressure, it may be possible to withstand such short durations with a momentary loss of oil flow thereby also allowing the bearing shell portions to be installed without the screws or pins.

In an alternative embodiment roller bearing portions 280 are used instead of bearing shell portions. Roller bearing portions 280 include a cage 284 into which needle bearings 282 are retained.

In FIG. 10, a cross section of one of the pinned joints between connecting rod 160a and bearing cap 184a is shown. Pin 204 is inserted through aligned orifices in finger 196a, and tabs 164a and 166a. One of snap rings 206 can be installed before or after insertion of pin 204. At least one of snap rings 206 is installed in one of the annular grooves formed the orifices in one of tabs 164a and 166a. A similar configuration may be used to couple the connecting rod 160a and bearing cap 184a involving fingers 186a and 188a with tab 180a.

FIG. 11 illustrates a couple of alternative embodiments. At the bottom of the joint as shown in FIG. 11, a pin 238 sits proud of the aligned orifices in bearing cap 184a and connecting rod 244. A snap ring 237 engages with a groove on pin 238. In configurations with sufficient space, such a configuration may be desirable to avoid providing a groove within the orifice through which the pin sits, such as is shown in FIG. 10 to accommodate the snap rings within the orifice. In FIG. 11, a counter bore 242 and a groove 240 are shown, but not needed for the pin 238 to snap ring 237 connection as shown. Such counter bore 242 and groove 240 are shown to illustrate the modifications to the orifice that accommodate the upper connection scheme. In the upper example, pin 238 has a head 239 with a larger diameter than the pin body and sits on the shoulder formed by the counter bore 242. A snap ring 245 is inserted proximate head 239 of pin 238 into the groove (not seen individually in FIG. 11, but is the same as groove 240 shown in the bottom joint.) The upper joint is sufficient to secure pin 238 as head 239 prevents the pin from moving downward and snap ring 245 prevents the pin from moving upward. The lower joint is shown simply for illustration convenience, i.e., to allow discussion of two embodiments relative to one figure.

A number of pin embodiments are contemplated with a number of tradeoffs. It is desirable have an orifice as small as possible so that the size of the fingers of bearing cap 184*a* and the tabs on connecting rod 244 can be smaller. The pin connection at the bottom of FIG. 11 allows this, but at a cost of additional length with the pin extending outwardly from the joint. Another desirable feature is for the parts to be symmetrical with the same machining operation on both ends to avoid potential assembly issues due to orientation.

A portion of the engine is shown in FIG. 12 at a condition where pistons 12 and 14 in the left hand cylinder (cylinder not shown) are at their position of closest approach and pistons 12 and 14 in the right hand cylinder (cylinder not shown) are their farthest position. A detail of this position is shown in FIG. 13. At the center is a cross section of a journal 250 that is part of a crankshaft is shown. Oil is provided along the crankshaft through a channel 252, which is shown in cross section. An oil passage 254 fluidly couples channel 252 through the crankshaft with an outer surface of journal 250 with an opening 255. As journal 250 rotates, opening 255 provides oil to the inside surfaces of shell bearing portions 200*a* and 200*b*. Oil passes out oil holes 227 along groves 226 through oil holes 260 in bearing caps 184*a* and 184*b* to provide lubricating between bearing cap 184*a* and pullrod 160*b* and between bearing cap 184*b* and pullrod 160*a* which rotate relative to each other a modest amount during the revolution of the crankshaft. It is desirable to maintain oil holes 227 about 30 degrees displaced (one 30 degrees upward and one 30 degrees downward) from a point of maximum force on the bearing cap. To facilitate that and to maintain the oil passages in desirable locations, it is desirable to restrict the motion of the shell bearing portions 200*a* and 200*b* with their respective bearing caps 184*a* and 184*b*. In the embodiment shown in FIG. 13, a pilot hole 256 is provided in the back of shell bearing portions 200*a* and 200*b*. A hollow pin 258 is inserted through oil passage 260 to index with pilot hole 256. Pilot hole 256 in bearing cap 184*b* is not used. However, for the purpose of keeping bearing shells 200*a* and 200*b* identical to reduce the number of unique parts in the engine, both bearing shells are provided with pilot holes 256. Pin 258 is hollow to allow oil to be conducted through pin 258 and passage 260 to the interface between bearing cap 184*a* and pullrod 160*b*.

In FIG. 14, the engine is shown at a different point in the rotation with pistons 12 and 14 of the left hand cylinder at a position of about 60 degrees before top dead center (TDC) and pistons 12 and 14 of the right hand cylinder at a position of about 120 degrees after TDC. As journal 250 is at, or near, it most upward position (upward as shown in FIG. 14), push rod 264 that couples crankshaft 20 to piston 14 of the left cylinder is visible.

In the detail of the crank connection shown in FIG. 15, oil passage 254 is displaced and opening 255 is providing oil to a different location on shell bearing portion 200*a* than that shown in FIG. 13. In FIG. 14, shell bearing portion 200*a* is displaced counterclockwise, slightly, compared to the position shown in FIG. 13. Recall that shell bearing portion 200*a* is pinned to bearing cap 184*a*. The slight counterclockwise rotation of bearing cap 184*a* and shell bearing portion 200*a* is due pullrod 160*a* being cocked upward at the end associated with journal 250 due to journal 250 being at its most upward position, as can be seen in FIG. 14. As shell bearing portion 200*a* is pinned to bearing cap 184*a* via pin 258, they rotate together. Shell bearing portion 200*b*, on the other hand, is free floating as can be seen with oil passage 260 rotated clockwise with respect to pilot hole 256 in shell bearing portion 200*b*. The range of motion of shell bearing portion 200*b* is limited, however, by shell bearing portion 200*a*. In fact, shell bearing portion 200*a* moves shell bearing portion 200*b*.

Figure 16:
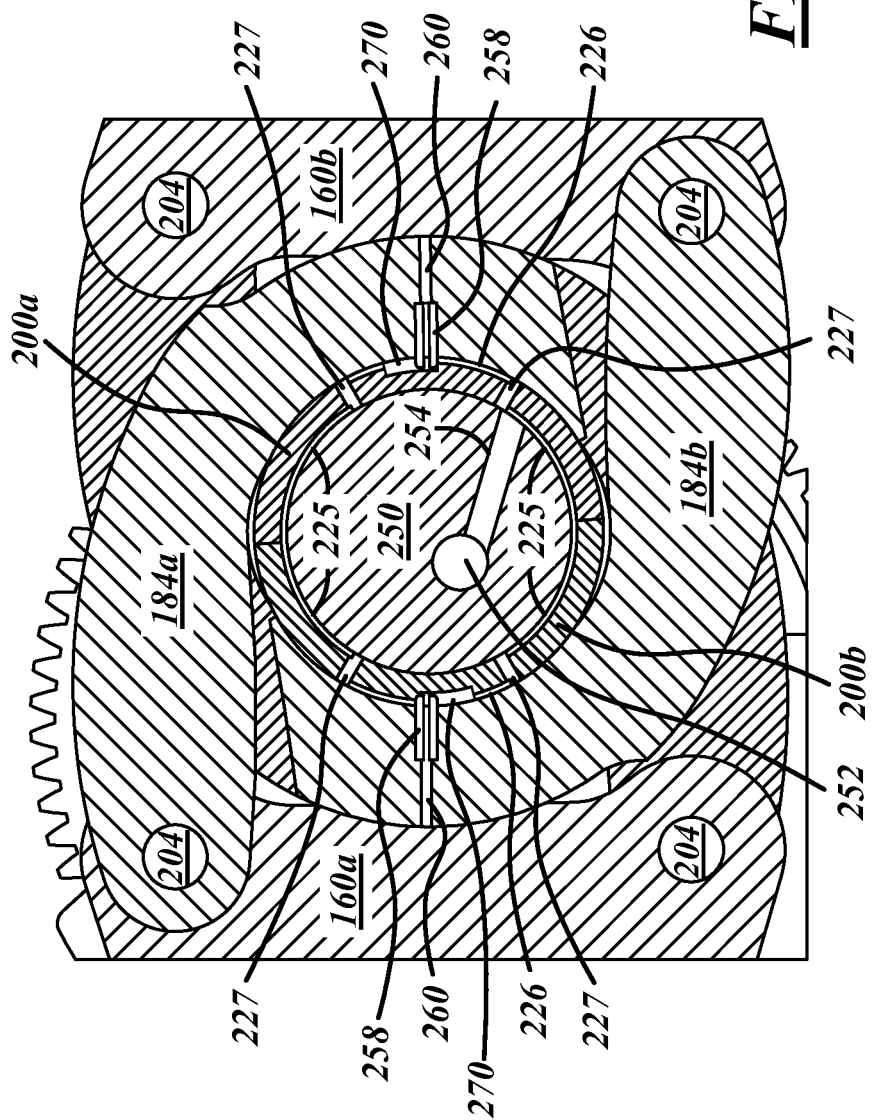
FIGS. 16 and 18 show a detail of the crank connection at two crank positions according to one embodiment for restricting motion of the shell bearing portions.
Figure 17:
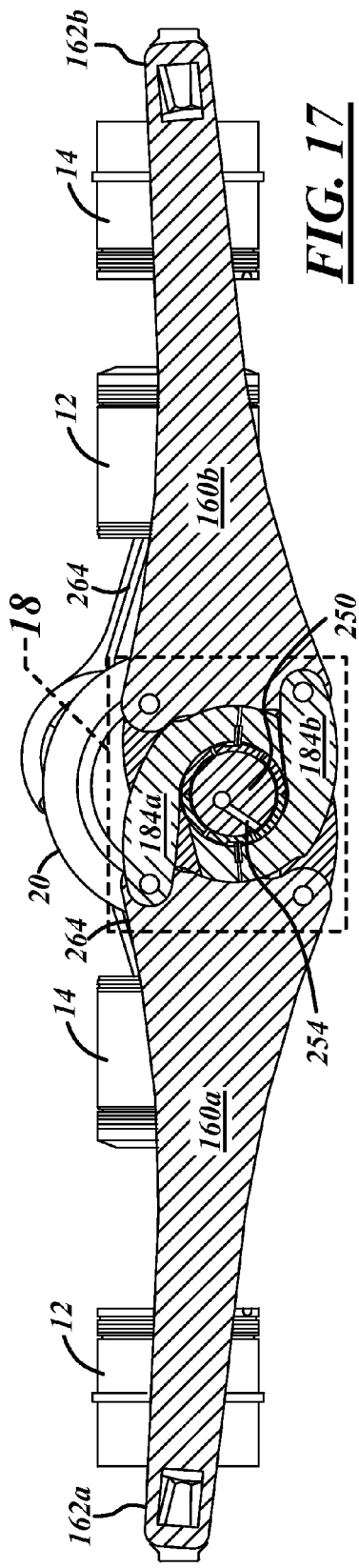
Figure 18:
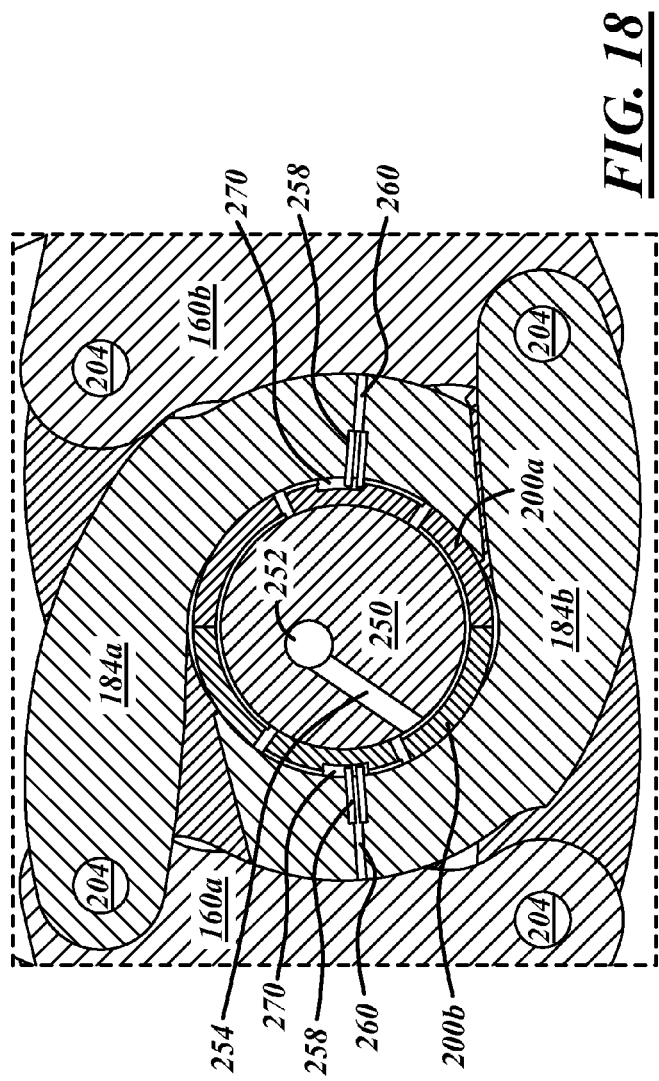

An alternative arrangement to restrict the movement of the shell bearing portions is illustrated in FIGS. 16-18. In FIG. 16, a detail of the crank connection is shown. The position of the pistons that relates to the position shown in FIG. 16 is identical to that shown in FIG. 12, i.e., pistons in the left cylinder are at, or near, TDC; and pistons in the right cylinder are at, or near, BDC. Shell bearing portions 200*a* and 200*b* each have a slot 270 defined in the outside convex surface. Hollow pins 258 are inserted in oil passages 260 and extend inwardly toward shell bearing portions 200*a* and 200*b* so that they engage with slots 270. The angle of the circumference of shell bearing portions 200*a* and 200*b* over which slots 270 extend is related to the relative movement of pullrods 160*a* and 160*b* as they rotate. (Axes of pullrods 160*a* and 160*b* are roughly collinear in FIG. 12; the axes of pullrods 160*a* and 160*b* have a relative angle of about 170 degrees in FIG. 14.) In FIG. 16, shell bearing portions 200*a* and 200*b* are displaced counterclockwise compared to their position as shown in FIG. 13. Their position, in FIG. 16, is displaced toward one end of travel with respect to slots 270. The pulling force acting through one of the pullrods 160*a* or 160*b* is greater than the force on the other pullrod thereby clamping the associated bearing cap against the associated shell bearing portion. The other shell bearing portion without so much clamping force rotates. Of course, movement of the clamped shell bearing portion is restricted by slot 270. Nevertheless, it is the uneven forces on the shell bearing portions that causes them to end up in a displaced position as in FIG. 15 rather than a neutral position with the interfaces between the shell bearing portions being vertical as shown in FIG. 13.

In FIG. 17, the engine is shown at a position in which the pistons in the left cylinder are at 90 degrees after TDC and the pistons in the right cylinder are at 90 degrees before TDC. A small portion of each of the pushrods 264 is visible in this position.

In FIG. 18, a detail of the crank connection related to FIG. 17 is shown. Pin 258 that engages with shell bearing portion 200*a* is at one end of slot 270. However, pin 258 that engages with shell bearing portion 200*b* is at an intermediate position between the ends of slot 270. Shell bearing portions 200*a* and 200*b* shuttle back and forth, although rotating in concert, depending on the positions of pullrods 160*a* and 160*b* and the forces acting between shell bearing portions and their associated bearing cap.

A flowchart indicating a method to assemble the configuration of FIG. 3 is shown in FIG. 19. In block 400, bearing shell portions are placed over the crankshaft journal and fastened together. In other embodiments not requiring it, the bearing shell portions are not fastened together, i.e., simply placed over the journal. In block 402, the bearing shell portions are placed over the bearing caps with the fingers of the bearing caps meshing. In block 404, flanges of one of the pullrods are aligned with one of the bearing caps with the through holes aligning with the bolt holes. In block 406, three bolts are inserted through the three through holes and then engaged with the three threaded holes. In block 408, the other pullrod is aligned with the other bearing cap. In block 410, the pullrod is bolted to the bearing cap with bolts inserted through the through holes and engaged with the threads in the threaded holes.

A flowchart indicating a method to assemble the configuration of FIG. 5 is shown in FIG. 20. In block 420, bearing shell portions are placed over the crankshaft journal and fastened together. In block 422, bearing caps are placed over the bearing shell portions with the fingers of the bearing caps meshing. The pin, or pins, of the bearing caps are engaged with the pilot hole or grooves in the bearing shell portions, as appropriate. The orifices of one of the pullrods are aligned with the orifices of one of the bearing caps in block 424. In block 426, pins are installed through the aligned orifices. The pins are secured in the aligned orifices. In block 428, the orifices of the other of the pullrods are aligned with the orifices of the other of the bearing caps. In block 430, pins are installed through the aligned orifices and secured.

Pushrod Disclosure

Figure 21:
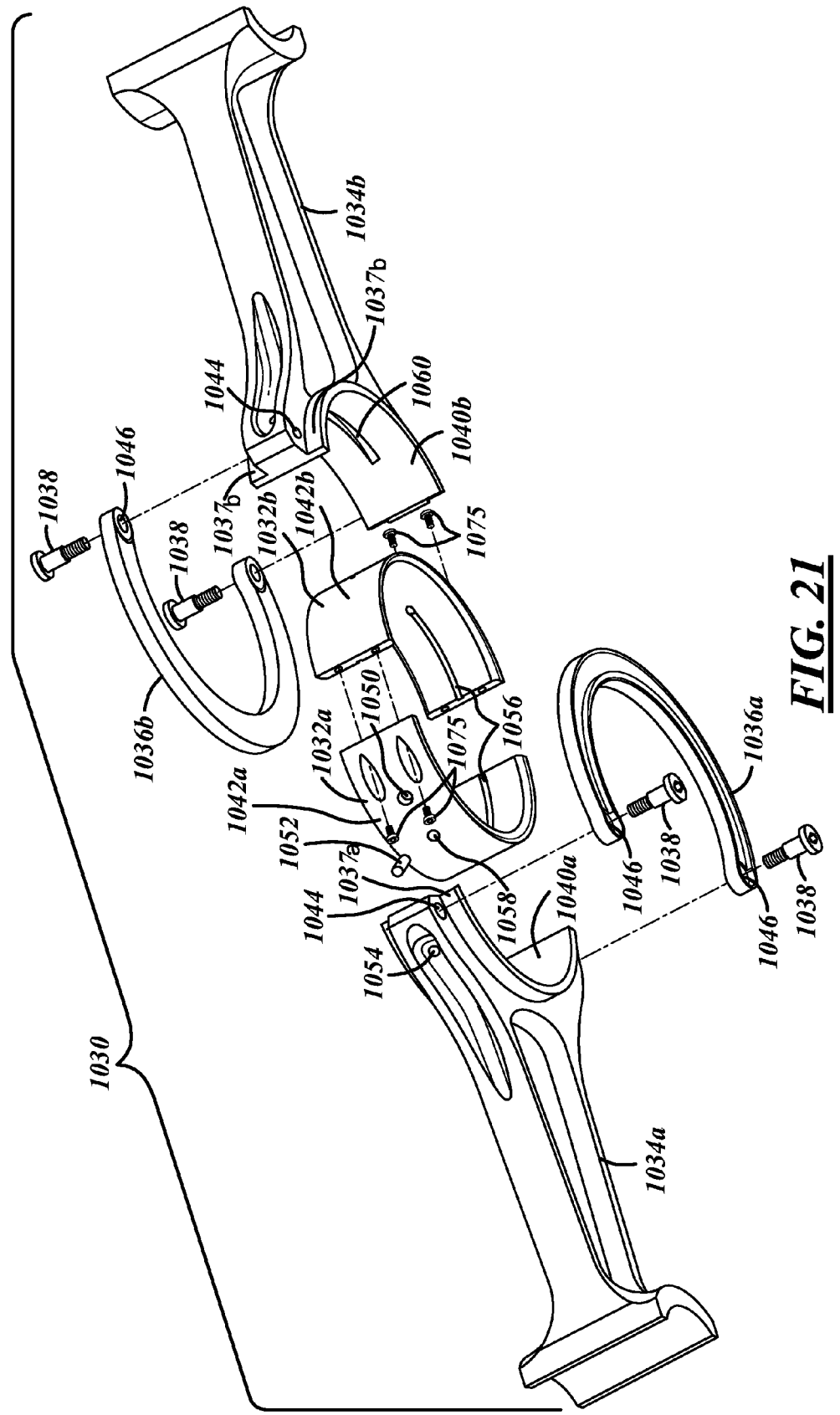
FIG. 21 is an exploded view of a pushrod assembly according to an embodiment of the present disclosure.

An exploded view of a configuration a pushrod assembly 1030 in which two pushrods are capable of being coupled to one journal is shown in FIG. 21. Bearing shell portions 1032a and 1032b couple together around a journal (not shown). Concave surfaces 1040a and 1040b of pushrods 1034a and 1034b nest with convex surfaces 1042a and 1042b of bearing shell portions 1032a and 1032b. Pushrods 1034a and 1034b are held in place by retainers 1036a and 1036b with retainer 1036a coupling with pushrod 1034a via screws 1038 coupling through orifices 1044 of pushrod 1034a and orifices 1046 of retainer 1036a. Retainer 1036a is horse-shoe shaped with the ends coupling with pushrod 1034a and the circular portion nesting with a shoulder 1037b on pushrod 1034b. Similarly, retainer 1036b nests with a shoulder 1037a on pushrod 1034a. The width, W, of pushrod 1034b along the length of the pushrod is wider than the width, Y, near the tips of the concave surface 1040b. The narrower width, Y, accommodates the installation of the retainers, one of which is affixed with pushrod 1034b and one of which engages on shoulder 1037b of pushrod 1034b.

In an alternative embodiment, both retainers 1036a and 1036b are screwed to one of the pushrods, e.g., 1034b. In such embodiment, the U-shaped portions of the retainers 1036a and 1036b ride on the two shoulders 1037a and 1037b associated with the other of the pushrods 1034a. An exploded view of such an embodiment would appear nearly identical as that shown in FIG. 21 except that retainer 1036a is rotated with the opening of the horse-shoe shape pointing in the same direction as retainer 1036b.

Each of pushrods 1034a and 1034b, as shown in FIG. 21, have two shoulders 1037a and 1037b, i.e., one facing toward the front of FIG. 21 and one on the back side with respect to the view in FIG. 21. An alternative pushrod arrangement is to have only one shoulder on each of the pushrods, i.e., to cooperate with one retainer each. In such a configuration, pushrod 1034a would have only the shoulder on the back side; and pushrod 1034b would have only the one shoulder on the front side as viewed in FIG. 21. Such a configuration reduces the number of machining operations.

In one embodiment, an orifice 1054 is formed in pushrod 1034a that can align with a pilot hole 1050 provided in bearing shell portion 1032a when the two are nested. A pin 1052 or dowel is press fit into orifice 1054 and indexed with pilot hole 1050, upon assembly, to prevent relative movement of bearing shell portion 1032a and pushrod 1034a. In such an embodiment, pushrod 1034b moves relative to bearing shell portion 1032b. So that pushrods 1034a and 1034b are identical, orifice 1054 can be formed in both; however, no dowel or other pin is inserted in orifice 1054 associated with pushrod 1034b.

Oil grooves 1056 are provided on concave surfaces of bearing shell portions 1032a and 1032b. Orifices 1058 are provided through bearing shell portions 1032a and 1032b to provide lubrication to the convex side of the bearing shell portions 1032a and 1032b. Oil grooves 1060 are provided on the concave surfaces 1040a and 1040b of pushrods 1034a and 1034b. Oil grooves 1056 and 1060 extend circumferentially along the surfaces, but for only a portion of the circumference.

Figure 22:
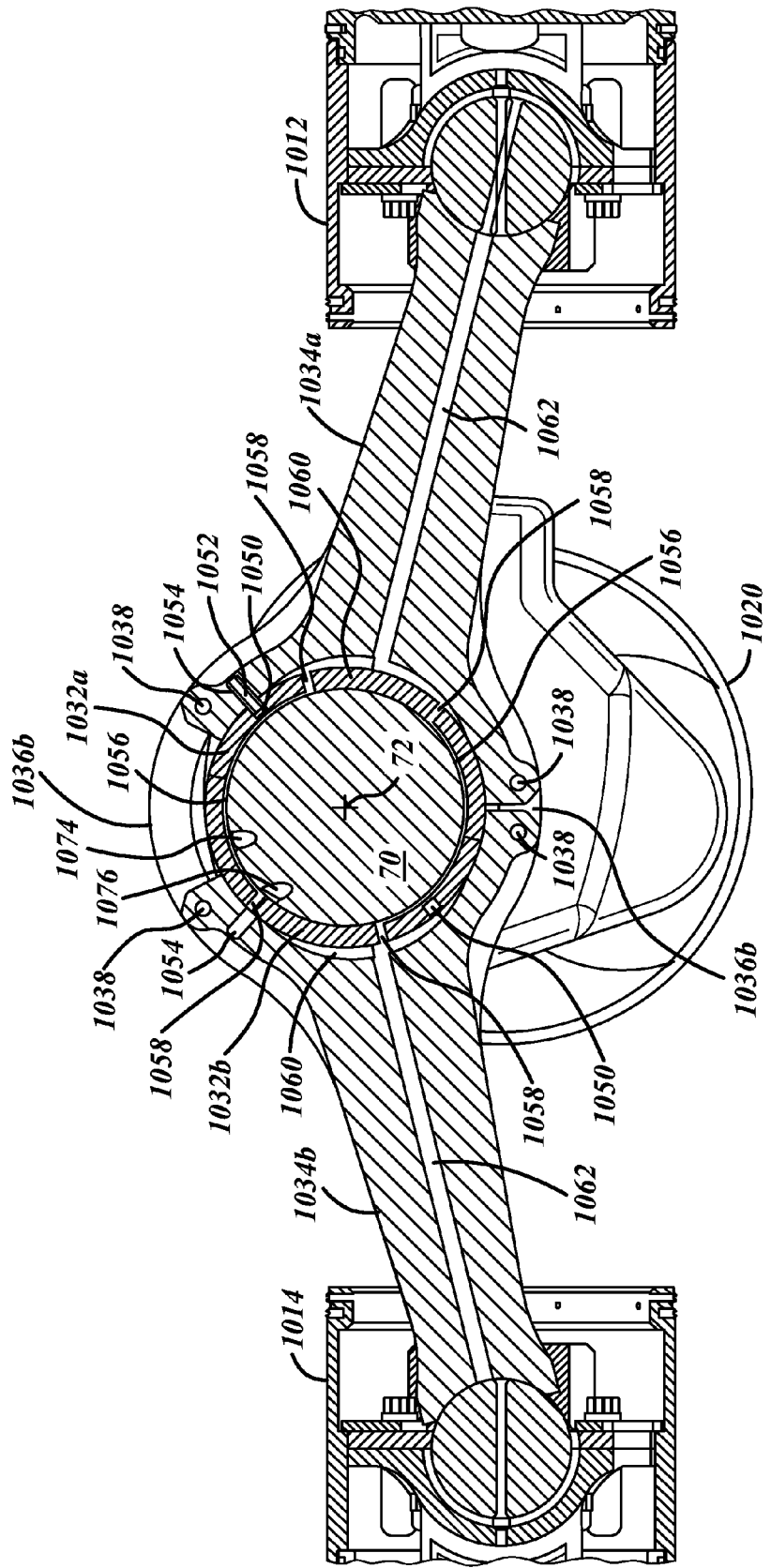
FIG. 22 illustrates a cross section of the pushrod-to-crankshaft assembly of FIG. 21 as assembled.

In FIG. 22, an assembled, inner connecting rod arrangement is shown in cross section. Bearing shell portions 1032a and 1032b encircle journal 1070 having a central axis 1072; journal 1070 is a portion of crankshaft 1020. Concave surfaces of pushrods 1034a and 1034b nest with convex surfaces of bearing shell portions 1032a and 1032b. Pushrods 1034a and 1034b connect on one end to pistons 1112 and 1114, respectively. During operation of the engine, pushrods 1034a and 1034b are almost exclusively pushed toward journal 1070. However, to protect for the unusual event of the pushrods 1034a and 1034b being pulled, retainers 1036a (not shown in this cross section) and 1036b are provided and secured via screws 1038.

Pushrod 1034a is pinned to bearing shell portion 1032a via a pin 1052 inserted in pilot hole 1050 in bearing shell portion 1032a and orifice 1054 in pushrod 1034a.

Lubrication for the inner connecting rod assembly is provided through the crankshaft 1020. A cross section through journal 1070 of crankshaft 1020 journal 1070 shows there are two drillings forming oil passages 1074 and 1076. Oil is provided to the bearing shell to journal interface and is carried to the pushrod to bearing shell interface through orifices 1058 to grooves 1060. Oil is further provided to the end of the pushrods proximate the pistons through drillings 1062.

An isometric drawing of bearing shell portions 1032a and 1032b in an exploded view is shown in FIG. 23. Bearing shell portions 1032a and 1032b are fastened by screws 1072 that pass into through holes 1076 which are large enough to accommodate heads of screws 1072 and into threaded holes 1074. Oil grooves 1056 are provided in concave surfaces 1040a and 1040b. Oil supply to lubrication grooves 1060 is provided through orifices 1058. Oil supplied to oil grooves 1060 passes through oil holes 1058 to the convex surfaces 1080 of the bearing shell portions 1032a and 1032b.

In alternative embodiment illustrated in FIG. 24, bearing shell portions 1081a and 1081b have interlocking fingers at one end with holes 1084 through fingers so that a pin 1082 may be inserted through the holes. In one embodiment, bearing shell portions 1081a and 1081b are installed on a journal of a crankshaft with the crankshaft having material on either side of the journal so that pin 1082 cannot slide out. In other embodiments without features holding the pin in place, the pin may have a head on one end and a snap ring on the other end. Alternatively, the pin may be secured by snap rings in an internal fashion. Any suitable way of securing the pin can be used.

FIGS. 23 and 24 illustrate bearing shell portions that are fixed together. This ensures that the lubrication passes through the lubrication grooves, as described below. If the pushrod is always in compression then there is no need to secure the bearing shell portions to each other as forces in the system cause the bearing shell portions to remain pressed against the journal. Thus, in one embodiment, there are no screws or pins holding the two together. In assembly, the bearing shell portions can be held onto the journal by a thicker oil or grease until pushrods and retainers are installed. Even in a system with momentary instances of a loss of the pressure, it may be possible to withstand such short durations with a momentary loss of oil flow thereby also allowing the bearing shell portions to be installed without the screws or pins.

In FIG. 25, an alternative embodiment is shown in which the bearing shell portions 1132a and 1132b are allowed to float. In such embodiment, bearing shell portions 1132*a* and 1132*b* have tabs 1138 that extend outwardly. Bearing shell portions 1132*a* and 1132*b* cannot float completely freely as they are kept between pushrods 1134*a* and 1134*b*. In FIG. 25, pushrods 1134*a* and 1134*b* are shown at a position at which the pushrods are the farthest away from being aligned. Above journal 1070, a large gap between pushrods 1134*a* and 1134*b* is open. A significant section of retainer 1036*b* can be seen. Tabs 1138 that are above journal 1070 (in the configuration illustrated in FIG. 25) are not restrained by the pushrods. However, tabs 1138 that are below journal 1070 are restrained by the pushrods. As crankshaft 1020 rotates the upper portions of the pushrods close up until they restrain tabs 1138 located above the journal.

Figure 26:
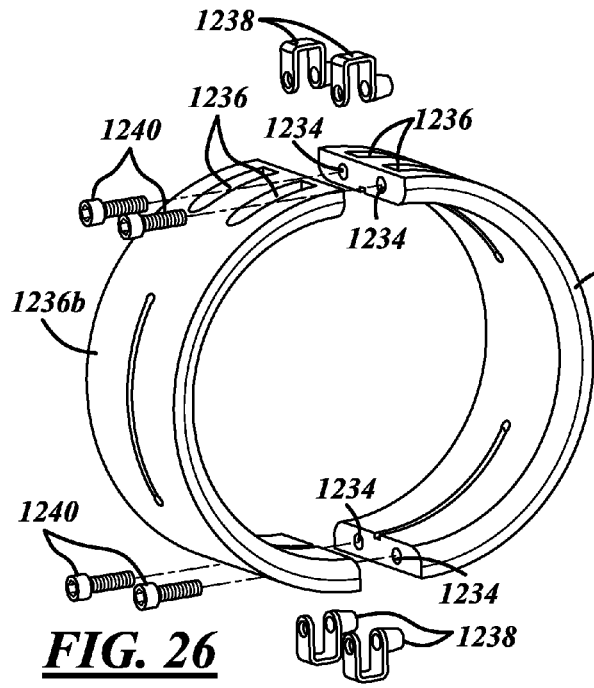
FIG. 26 is an embodiment of the bearing shell portions in an exploded view.

An alternative embodiment of bearing shell portions 1232*a* and 1232*b* is shown in FIG. 26 in an exploded view. Bearing shell portions 1232*a* and 1232*b* are provided with orifices 1234 and grooves 1236. Bolts 1240 engage with clips 1238 and are aligned with orifices 1234 to secure bearing shell portions 1232*a* and 1232*b* together. In this embodiment, clips 1238 are U shaped with one side of the U having a through hole that aligns with one of the orifices 1234 of one of the bearing shell portions. The other end of clip 1238 has a threaded portion with which threads of bolt 1240 engage as shown in an assembled view in FIG. 27. An end view of the assembled bearing shell portions in FIG. 28 show that clips 1238 extend outwardly from bearing shell portions 1232*a* (not visible in FIG. 28) and 1232*b*.

Figure 29:
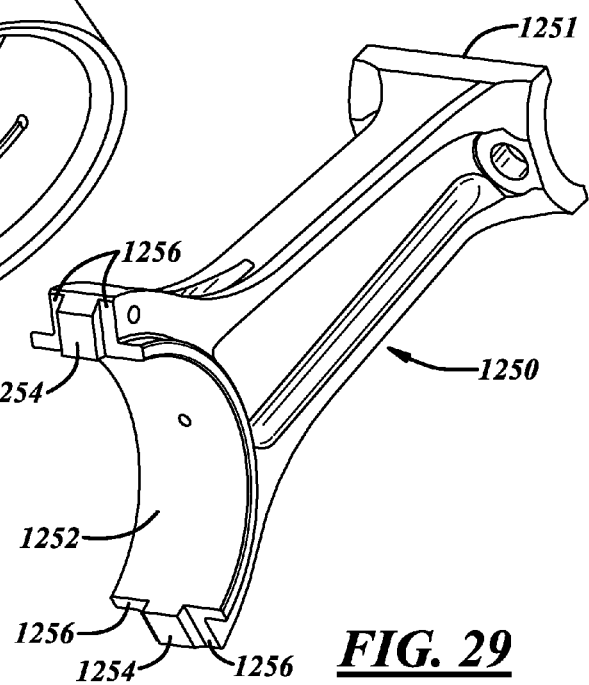
FIG. 29 is a pushrod according to one embodiment of the disclosure.
Figure 30:
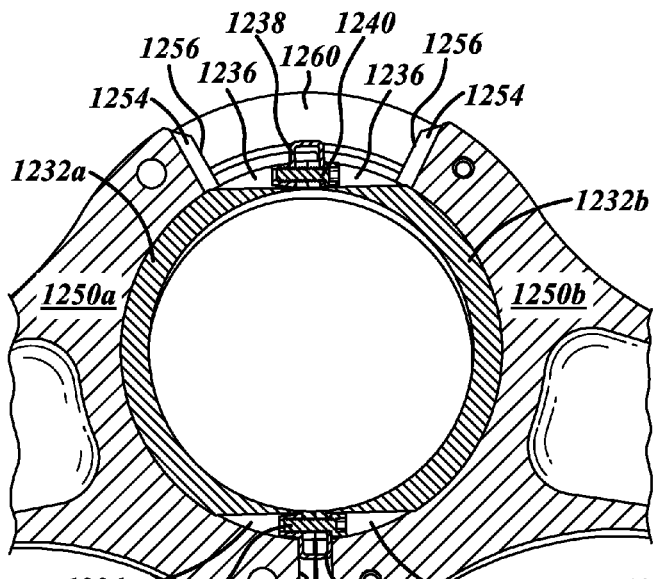
FIG. 30 is the pushrod of FIG. 29, the bearing shell portions of FIGS. 26-28, and retainers.

A pushrod 1250 is shown in FIG. 29. A first end 1251 couples to a piston (not shown). A concave surface 1252 of pushrod 1250 nests with a convex surface of one of the bearing shell portions. On either end of concave surface 1252 recesses 1256 are formed on either side of a protrusion 1254. Recesses 1256 are provided to allow space for clips 1238, as can be seen in FIG. 30. In FIG. 30, portions of pushrods 1250*a* and 1250*b* are shown coupled onto bearing shell portions 1232*a* and 1232*b*. Pushrods 1250*a* and 1250*b* are held together via retainers 1260. Pushrods 1250*a* and 1250*b* are shown in one extreme position where the U portion of the lower of the two clips 1238 fits between the ends of pushrods 1250*a* and 1250*b*, i.e., the space opened up by recesses 1256. The protrusions 1254 of the two pushrods nearly touch in this position. As pushrods 1250*a* and 1250*b* move toward the other extreme position, bearing shell portions are allowed to float, although constrained between the recesses 1256.

The embodiment of the pushrod illustrated in FIG. 29 has a protrusion 1254 between recesses 1256. Alternatively, there is no such protrusion and the ends are at the height of the recesses 1256. Such an embodiment is easier to machine at the expense of a portion of the bearing surface. In applications in which bearing surface area is important the embodiment in FIG. 29 or similar to such embodiment may be used. In other applications, the simpler shape without the protrusion may be used.

Figure 28:
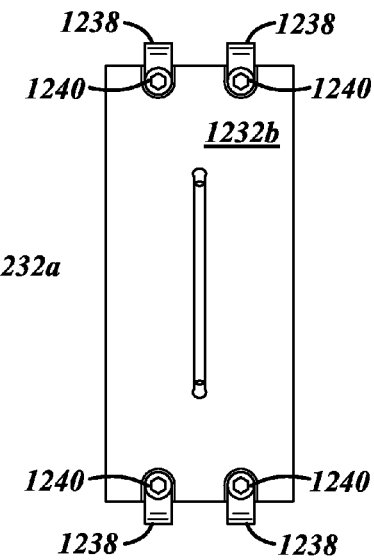
FIGS. 27 and 28 are a perspective view and a side view of the embodiment of FIG. 26 as assembled.
Figure 27:
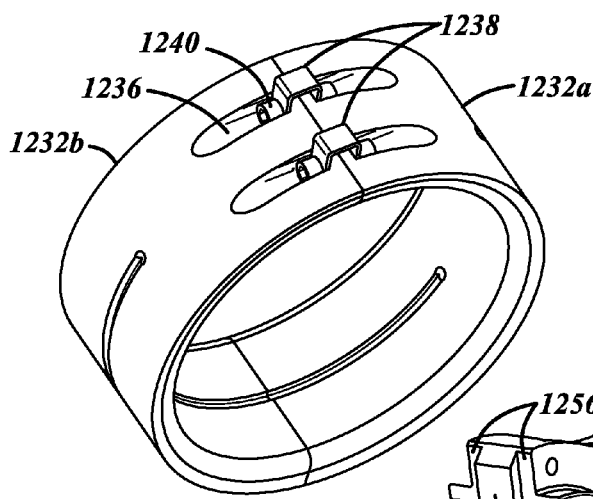

The embodiment shown in FIGS. 26-28 utilizes four clips 1238. In an alternative embodiment, two clips are provided at one end of the bearing shell portions with the other end of the bearing shell portions coupled such as is shown in FIG. 23 or 24. In another alternative embodiment, one clip is provided at each end of the bearing shell portions with the recesses provided accordingly. In yet another embodiment, only one clip is provided at one end of the bearing shell portions.

Figure 31:
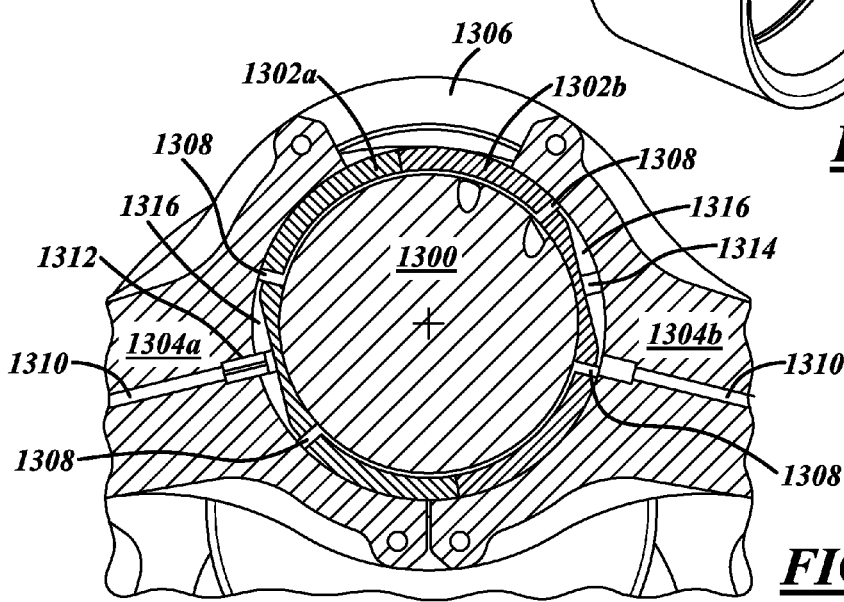
FIG. 31 is an embodiment of a pushrod to journal connection according to an embodiment of the present disclosure.

In FIG. 31, a journal 1300 has bearing shell portions 1302*a* and 1302*b* coupled thereto. Pushrods 1304*a* and 1304*b* nest with bearing shell portions 1302*a* and 1302*b*. Retainers 1306 are attached to pushrods 1304*a* and 1304*b*. Bearing shell portions 1302*a* and 1302*b* have oil holes 1308 to provide oil to the back side. Pushrods 1304*a* and 11304*b* have oil passages 1310 that are provided oil via holes 1308. At the end of the oil passages proximate journal 1300, the passage may be greater in diameter and a hollow pin 1312 is placed in oil passage 1310 of one of the pushrods, 1304*a* in FIG. 31. Pin 1312 engages with pilot hole 1314 in the back side of bearing shell portion 1302*a*. Such a pilot hole is provided also in bearing shell portion 1302*b* to maintain consistent parts. A groove 1316 is provided in bearing shell portion 1302*a* to ensure that oil flows through pin 1312 and into passage 1310. Again, such a groove 1316 is provided in bearing shell portion 1302*b* even though not strictly necessary.

Figure 32:
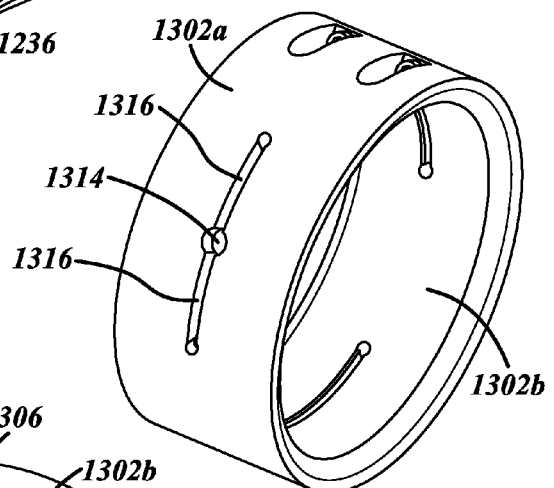
FIG. 32 is a perspective view of the bearing shell portions of FIG. 31.

In FIG. 32, bearing shell portions 1302*a* and 1302*b* are shown assembled and in a perspective view. Groove 1316 is narrower than pilot hole 1314. Pin 1312 of FIG. 31 remains fixed by pilot hole 1314 and cannot move into groove 1316.

Figure 33:
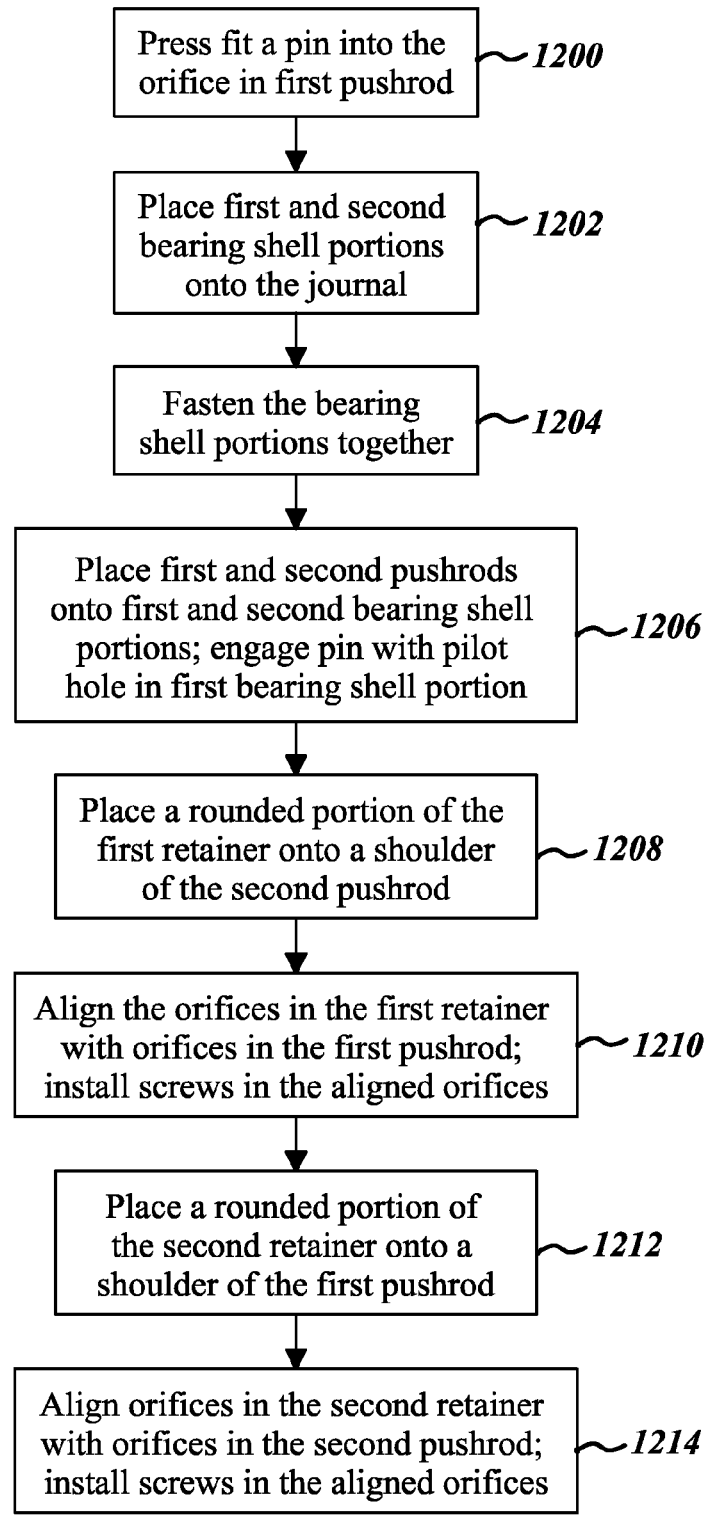
FIG. 33 is a flowchart indicating a method to assemble the connecting rods with the crankshaft.

A flowchart indicating a method to assemble the configuration of FIG. 22 is shown in FIG. 33. In block 1200, pin 1052 is press fit into orifice 1054 of the first pushrod. In block 1202 first and second bearing shell portions are placed onto the journal. In 1204, the bearing shell portions are fastened together. The first and second pushrods are placed onto first and second bearing shell portions in 1206 with pin 1052 engaging with pilot hole 1050 in the first bearing shell portion. A rounded portion of a first of the two retainers is engaged with a shoulder on the second pushrod in 1208. Orifices in the tips of the first retainer are aligned with orifices in the first pushrod in 1210; screws are installed in the aligned orifices. Similarly, a rounded portion of the second retainer is engaged with a shoulder of the first pushrod in 1212. In 1214, orifices in the second retainer are aligned with orifices in the second pushrod so that screws can be installed in the aligned orifices.

In embodiments in which both bearing shell portions are allowed to float with respect to the pushrods, the portions of the flowchart in FIG. 33 in which pin is press fit into the pushrod, block 1200, and the pin is engaged with the orifice in the bearing shell portion, i.e. part of block 1206, are obviated.

Engine Balancing

Embodiments of pushrod and pullrod configurations that allow a collinear arrangement of the cylinders with a unitary crankshaft are described above. Such a configuration has the intake pistons and the exhaust piston symmetrically arranged. As will be described below, such symmetric arrangement presents some advantages, such as: lower part count and shorter exhaust duct length when the exhaust pistons are the inner pistons. One small disadvantage presented by such an arrangement is that the nearly perfect balancing of the OPOC engine with asymmetrical piston arrangement is disturbed. The imbalance, as will be shown below, that is introduced by the symmetrical piston arrangement, is modest when compared to a conventional four-stroke engine. However, for some applications, it may be desirable to overcome the imbalance. In the following, measures that can be taken to overcome the imbalance are disclosed.

Figure 34:
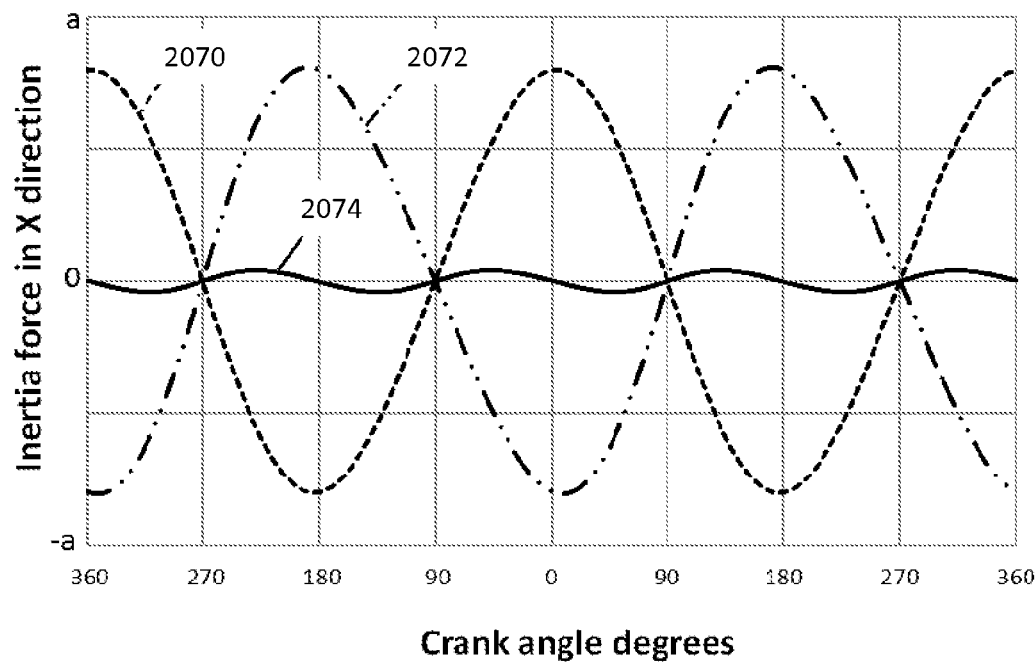
FIG. 34 is a graph of inertia forces due to the reciprocation of the pistons in the OPOC engine of FIG. 1.
Figure 37A:
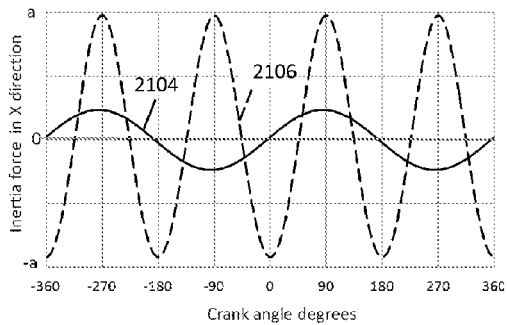
FIG. 37A is a graph showing inertia force in the X direction for the OPOC engine of FIG. 35 with no balancing measures compared with a conventional in-line, 4-cylinder diesel engine both at the same engine speed.

Referring again to FIG. 1, the movement of intake pistons 12, 12' is displaced from the movement of exhaust pistons 14, 14' such that the exhaust pistons precede the intake pistons in attaining their respective extreme positions by about 20 degrees. This is accomplished by asymmetrically orienting the eccentric journals on crankshaft 20 to which the pistons couple. By asymmetrically orientating the journals on crankshaft 20, the scavenging events are asymmetrically timed. The inertia forces, at a given engine speed, arising in the direction of reciprocation, X, is illustrated in FIG. 34 with the forces due to the outer pistons shown as dashed curve 70 and the forces due to the inner pistons shown as dash-dot-dot curve 72. The remaining inertia forces for all four pistons are shown as solid curve 74. If the timing of the pistons were not offset, there would be substantially no remaining imbalance. Even with the offset, though, the remaining imbalance is modest and much smaller than conventional engines, as will be discussed later in regards to FIG. 37A.

In FIG. 35, an OPOC engine 2050 in which the pistons are symmetrically arranged, i.e., with exhaust pistons 2052, 2052' inboard and intake pistons 2054, 2054' outboard, is shown. This arrangement facilitates short exhaust pipes into a turbocharger. Furthermore, the intake pistons can be identical, the exhaust pistons can be identical, and the right and left cylinder liners can be identical to reduce the number of unique parts in the engine and to reduce the engineering design and verification effort. However, one disadvantage of the piston configuration as shown in FIG. 35 is that the balance is disturbed slightly compared to engine 10 of FIG. 1 in which the pistons are asymmetrically arranged (as shown in FIG. 34, imbalance in the OPOC engine of FIG. 1 is slight). As will be discussed in more detail below, however, even the resulting imbalance in the engine configuration of FIG. 35 is small compared to a conventional in-line engine. Nevertheless, balance of the OPOC engine with symmetrical piston arrangement of FIG. 35 is degraded in comparison to the OPOC engine 10 in FIG. 1 with asymmetrical piston arrangement.

Due to the offset timing of the exhaust and intake pistons, for a short duration of crank rotation, in any of the cylinders in FIGS. 1 and 35, the two pistons move in the same direction. In engine 10, when the pistons in the left cylinder both move to the left, the pistons in the right cylinder both move to the right and vice versa. Such is not the case for engine 2050 in FIG. 35. For a short duration, pistons 2052', 2054' in the left cylinder of engine 2050 move in the same direction and pistons 2052, 2054 in the right cylinder move in the same direction as pistons 2052', 2054', thereby creating the unbalance.

Figure 36:
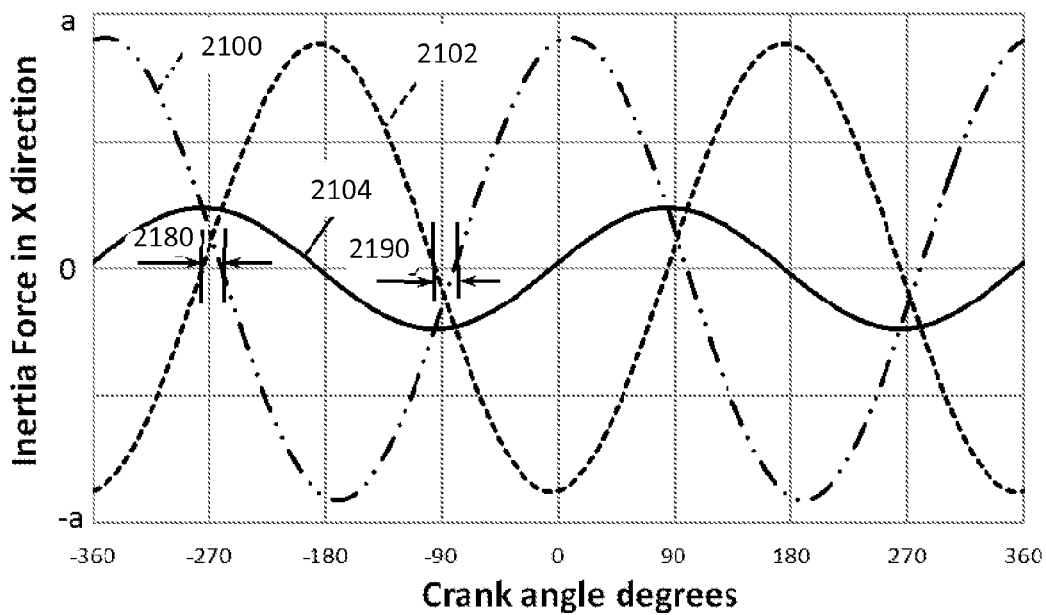
FIG. 36 is a graph of inertia forces due to the reciprocation of the pistons in the OPOC engine of FIG. 35 with no balancing measures.

The inertia force in the X direction due to the pistons' reciprocal movement in engine 2050 is shown in FIG. 36. The inertia force due to reciprocation of exhaust pistons 2052, 2052' (at same engine speed of FIG. 34) is shown as curve 2100. The inertia force of intake pistons 2054, 2054' at that same engine speed is shown as dashed curve 2102. In region 2080, at about −270 degrees crank angle, the inertia forces of both the pair of intake (outer) pistons and the pair of exhaust (inner) pistons are acting in the same direction (negative direction). In region 2090, at about −90 degrees crank angle, the inertia of both pistons is once again acting in the same direction (positive). The resultant inertia force from all the pistons is shown in FIG. 36 as solid curve 2104. Thus, although the inertia forces due to intake pistons 2054, 2054' largely cancel the inertia forces due to exhaust pistons 2052, 2052', a resultant unbalanced inertia force remains (curve 2104).

Although the resultant inertia forces 2104 of engine 2050 (FIG. 35) are greater than the nearly perfectly-balanced engine 10 (FIG. 1), the inertia forces 2104 are, nevertheless, small compared to conventional engines. Resultant inertia forces 2104 are plotted in FIG. 37A on the same scale as the graph in FIG. 36. Dashed curve 2106 is the unbalanced inertia force for a comparable inline four-cylinder engine at the same engine speed. OPOC engine 2050 has about one-quarter of the unbalanced inertia forces compared to that of a conventional in-line, four-cylinder engine. The imbalance in OPOC engine 2050 is a first-order imbalance, i.e., at crankshaft speed. The inertia force imbalance in the conventional, I-4 engine is of second order, i.e., the imbalance has two periods in 360 crank degrees. Although the inertia force imbalance for the OPOC engine 2050 with symmetrically-arranged pistons is quite small, there are applications in which the least amount of imbalance is desired, e.g., aviation applications, in which measures to lower the imbalance may be desired.

Figure 37B:
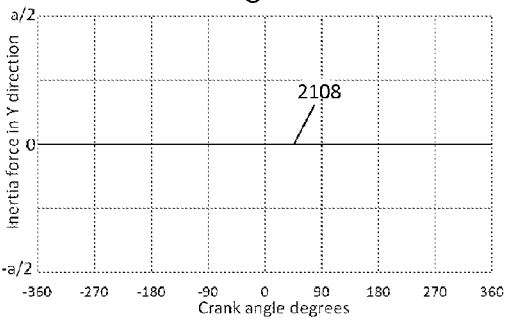
FIG. 37B shows the unbalanced force in the Y direction for the OPOC engine of FIG. 35 with no balancing measures.

There is no corresponding unbalanced inertia force in the Y direction for the unbalanced OPOC, as indicated by 2108 in FIG. 37B, thus a straight line.

Referring now to FIG. 35, to overcome at least a portion of the imbalance, counterweights can be applied to a crankshaft 2060. In one embodiment, separate counterweights are affixed to the crankshaft. Alternatively, crankshaft 2060 is designed such that the center of gravity is offset in relation to the axis of rotation. Due to the counterweighting, the center of gravity of crankshaft 2060 is located substantially on a plane 2056 perpendicular to the axis of rotation of the crankshaft (Z of FIG. 35) that includes the central axis (X of FIG. 35) of the two cylinders. The plane goes through the center journal. The counterweight can be made up of two smaller counterweights placed on the webs on either side of the center journal. In one embodiment, crankshaft 2060 is slightly oversized in the manufacture in the area needing counterweighting. Then, in the machining process, the crankshaft can be balanced as desired by removing additional material. The counterweight(s) are not easily noticed on crankshaft 2060 as it is part of the forged crankshaft, a unitary crankshaft. The discussion of forging the crankshaft and other machining processes are provided as an example and not intended to limit the disclosure.

An OPOC engine having offset cylinders, such as shown in FIG. 1, but with the pistons symmetrically arranged, such as shown in FIG. 35, is an alternative embodiment. In such embodiment, the plane on which the counterweight lies cannot be located along a central axis of the two cylinders as there is no one axis that is central to both cylinders. In such case, the plane in which the counterweight resides is between the two journals associated with the two pushrods (16 of FIG. 1).

Figure 38A:
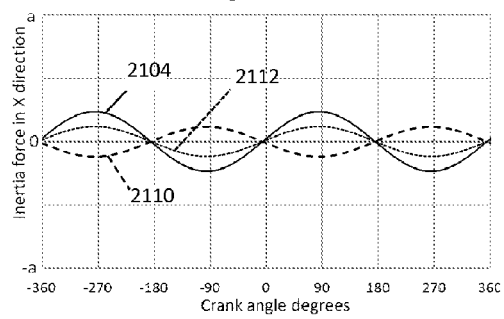
FIG. 38A is a graph of inertia force in the X direction for the unbalanced OPOC, the effects of adding a counterweight on the crankshaft; and the resulting unbalance after the counterweight is applied.
Figure 38B:
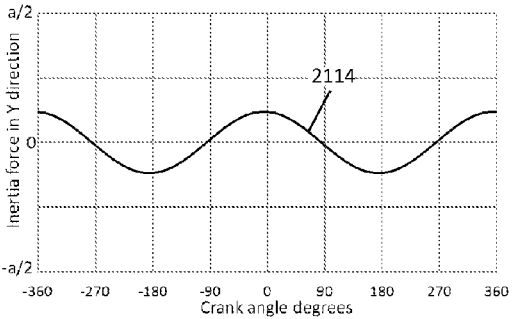
FIG. 38B is a graph of inertia force in the Y direction for the OPOC engine with a counterweight on the crankshaft.

The counterweights react against the unbalanced inertia force in the X direction as shown in FIG. 38A. The unbalance of the unbalanced engine is shown as curve 2104. Counterweights to overcome about half of the imbalance have an effect shown as dashed curve 2110. The resultant curve 2112 is the sum of curves 2104 and 2112. Although curve 2112 represents about a 50% improvement in remaining imbalance, the addition of counterweights on crankshaft 2060 cause an imbalance in the Y direction that was previously balanced, which is shown as curve 2114 in FIG. 38B. (The range in FIGS. 36, 37A, 38A, and 39A is −a to a and the range in FIGS. 37B, 38B, and 39B is −a/2 to a/2, the latter being a finer scale for illustration purposes.)

Figure 39A:
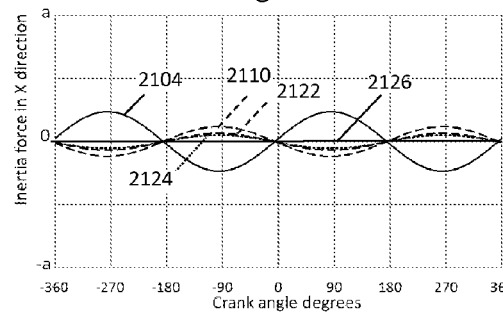
FIG. 39A is a graph of inertia force in the X direction for the unbalanced OPOC, the effects of adding a counterweight on the crankshaft and on engine accessories, and the resulting inertia forces when the counterweights are applied.

To overcome the inertial force in the Y direction that is introduced by the counterweight(s) on the crankshaft, counterweights may be added to accessories that rotate in the opposite direction, but as the same speed, as crankshaft 2060. Not only do such counterweights on the accessories overcome the Y-direction imbalance introduced by the counterweight(s) on the crankshaft, but the accessory counterweights also overcome the remaining inertial imbalance in the X direction as shown in FIG. 39A. Curve 2104 is the imbalance of the OPOC engine without balancing measures and curve 2110 shows the effect of the counterweighting of the crankshaft. Curves 2122 and 2124 show the effect of the counterweights on the accessories, each of which overcomes about half of the remaining imbalance 2112 of FIG. 38A. Summing up the effect of the imbalance and the counterweights on the crankshaft and the accessories yields no imbalance in the X direction, which is shown as curve 2126 in FIG. 39A.

Figure 39B:
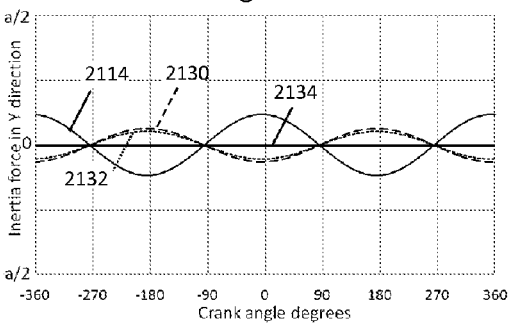
FIG. 39B is a graph of inertia force in the Y direction corresponding to the X direction inertia forces shown in FIG. 39A.

Referring to FIG. 39B, the imbalance in the Y direction is shown as curve 2114. The effects of the counterweights on the accessories cause imbalances 2130 and 2132. The resultant of all of the forces in the Y direction yields curve 2134. The result is a completely balanced engine in both the X and Y directions.

Figure 40:
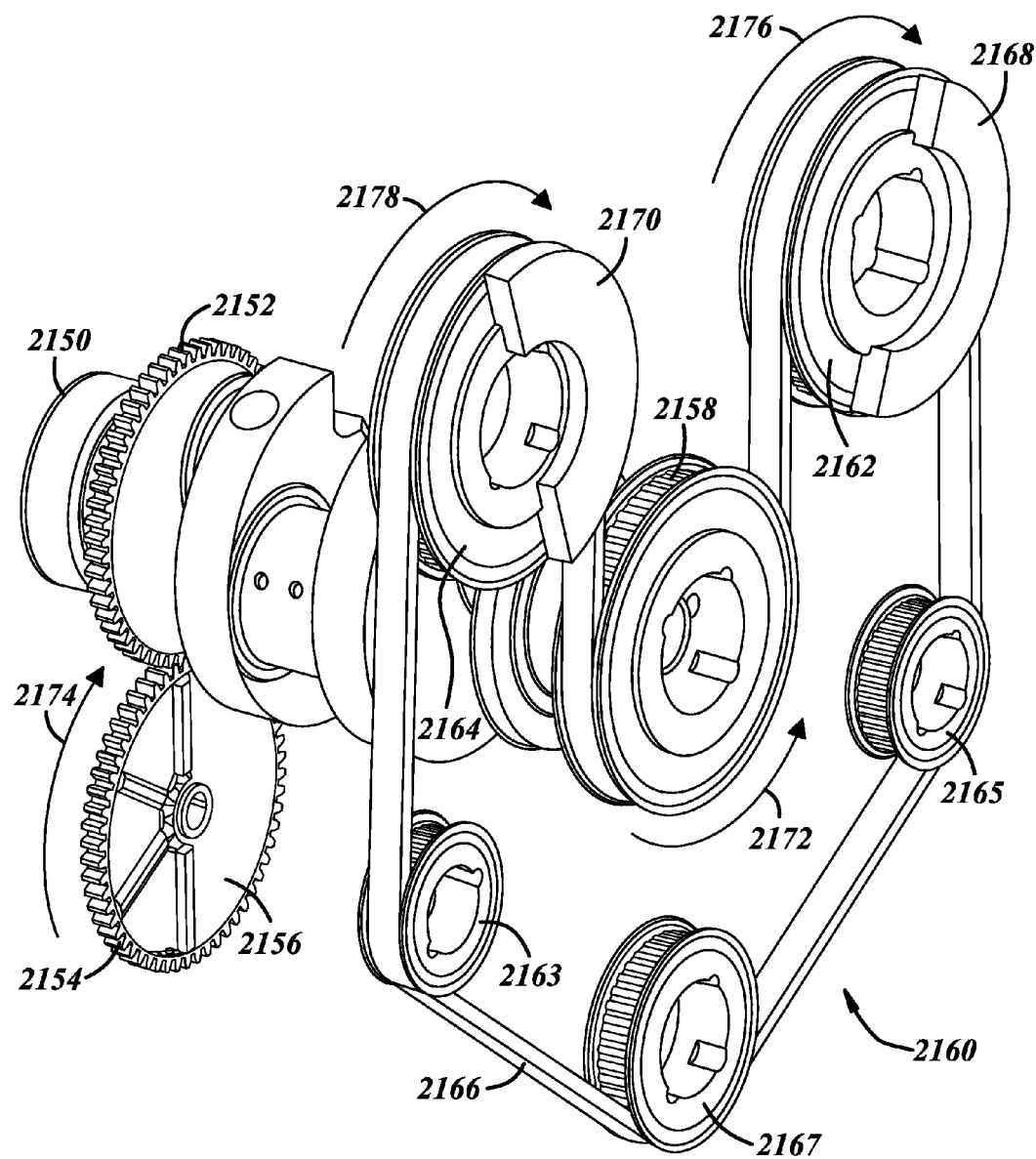
FIG. 40 is an isometric representation of an accessory drive according to one embodiment of the present disclosure.

In FIG. 40, an isometric representation of an accessory drive for an internal combustion engine is shown. Crankshaft 2150 has a gear 2152 that engages with a gear 2154 that couples to an oil pump or other accessory (not shown). A counterweight 2156 is coupled to gear wheel 2154. Crankshaft 2150 is also coupled to a pulley 2158 that is part of a front end accessory drive system 2160. A belt 2166 engages with multiple pulleys 2162, 2163, 2164, 2165, and 2167. Pulleys 2162, 2163, 2164, 2165, and 2167 may be coupled to additional accessories such as: an air-conditioning compressor, a power-steering pump, and a water pump. Some of the pulleys may be idler pulleys. Furthermore, at least one belt tensioner may be included in the system. A counterweight 2170 is applied to pulley 2164 and a counterweight 2168 is applied to pulley 2162. Pulleys 2164 and 2168 are the same diameter as pulley 2158 so that pulleys 2164 and 2168 counter rotate at crank speed. Gear 2154 has the same number of teeth as gear 2152 so that gear 2154 counter rotates at crankshaft speed.

Crankshaft 2150 rotates counter clockwise in FIG. 40 as shown by arrow 2172. Gear 2154, pulley 2162, and pulley 2164, rotate clockwise, as shown by arrows 2174, 2176, and 2178 thereby facilitating the counterweights associated with the gear and/or pulleys to counteract the imbalance created by the counterweighting of the crankshaft in the Y direction.

The counterweight(s) applied to crankshaft 2150 overcomes about one-half of the inertia force imbalance of the pistons in the X direction but introduces an inertia force imbalance in the Y direction. Counterweight 2156 on gear 2154 is sized to overcome about one-quarter of the inertia force imbalance due to reciprocation of the pistons in the X direction. And, because gear 2154 rotates in an opposite direction from crankshaft 2150, it overcomes about one-half of the Y direction imbalance introduced by a counterweight on crankshaft 2150. Counterweights 2168 and 2170 on pulleys 2162 and 2164, respectively, are sized to overcome about one-eighth of the inertia force imbalance due to reciprocation of the pistons. Again, because pulleys 2162 and 2164 rotate in the opposite direction of crankshaft 2150, they collectively overcome about one-half of the Y direction imbalance introduced by a counterweight on crankshaft 2150. The engine is balanced with the set of counterweights as described.

Figure 41:
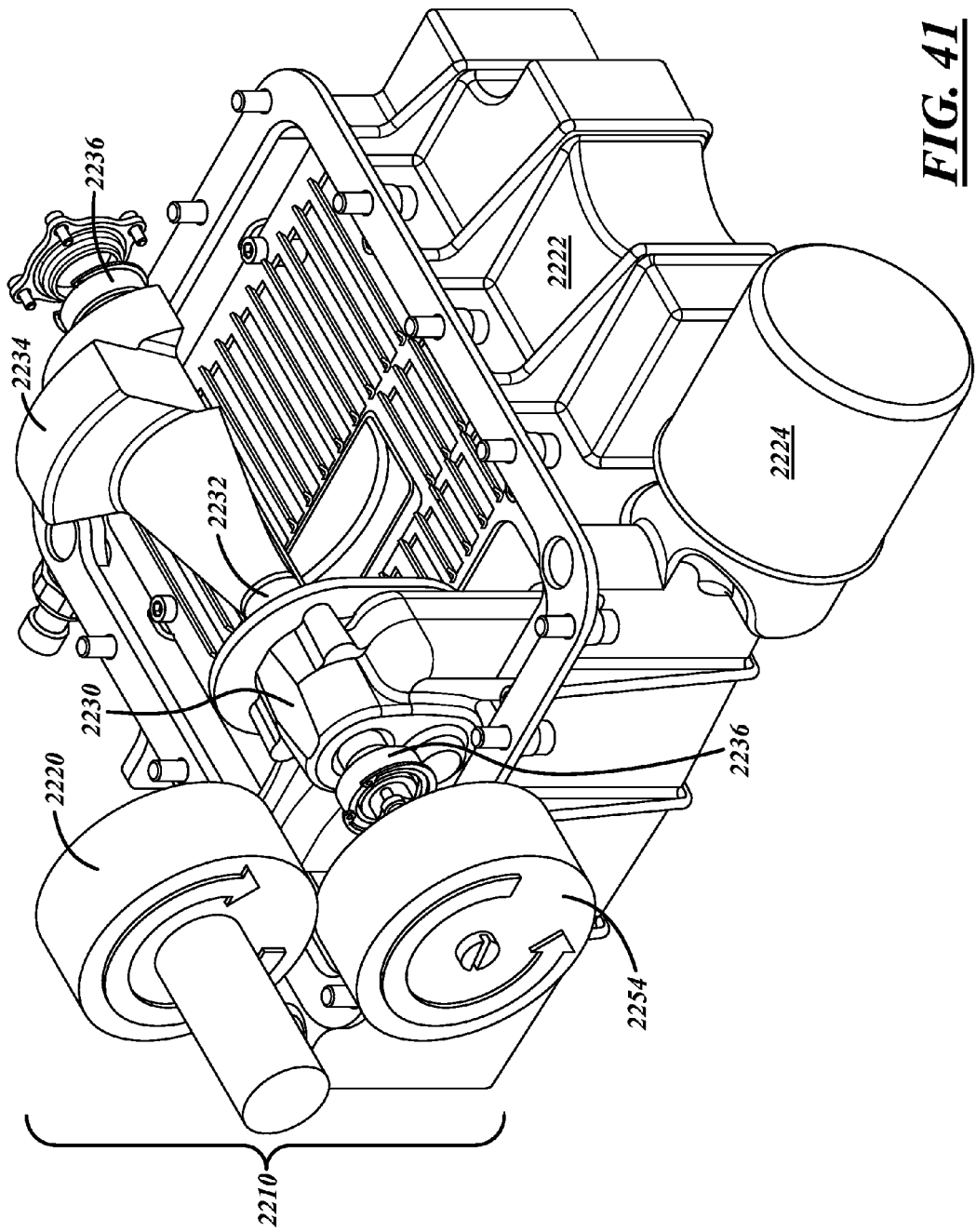
FIG. 41 is an isometric representation of a portion of an OPOC engine showing one embodiment of the present disclosure.

An alternative to putting counterweights on two accessories is shown in FIG. 41, in which a portion of an engine 2210 is shown. A crankshaft 2220 is shown rotating clockwise. A pulley 2254 is driven via belt or chain (not shown) by crankshaft 2220. Pulley 2254 is coupled to an oil pump 2230 and a shaft 2232 having a counterweight 2234. Alternatively, shaft 2232 has a plurality of counterweights distributed along the length of shaft 2232. Shaft 2232 is supported near the ends by bearings 2236. Counterweight 2234 is located between bearings 236. Pulley 2254 rotates at crankshaft 2220 speed so that counterweight 2234 can counterbalance a portion of the imbalance presented by the pistons in the X direction. Also, counterweight 2234 can counterbalance a portion, or all, of the imbalance presented by a crankshaft counterweight in the Y direction.

Figure 42:
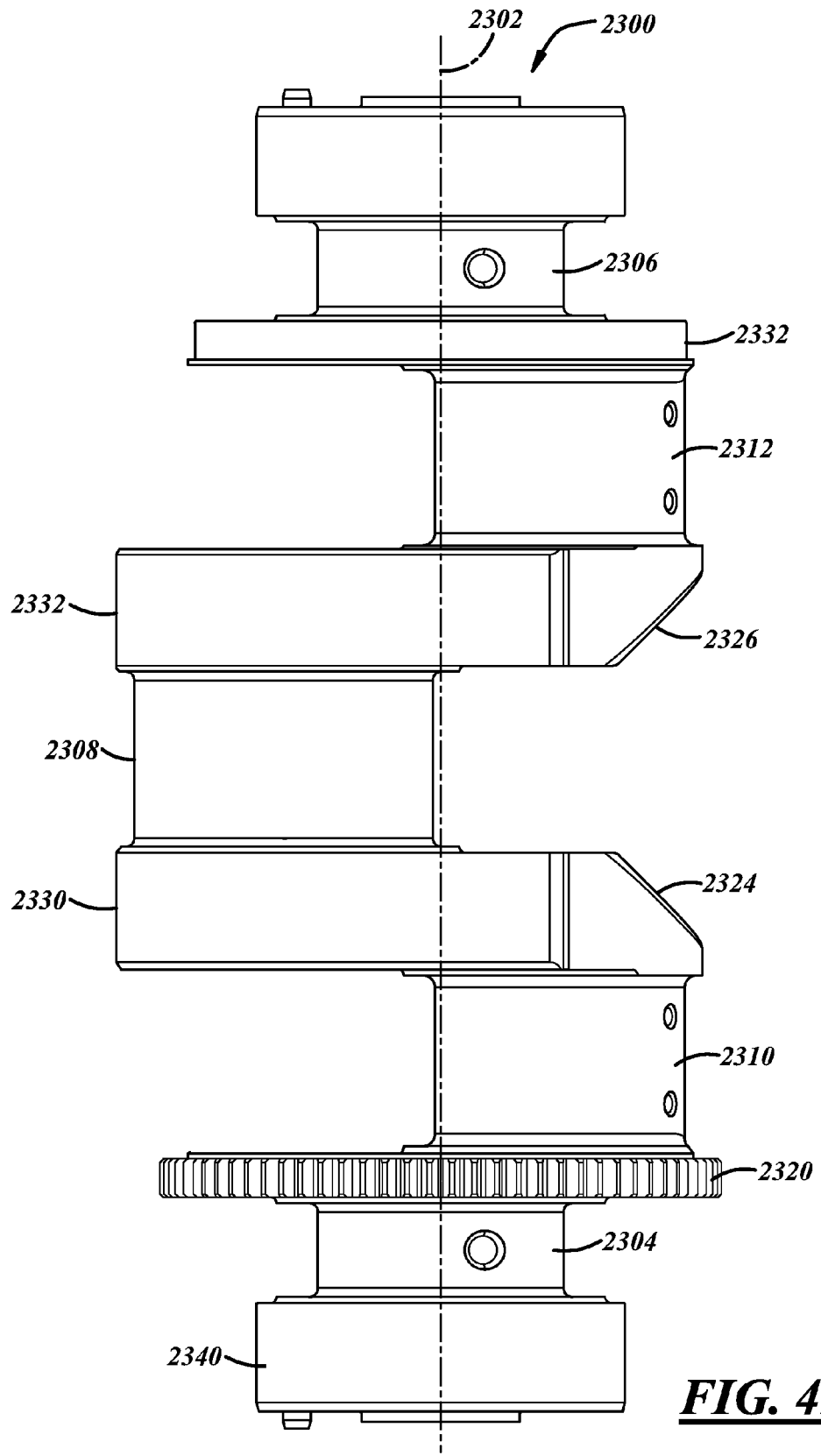
FIGS. 42, 43 and 45 each illustrate a different crankshaft, showing various embodiments of the present disclosure.

A crankshaft 2300 that rotates about axis 2302 according to an embodiment of the disclosure is shown in FIG. 42. Crankshaft 2300 has a front main bearing 2304 and a rear main bearing 2306. Crankshaft 2300 has three eccentric journals: center 2308, front 2310, and rear 2312. Between bearings are webs: front outer web 2320, rear outer web 2322, front inner web 2324, and rear inner web 2326. Web 2320 is machined into a gear which can be used to drive an accessory such as an oil pump. Counterweights 2330 and 2332 are included on webs 2324 and 2326, respectively. Crankshaft 2300 is a unitary structure in FIG. 42. Alternatively, counterweights 2330 and 2332 can be affixed to crankshaft 2300. Crankshaft 2300 is one in which the cylinders are collinear, such as the engine in FIG. 35. A front end 2340 of crankshaft 2300 can be used to mount a pulley or other rotating member.

Figure 43:
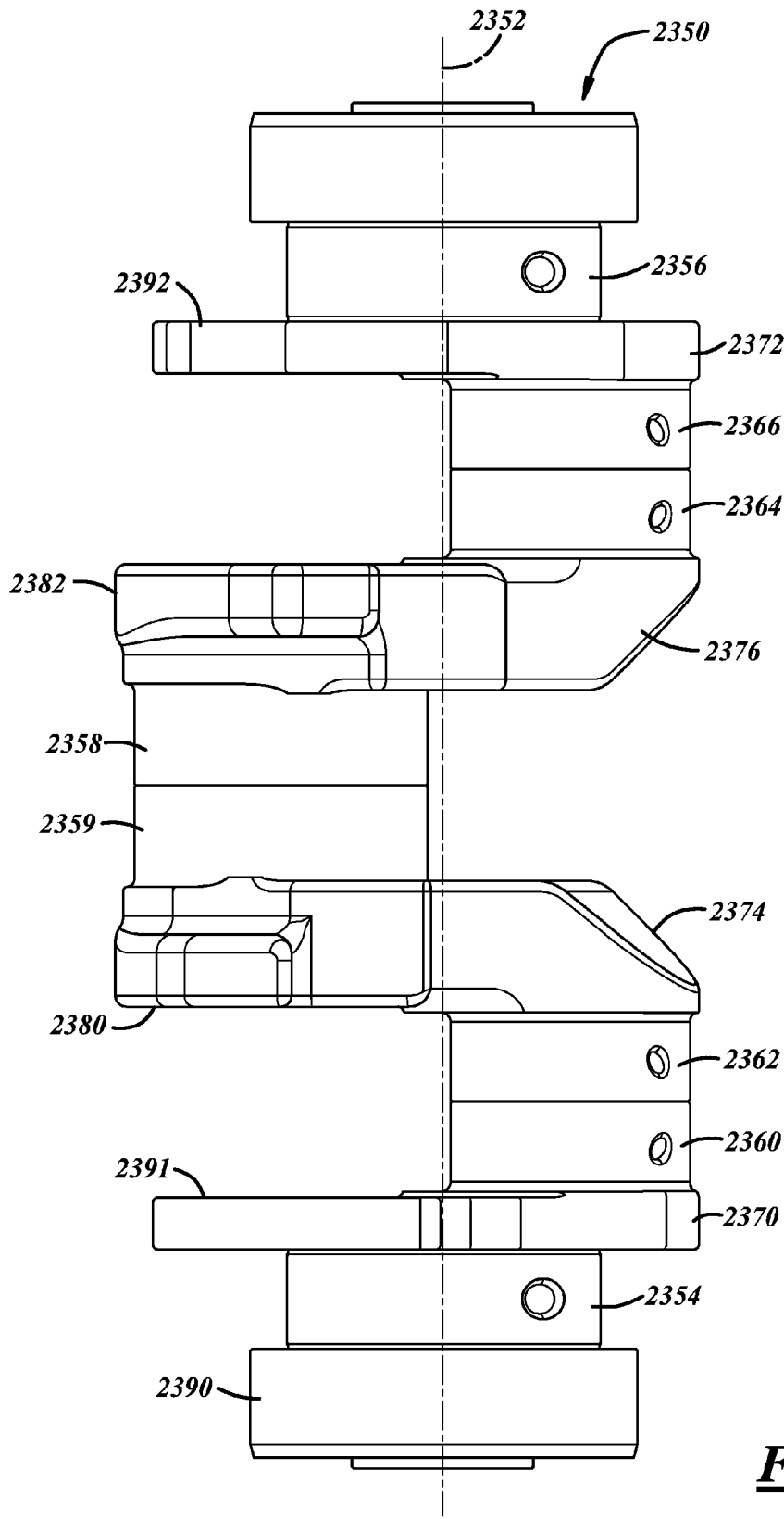

As described above, the present disclosure also applies to an engine in which the connecting rods couple to the crankshaft adjacent to each other, such as the engine in FIG. 1, except with the pistons arranged symmetrically. Such crankshaft 2350 rotating about axis 2352, shown in FIG. 43, has: a front main journal 2354 and a rear main journal 2356. In place of a single journal, crankshaft has two center eccentric journals 2358 and 2359. Similarly, there are two front eccentric journals 2360 and 2362 and two rear eccentric journals 2364 and 2366. Center eccentric journal 2358 is coupled to one of the pushrods and the other center eccentric journal 2359 is coupled to the other of the pushrods. Counterweights 2380 and 2382 are coupled to webs 2374 and 2376, respectively. In the embodiment in FIG. 43, counterweights 2391 and 2392 are included on front outer web 2370 and rear outer web 2372, respectively. The total counterweight of crankshaft 2350 is made up of the sum of counterweights 2380, 2382, 2391, and 2392. In one alternative, crankshaft 2300 of FIG. 42 is provided with four counterweights on the four webs, such as shown in FIG. 43. In another alternative, crankshaft 2350 of FIG. 43 is provided with counterweights only on inner webs 2374 and 2376 and not on outer webs 2370 and 2372, similar to the counterweight configuration of FIG. 42.

Figure 44:
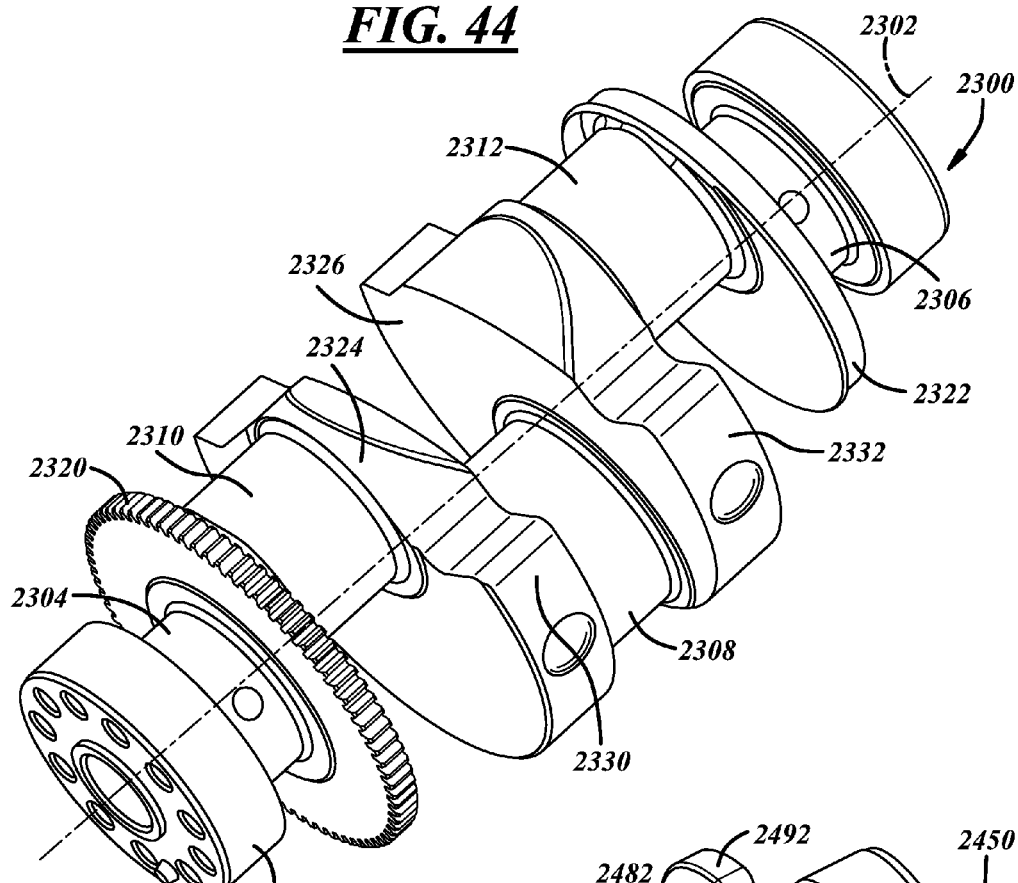
FIG. 44 shows an isometric view of the crankshaft in FIG. 42.

An isometric view of crankshaft 2300 is shown in FIG. 44 in which counterweights 2330 and 2332 are more easily viewed. Also, orifices in end 2340 can be viewed.

Figure 45:
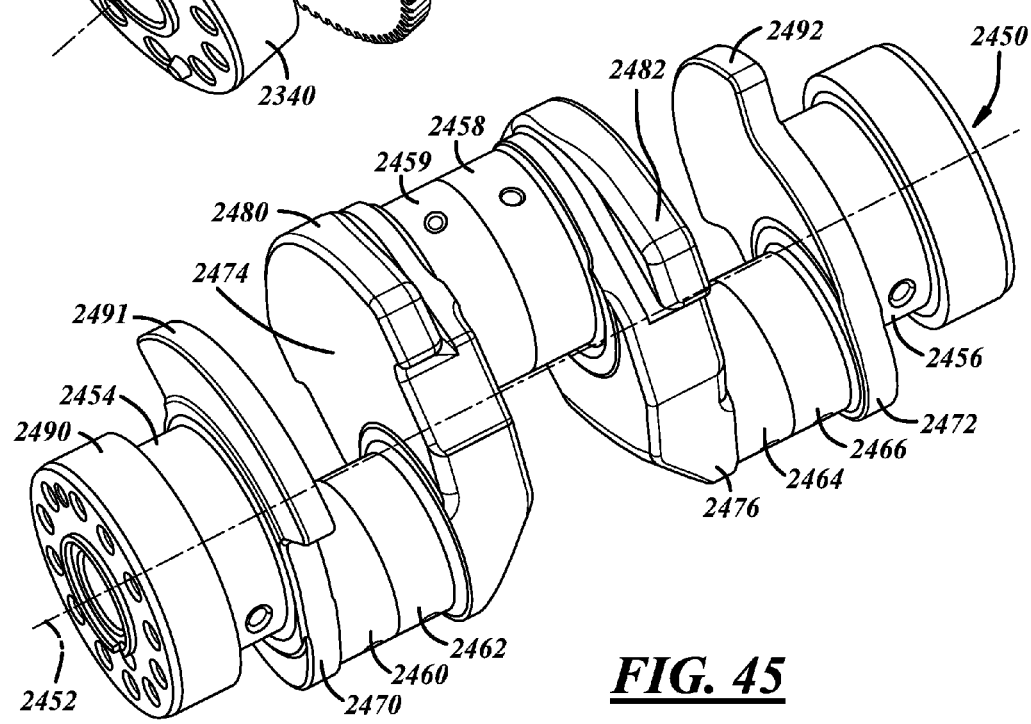

An alternative embodiment of a crankshaft 2450 rotating about axis 2452 is shown isometrically in FIG. 45. Crankshaft 2450 has: front and rear main journals 2454 and 2456, respectively; front eccentric journals 2460 and 2462; center eccentric journals 2458 and 2459; and rear eccentric journals 2464 and 2466. Webs between journals, from front to back, are: front outer web 2470, front inner web 2474, rear inner web 2476, and rear outer web 2472. Crankshaft 2450 has four counterweights: 2491, 2480, 2482, and 2492 that are associated with webs 2470, 2474, 2476, and 2472, respectively. Crankshaft 2450 further includes a front end 2490 to which a front end pulley or other rotating element may be coupled.

Figure 46A:
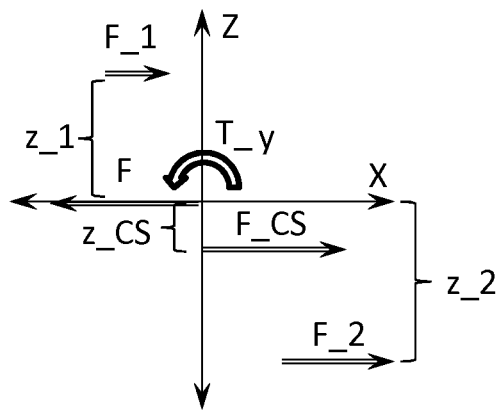
FIGS. 46A-D are free body diagrams for an OPOC engine of FIG. 35 for the following views, respectively: top view of the engine at 90 degrees after top dead center; front view of the engine at 90 degrees after top dead center; side view of the engine at bottom dead center; and front view of the engine at bottom dead center.
Figure 46B:
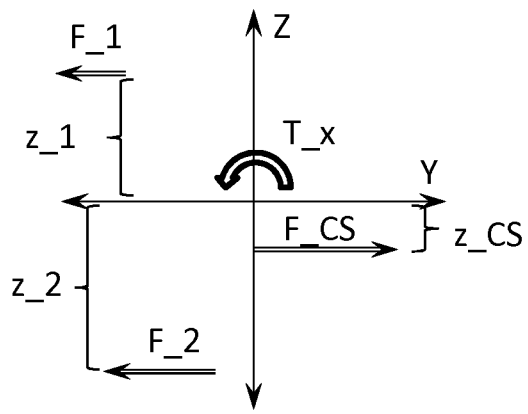

In FIG. 46A, which is a top view of the engine at 90 degrees after top dead center in one of the cylinders, the unbalanced inertia forces due to the pistons and the connecting rods is illustrated as F in the negative X direction. F acts along the X axis, therefore contributing no torque in the X-Z plane illustrated. Counterweights provided on the crankshaft exert a force, F_CS in the positive X direction, but displace from the origin in a negative Y direction, which will contribute to torque around the Y axis. Two counterweights that may be applied to accessories as described above, act in the positive X direction. The arrows indicating the magnitude and displacement of the forces from the X axis illustrate one possible configuration. The resultant torque due to the forces acting in the X direction, but displaced in the Y direction is shown as T_y. In FIG. 46B a free body diagram, as considered from the front of the engine, is illustrated at the same crank position as FIG. 46A. The piston and rod imbalance, F, lies on the X axis in this view as well. The imbalance introduced by the crankshaft counterweight(s) opposes F and also lies on the X axis in the X-Y plane shown. The counterweights on the accessories are both displaced in a negative Y direction. The resulting torque is T_z90 with the 90 signifying that it is at 90 degrees after top center. The unbalanced force is zero in the Y-Z plane, thus not shown in FIG. 46C. The forces due to the crankshaft, F_CS, and the accessory counterweights, F_1 and F_2, are shown, as well as the resulting torque with respect to the X axis, T_x. The forces and torque in the X-Y plane are shown in FIG. 46D.

By performing force balances on the free body diagrams in FIGS. 46A-D, the following equations can be constructed:

$$-F\_CS + F\_1 + F\_2 = 0;$$

$$z\_1 * F1 + z\_2 * F\_2 + z\_CS * F\_CS = T\_y;$$

$$-z1 * F1 - z\_2 * F\_2 + z\_CS * F\_CS = T\_x;$$

$$z\_1 * F\_1 + z\_2 * F\_2 = T\_z90; \text{ and}$$

$$-x\_1 * F\_1 - x\_2 * F\_2 + T\_zBDC.$$

Also assume that T_x=T_y.
Setting F_CS=F/2, the other variables are found to be:

$$F\_1 = (F\_CS/(z\_1 - z\_2)) * z\_2;$$

$$F\_2 = (F\_CS/(z\_1 - z\_2)) * z\_1;$$

$$T\_y = F\_CS * z\_CS;$$

$$T\_x = F\_CS * z\_CS;$$

$$T\_z90 = (F\_CS/(z\_1 - z\_2)) * (z\_1 * y\_2 - z\_2 * y\_1); \text{ and}$$

$$T\_zBDC = (F\_CS/(z\_1 - z\_2)) * (x\_1 * z\_2 - x\_2 * z\_1).$$

By selecting values for the offsets for the counterweights, counterweight masses can be determined so that the OPOC engine can be fully balanced for some situations and nearly fully balanced for other situations.

Figure 46C:
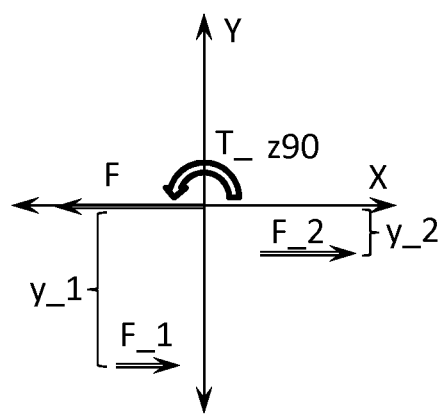
Figure 46D:
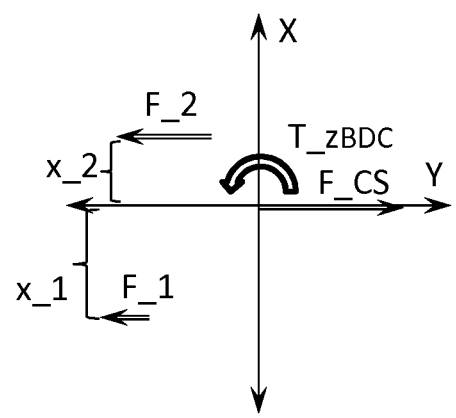

FIGS. 46C and 46D are taken at bottom dead center in the one cylinder. (Note that bottom dead center does not occur at exactly the same crank angle in both cylinders. Thus, the 90 degrees after top center of FIGS. 46A and 46B and the bottom dead center of FIGS. 46C and 46D all refer to crank position in one of the cylinders.)

Figure 47:
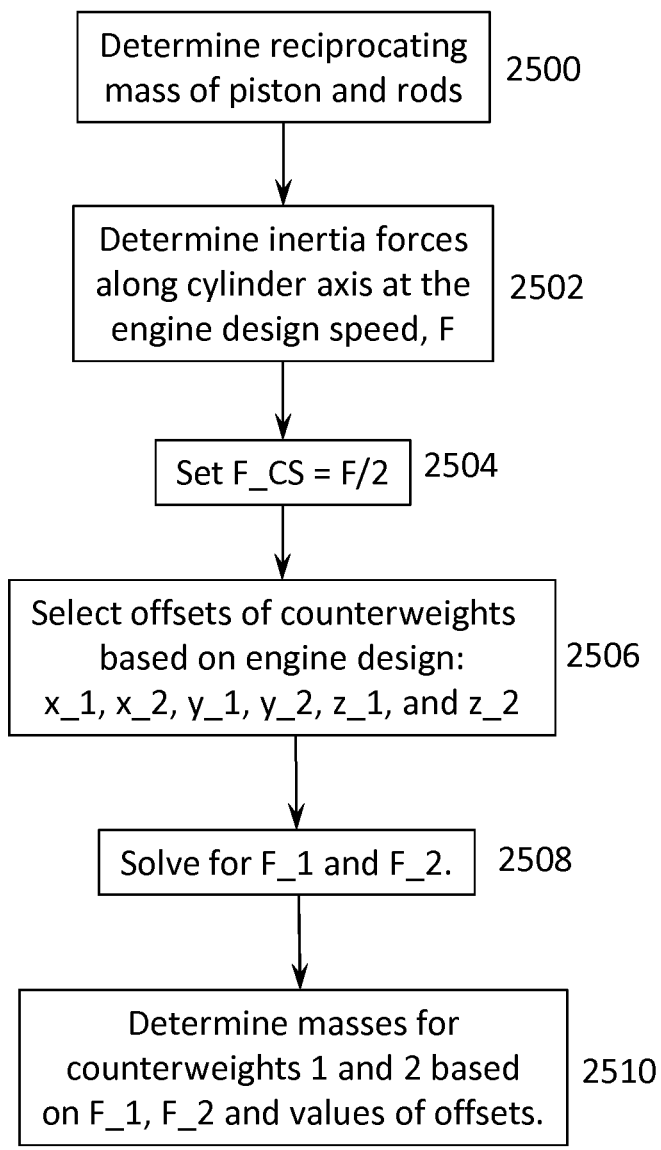
FIG. 47 is a flowchart showing an embodiment by which an OPOC engine having symmetrical pistons can be balanced.

In FIG. 47, a process by which the engine can be balanced is shown in a flowchart. In 2500, the reciprocating mass of the piston and the translatory component of the connecting rods is measured or estimated. In 2502, the resultant inertia force along the cylinder axis at the engine design speed (F) is determined. The F_CS, i.e., the inertia force due to the crankshaft counterweights is assumed to be one-half of the total imbalance due to the pistons and rods (block 2504). This one-half relationship is not intended to limit the present disclosure. The offsets of the counterweights that can be applied to the accessories are limited by the particular engine design in that the counterweights should not interfere with other rotational components in the engine. Thus, based on the engine design, i.e., all of the other moving components, probable locations to apply counterweights can be determined. Such offsets are selected in block 2506. In block 2508, F_1 and F_2 are determined via the above set of equations. Based on F_1 and F_2 and the offsets selected in block 2506, the masses of the counterweights can be determined in block 2510.

In one special case: y_CS=0; x_1=-x_2; y_1=-y_2; z_1=-z_2; and F_CS=F/2. In this case, P_1=P_2=F/4. The remaining torques are all zero. In a first sample case: y_CS=0; x_1=x_2=0; z_2=-1.9*z_1; y_1=-1.4*z_1; y_2=(z_2/z_1)*y_1; and F_CS=F/2. In this case, the results are approximately, P_1=F/3 and P_2=F/6 with the remaining torques all zero. And in yet another sample case with the values the same as in the first sample case except that x_1=x_2=0.839*y_1. The results for P_1 and P_2 are approximately the same: P_1=F/3 and P_2=F/6, but there is a remaining torque, T_zBDC which acts in the direction of the peak torque from the gas forces due to combustion in the cylinder.

Dual Intake Ports with Unidirectional Valves

Figure 48:
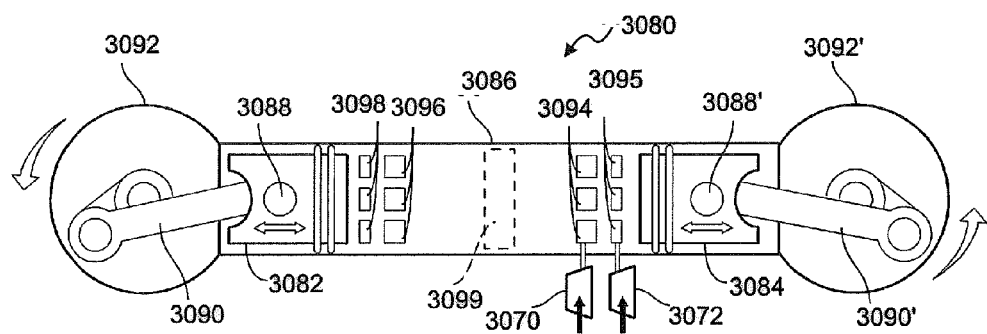
FIG. 48 is a schematic representation of an opposed-piston engine.

In FIG. 48, an opposed-piston, piston-ported engine 3080 is represented in cross section. Exhaust piston 3082 and intake piston 3084 reciprocate within cylinder 3086. Piston 3082 is coupled to a connecting rod 3090 via wrist pin 3088 with rod 3090 coupled to a crankshaft 3092. Similar components, 3090', 3088', and 3092' are provided for piston 3084 as well. Pistons 3082 and 3084 are shown near or at bottom dead center (BDC) position, i.e., a position in which the volume contained within the cylinder and between the two piston tops is at or near its maximum. In such a position, a first plurality of intake ports 3094, a second plurality of intake ports 3095, a first plurality of exhaust ports 3096, and a second plurality of exhaust ports 3098 are uncovered by the associated pistons. The intake and exhaust routings from the first and second pluralities of intake and exhaust ports 3094, 3095, 3096, and 3098 are not illustrated explicitly in FIG. 48.

Figure 49:
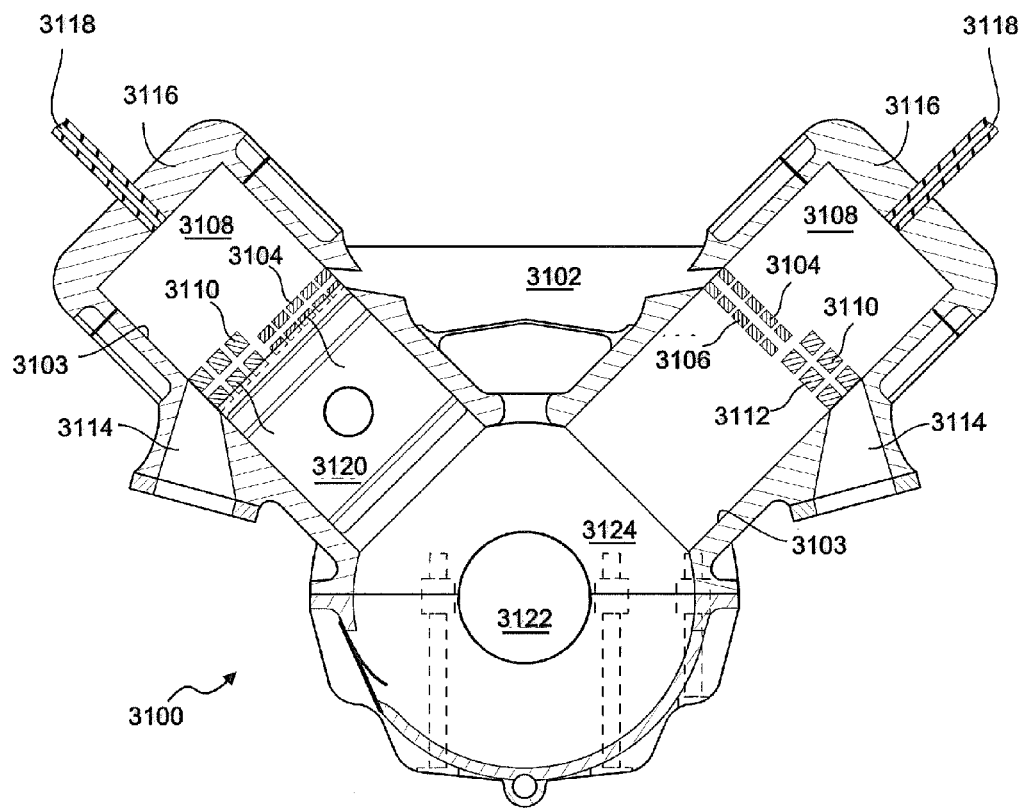
FIG. 49 is a cross-section of a vee-configured, piston-ported engine.

A vee-configured engine 3100 is shown in FIG. 49. An intake manifold 3102 feeds fresh air to both banks of cylinders 3103 with fresh air provided to cylinders 3103 through primary intake ports 3104 and secondary intake ports 3106 into combustion chambers 3108. Exhaust is expelled through primary exhaust ports 3110 and secondary exhaust ports 3112 into exhaust ducts 3114. Cylinders 3103 have cylinder heads 3116 with fuel injectors 3118 disposed therein. In spark ignition embodiments, a spark plug is also provided in cylinder heads 3116. In the left bank cylinder, a piston 3120 is shown. No piston is shown in the right bank cylinder so that the ports can be seen in FIG. 49. Piston 3120 is connected to a crankshaft 3122 via a connecting rod (not shown in FIG. 49). At the lower end of engine 3100 is a crankcase 3124.

Crankshafts 3092 and 3092' of FIG. 48 may be timed so that exhaust piston 3082 uncovers exhaust ports 3096 prior to intake piston 3084 uncovering intake ports 3094 during expansion. During compression, exhaust ports 3096 are covered by exhaust piston 3082 prior to intake ports 3094 being covered by intake piston 3084. Such asymmetry in the movement of the pistons leads to imbalance. The more that the movement of the pistons mirror each other, the less the imbalance. It has been found through modeling that about a 20-degree offset provides an appropriate amount of asymmetry to the port timing to provide acceptable scavenging over the range of operating conditions. It is desirable, however, to reduce the degree of asymmetry in the piston movement.

Figure 50:
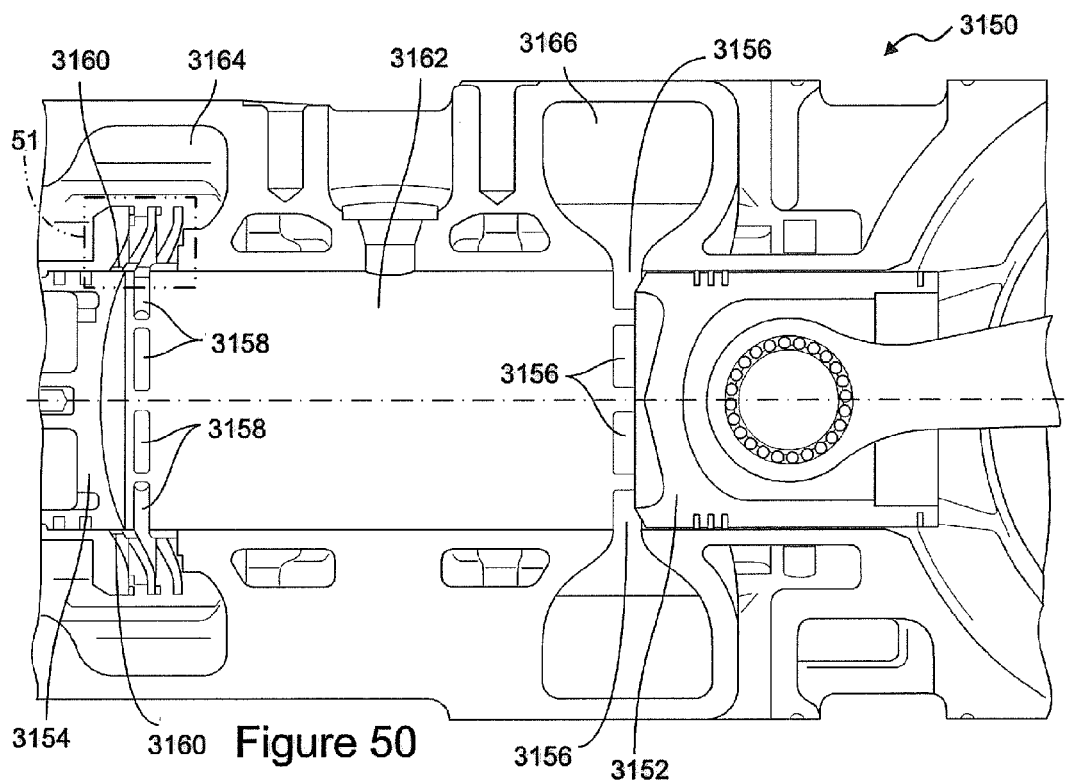
FIGS. 50, 52, and 54 are cross-sectional representations of an opposed-piston engine in which the pistons are shown in a range of positions.
Figure 51:
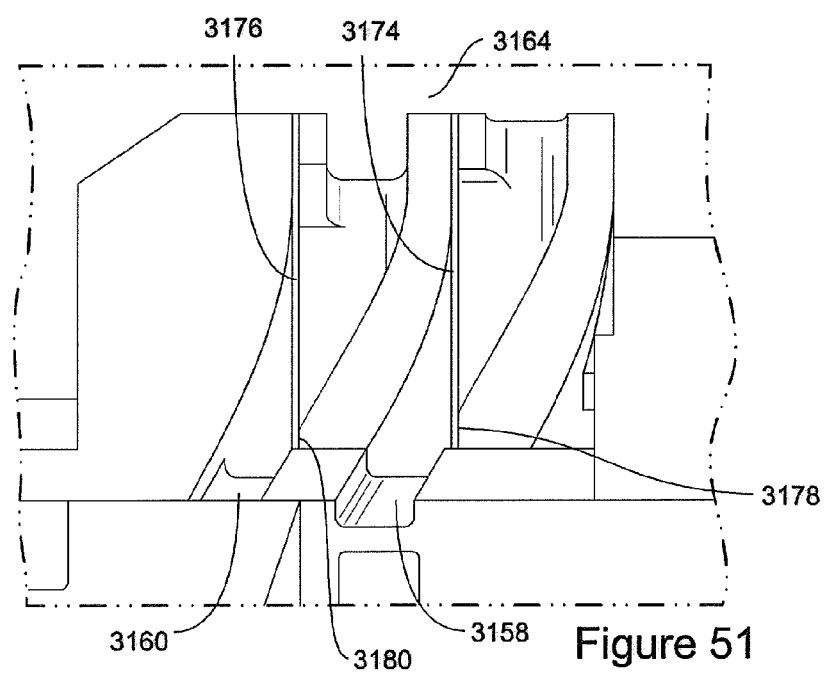
FIGS. 51, 53, and 55 show details of a portion of FIGS. 50, 52, and 54, respectively.

Referring now to FIG. 50 and to FIG. 51, the latter of which shows a detail of the area enclosed by the dotted line in FIG. 50, a cross section of a portion of an opposed-piston engine 3150 is shown. A cylinder 3162 has an intake piston 3152 and an exhaust piston 3154. Exhaust ports 3156 are uncovered by exhaust piston 3152 during an expansion stroke. At the crank angle shown in FIG. 50, the exhaust ports 3156 are partially uncovered. Two rows of intake ports: primary intake ports 3158 and secondary intake ports 3160 are uncovered by piston 3154 during expansion. At the crank angle shown in FIG. 50, only primary intake ports 3158 are uncovered, while secondary intake ports 3160 remain occluded by intake piston 3154. Although primary intake ports 3158 are uncovered, flow through intake ports 158 is prevented by reed valves provided in the intake duct. Petals 3174 of the reed valve press against frame 3178 sealing off flow between an intake plenum 3164 and cylinder 3162. In the situation illustrated in FIG. 50, the pressure in cylinder 3162 exceeds that in intake plenum 3164. When pistons 3152 and 3154 move away from each other further and the pressure in cylinder 3162 reduces, petals 3174 lift from frames 3178 thereby allowing intake flow into cylinder 3162. In the embodiment shown in FIGS. 50 and 51, reed valves are also provided in the secondary intake ports 3160, with petals 3176 sealing against stops in frames 3180. In an alternative embodiment, reed valves are provided only in primary intake ports 3158 and not in secondary intake ports 3160.

Figure 52:
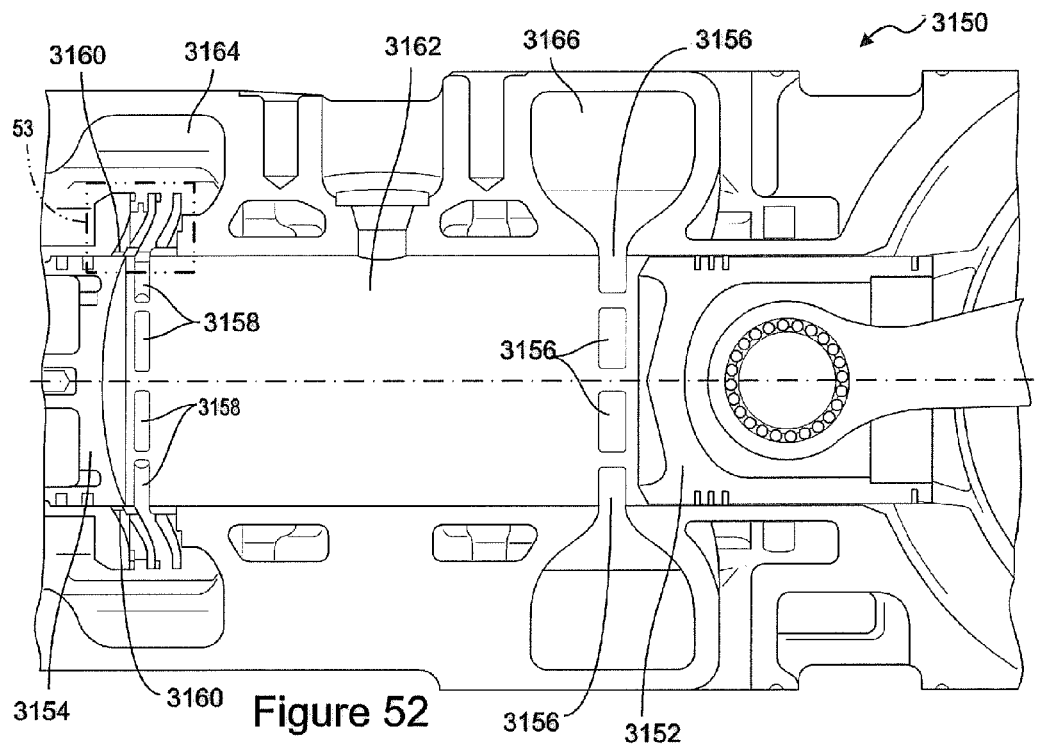
Figure 53:
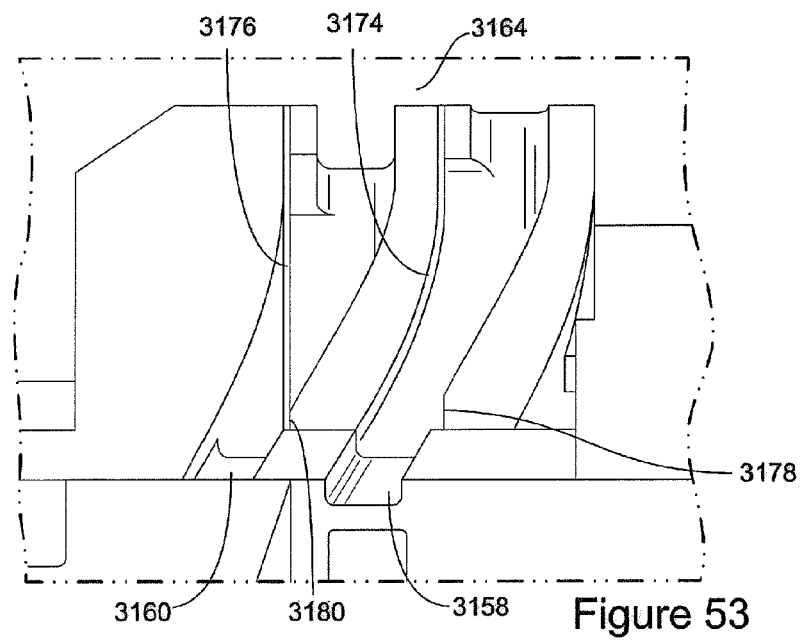

In FIG. 52, engine 3150 is shown at a crank angle at which pistons 3152 and 3154 are further apart from each other than in FIG. 50. Exhaust ports 3156 are completely uncovered. The pressure in cylinder 3162 is such that petals 3174 lift from frames 3178 and allow flow from intake plenum 3164 into cylinder 3162. Secondary intake ports 3160 are occluded by both piston 3154 as well as petals 3176 of the reed valves associated with secondary intake ports 3160. Detail of the area enclosed by the dashed line is shown In FIG. 53.

Figure 54:
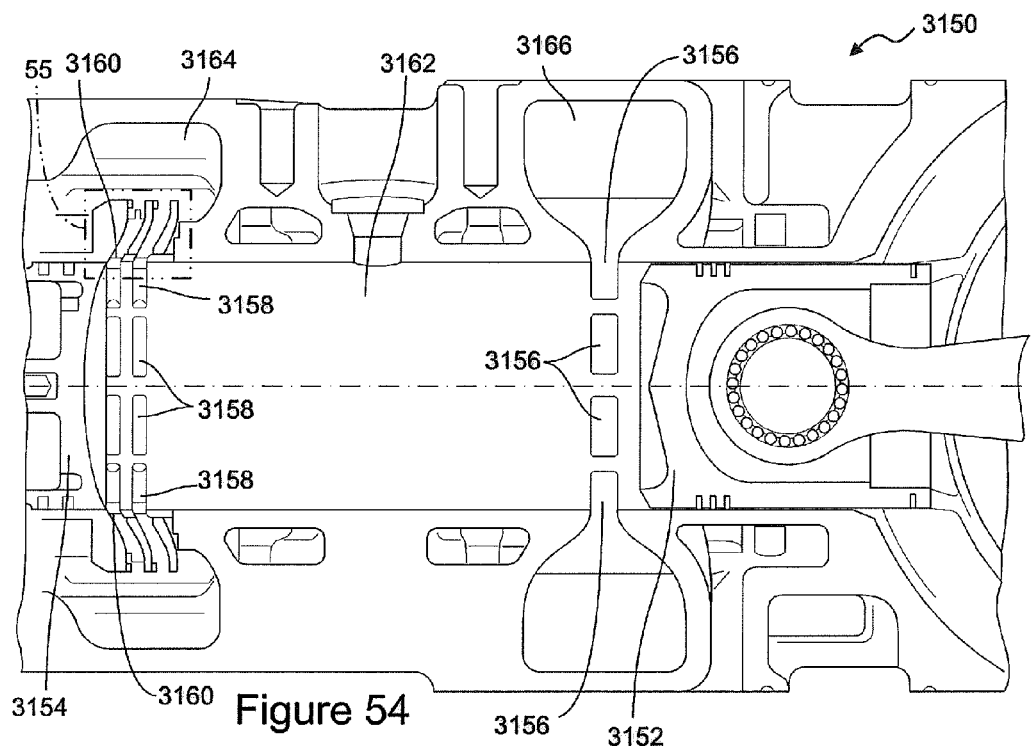
Figure 55:
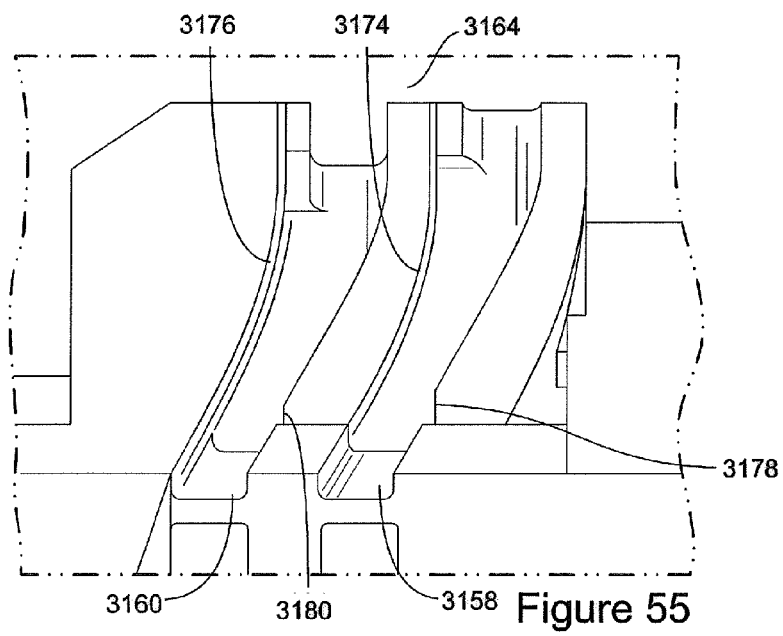

An even further expanded state in cylinder 3162 is shown in FIGS. 54 and 55. Both sets of intake ports 3158 and 3160 are uncovered. As the pressure in the cylinder is sufficiently reduced, as soon as intake piston 3154 uncovers secondary intake ports 3160, petals 3176 lift from frames 3160.

Figure 56:
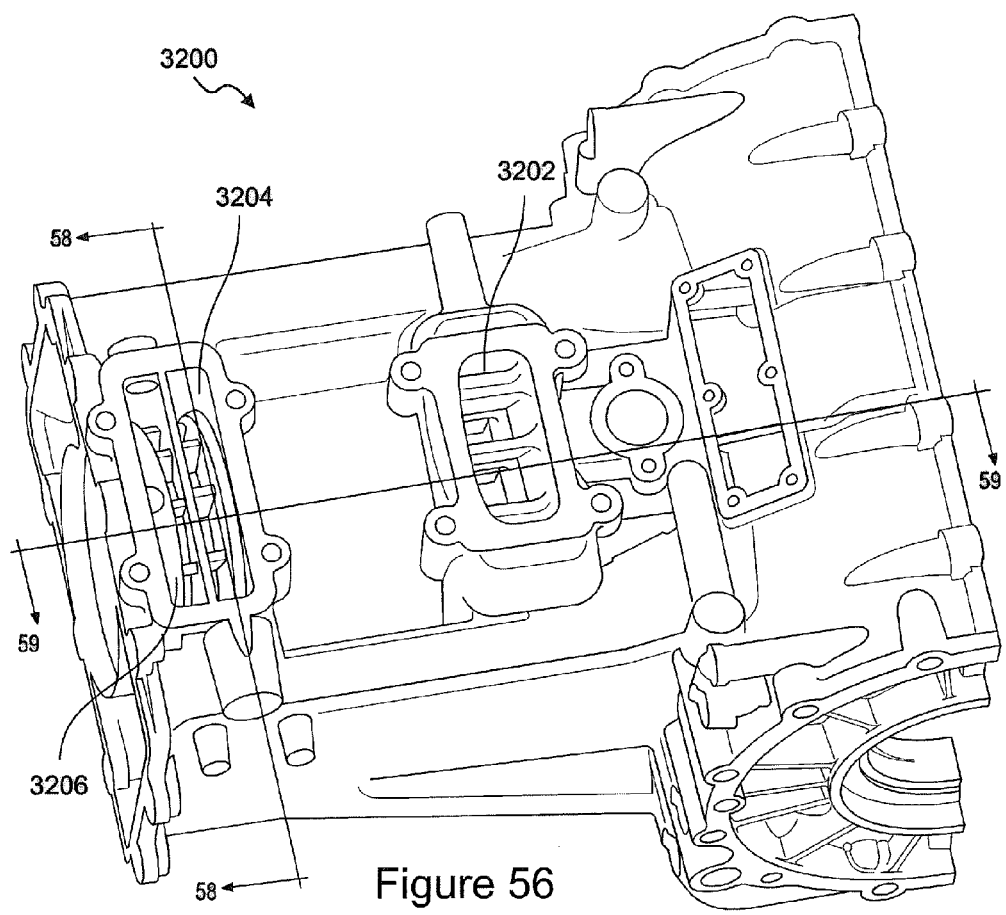
FIG. 56 is a cylinder block for an opposed-piston engine shown in a perspective view.

In FIG. 56, an embodiment, a block 3200 of an opposed-piston engine is shown in perspective. An opening 3202 to the exhaust ports is provided in block 3200. An opening 3204 leading to primary intake ports and an opening 3206 leading to secondary intake ports are shown siamesed on the outer surface of block 2200.

Figure 57:
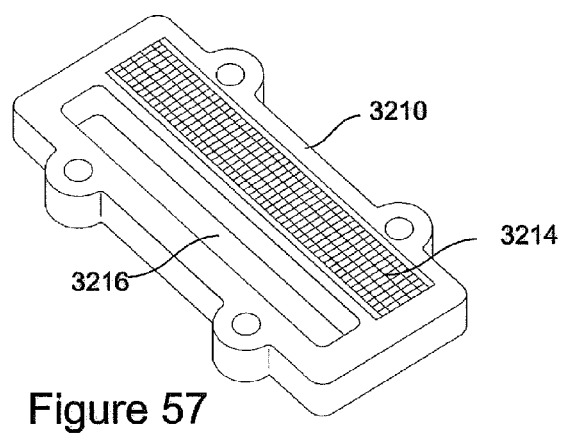
FIG. 57 is a holder for a reed valve that coupled to a flange of the block shown in FIG. 56.

In FIG. 57, a frame 3210 has a primary opening into which a reed valve assembly 3214 is installed. A secondary opening 3216, which couples to opening 3206 associated with the secondary intake ports, is not occluded.

Figure 58:
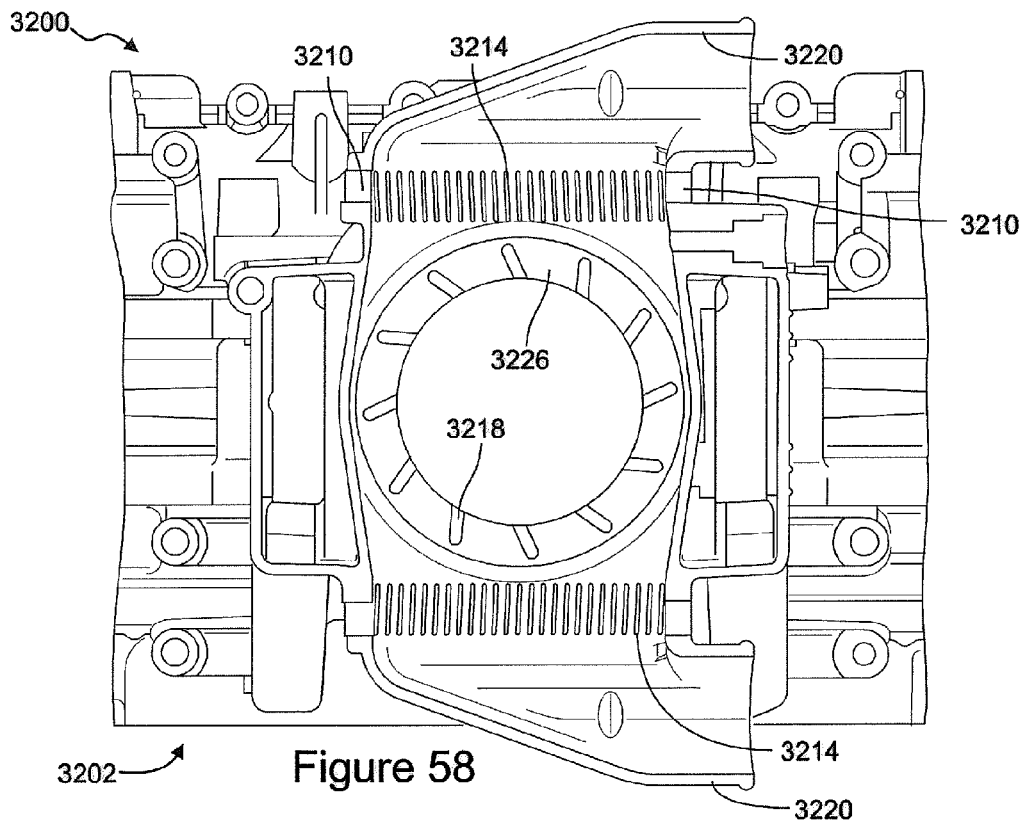
FIGS. 58 and 59 are cross sectional views of the cylinder block of FIG. 56, but also including the reed valve holder and intake ducts.

In FIG. 58, a cross section perpendicular to the axis of the cylinder bore taken through the primary intake ports is shown. The cross section shown in FIG. 58 includes frame 3210, intake ducts 3220, and intake ports 3226. The embodiment in FIG. 58 has intake ducts 3220 and reed valve assemblies 3214 located on two sides of block 3200. The walls separating ports 3226 are provided at an angle so that they induce a swirl flow.

Figure 59:
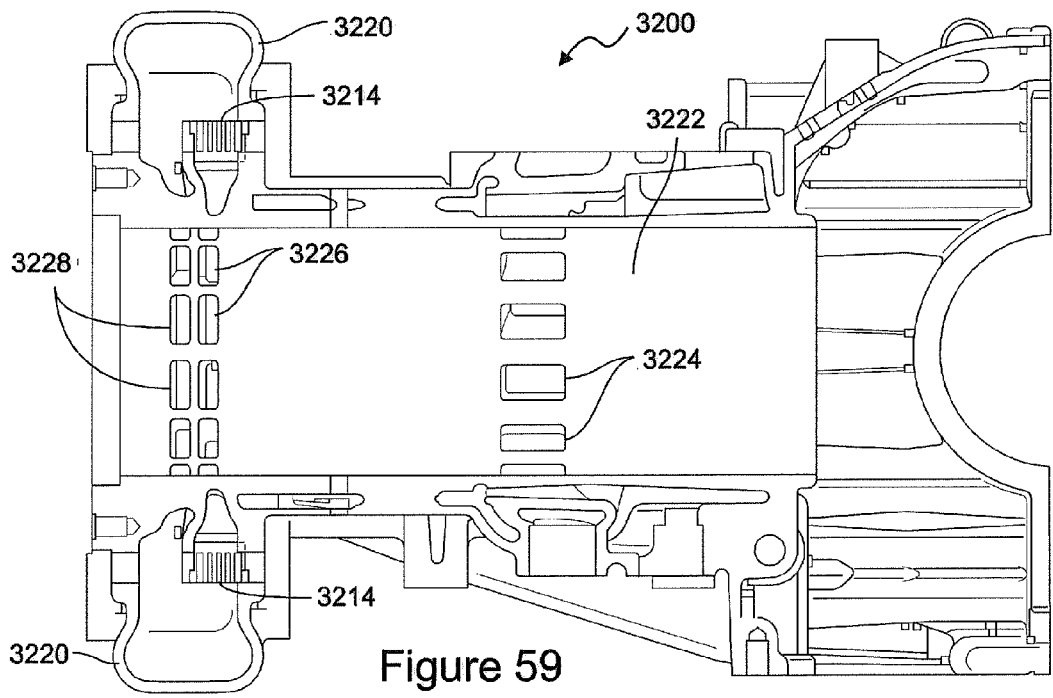

In FIG. 59, a cross section taken along the axis of the cylinder bore is shown. Liner 3222 has multiple exhaust ports 3224, primary intake ports 3226, and secondary intake ports 3228. In the present disclosure, primary intake ports are those that are uncovered by the intake piston before the secondary intake ports as the intake piston moves away from the exhaust piston. When the reed valves are open, gases flow from intake duct 220 through primary intake ports 226, and into the cylinder defined by liner 222. Flow from intake duct 3220 goes through secondary intake ports 3228 into the cylinder defined by liner 3222 unimpeded. The piston that uncovers the intake ports is not shown in FIG. 59. However, referring back to FIGS. 50, 52, and 54, it can be seen that the piston uncovers the primary ports first and later in the expansion stroke uncovers the secondary ports. Thus, the reed valves prevent backflow of exhaust gases into intake duct 3220 when it is most likely, i.e., when pressure in the cylinder is higher. By the time that secondary ports 3228 are uncovered, the pressure in the cylinder is lower and thus reed valves are not provided in the duct leading to secondary intake ports 3228.

The embodiment illustrated in FIGS. 56-59 with reed valves in the duct associated with primary intake ports but no reed valves in secondary intake ports 3228 is a combination that provides minimal pressure drop while preventing backflow during the portion of the expansion stroke in which primary intake ports 2226 are uncovered. It has been found that with such a configuration, the appropriate asymmetry is about 15 degrees, thereby significantly reducing the amount of piston imbalance compared with a 20 degree asymmetry. Five degrees of asymmetry from absolute symmetry causes a minimal imbalance while five degrees, e.g., from 15 to 20 degrees has much more impact on imbalance.

Figure 60:
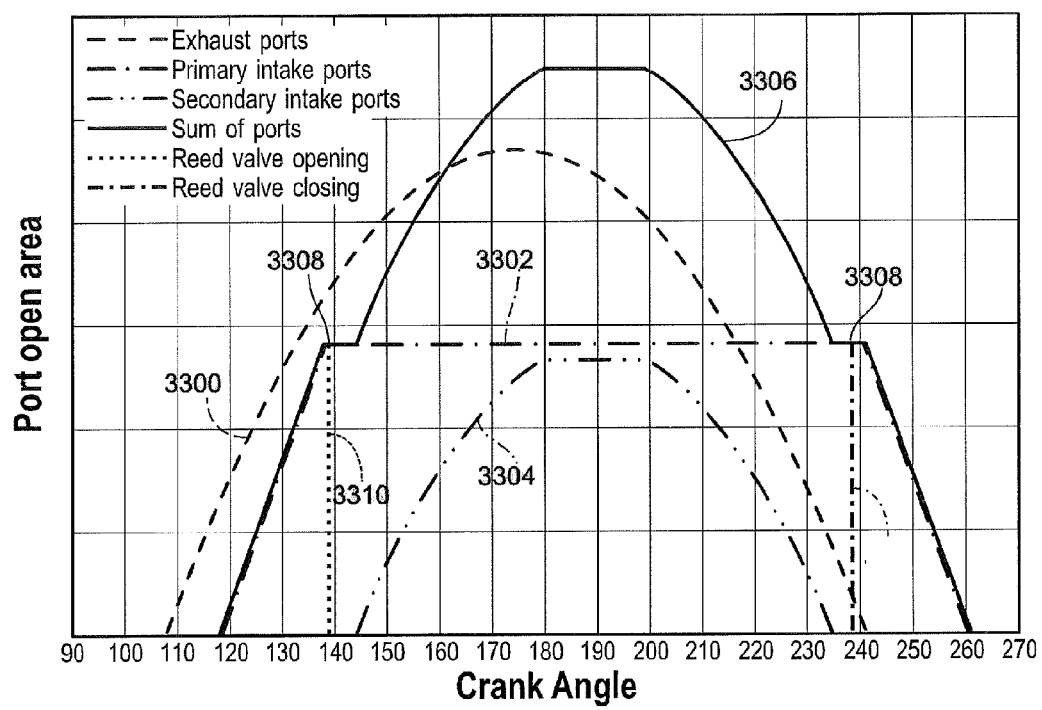
FIG. 60 is a plot of port open area for an embodiment with primary and secondary intake ports.

In FIG. 60, port open area is plotted as a function of crank angle degree. Dashed line 3300 indicates the area uncovered by an exhaust piston as it reciprocates in the cylinder. The port open area for the primary intake ports is plotted as a dash-dot line 3302. The intake piston completely uncovers the primary intake ports at about 137 degrees crank angle. The open area of the primary intake ports, as shown by line 3302, does not increase further, i.e., remains constant from about 137-242 degrees crank angle. The beginning of the opening of the secondary intake ports doesn't occur until after the primary intake ports are completely uncovered. There is a slight additional delay due to there being a bridge between the primary and secondary intake ports. In the example shown in FIG. 60, the dash-dot-dot line 3304 indicating the port open area for the secondary ports has a flat portion in the range of 180 to 200 degrees crank angle, which indicates that the secondary intake ports are completely open during this range of intake piston movement. The total intake port open area, i.e., sum of the primary and secondary intake ports, is shown as solid line 3306. The shoulders 3308 coincide with the piston movement associated over the bridge area between the primary and secondary intake ports.

The port timings and areas that are shown in FIG. 60 have a number of unfavorable characteristics. It is desirable for there to be about a 30 crank angle degree delay between the opening of the exhaust ports and the intake ports to allow exhaust blowdown to occur so that the pressure in the cylinder is greatly reduced and so that the blowdown energy is directed into the exhaust for recovery in an exhaust turbine or other recovery device. The primary exhaust ports, however, begin to open at about 10 degrees crank angle after the exhaust ports begin to open. Also, it is desirable for the intake ports to be closed not too late into the compression stroke. In FIG. 60, the intake ports close at about 260 degrees crank angle. With piston porting, about the only way to reduce the duration of intake port opening is to reduce the height of the intake ports. If such a measure were taken, then not only would the duration of the intake port open be reduced, but the maximum port open area, curve 3306, is significantly reduced. It is desirable for the intake opening area to be greater than exhaust opening area. Exhaust gases flow out of the cylinder under high pressure in the cylinder, i.e., a great pressure difference driving the flow of exhaust gases out of the cylinder. On the other hand, intake gases are driven by a lesser pressure difference and thus a higher flow area is desired to facilitate the induction of fresh intake gases.

According to an embodiment of the disclosure, reed valves are placed upstream of the primary intake ports. Thus, although the intake ports may be uncovered by the intake piston, flow through the intake ports is prevented by the reed valves. The effect of the reed valves on the effective intake port open area is shown by dotted line 3310 (in regards to opening of the reed valves) and short dash-long dash line 3312 (in regards to closing of the reed valves). The reed valves allow for a large port open area, but with a desirable open duration. The reed valve opening 3310 and closing 3312 are one example. Reed valves open and close based on the relative pressures on the upstream and downstream sides of the reed valve and the flow conditions past the reed valves. Thus, the opening 3310 and the closing 3312 of the reed valves as depicted in FIG. 60 are but one example. The actual opening and closing of the reed valves may vary somewhat from the example shown in FIG. 60.

Rocking Joint

Disclosed below is a rocking joint that is useful in an OPOC engine in relation to the outer pistons in which pullrods are coupled on the outside of the piston.

Figure 61:
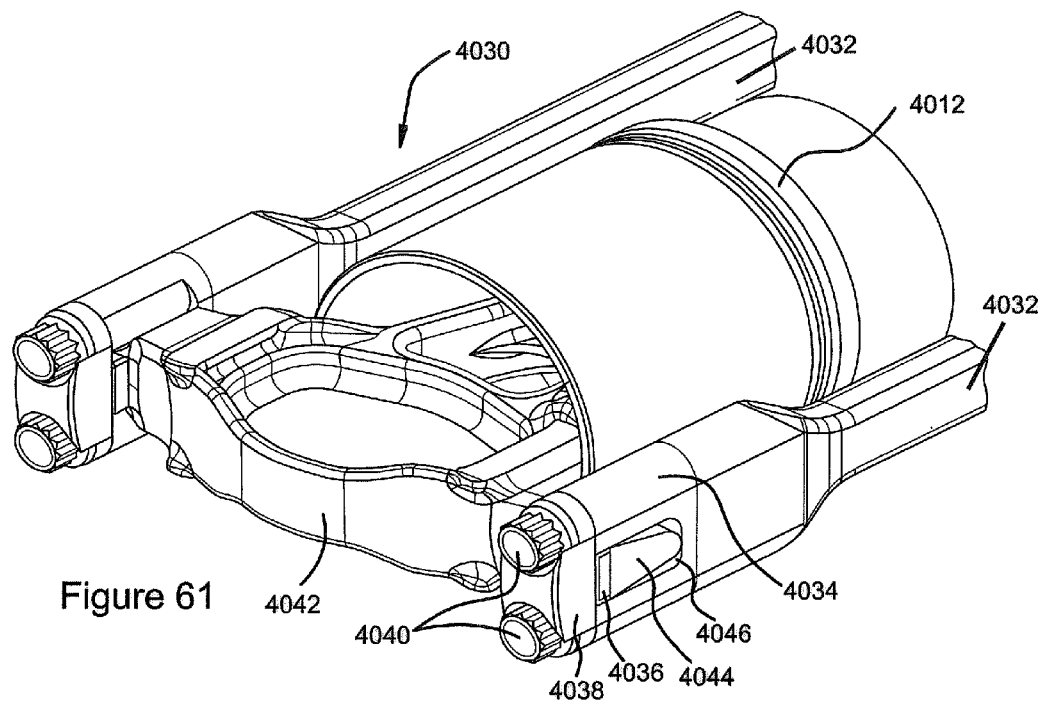
FIG. 61 is an isometric view of a rocking joint according to an aspect of the present disclosure.

An isometric view of a portion of an opposed-piston, opposed-cylinder engine is illustrated in FIG. 61 highlighting components involved in a rocking joint 4030, according to an embodiment of the disclosure. An outer piston 4012 from the left cylinder (not shown) is coupled to pullrods via a bridge 4042. The pullrods include: a pullrod main body 4032, a center element 4034, a bearing element 4036, and an end cap 4038, all held together via bolts 4040. Alternatively, studs with a nut are used in place of bolts 4040. Bridge 4042 has cross-pin extensions 4044 extending outwardly toward the pullrods. Details of the rocking surfaces are discussed below.

Figure 62:
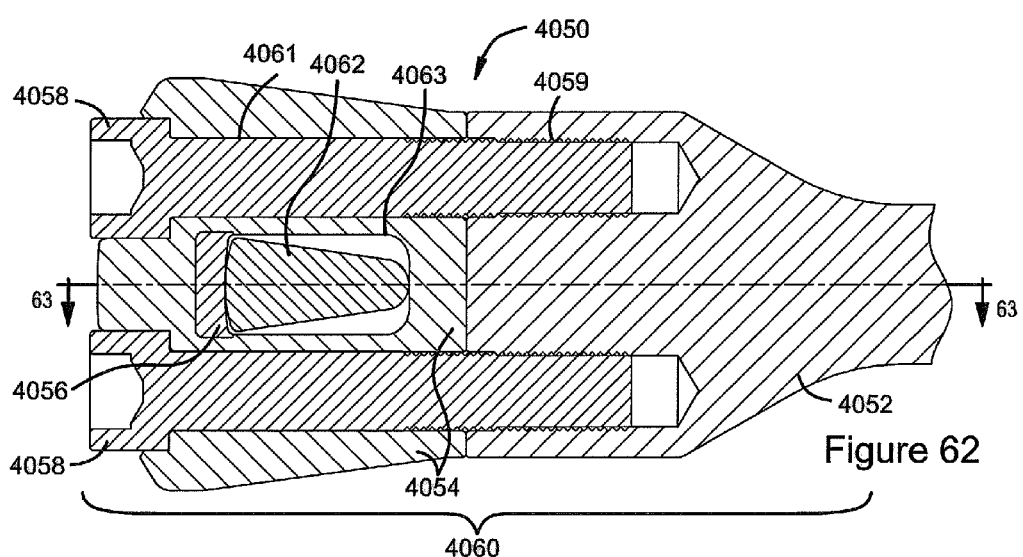
FIGS. 62 and 63 are cross-sectional views of one embodiment of the rocking joint.
Figure 63:
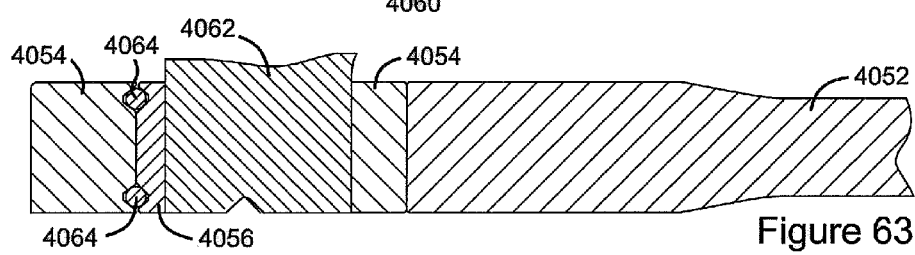

A cross section of an alternative embodiment of a rocking joint 4050 is shown in FIG. 62. A pullrod 4060 includes: a main body 4052, an end cap 4054, a bearing element 4056, and bolts 4058. A cross-extension pin 4062, which is part of a bridge coupled to the piston (neither the bridge or the piston are shown in FIG. 62), engages with an opening 4063 in end cap 4054 and rides, or rocks, on a bearing surface of bearing element 4056. Bolts 4058 are threaded at an end of the bolt away from the head of the bolt. Threads at 4059 engage with main body 4052 of connecting rod 4052. In the region 4061 of bolt 4058, the external surface of the bolt pilots end cap 4054. A cross section of the rocking joint of FIG. 62 is shown in FIG. 63. Bearing element 4056 is held in position with respect to end cap 4054 and pin 4062 via balls 4064 which are placed in dimples provided in end cap 4054 and bearing element 4056. When bolts 4058 (not visible in FIG. 63) are tightened, balls 4064 retain bearing element 4056 in place. To allow the bridge with extension pin 4062 to bend, the surface of bearing element 4056 that sits against a surface of opening 4063 is convexly curved.

Figure 64:
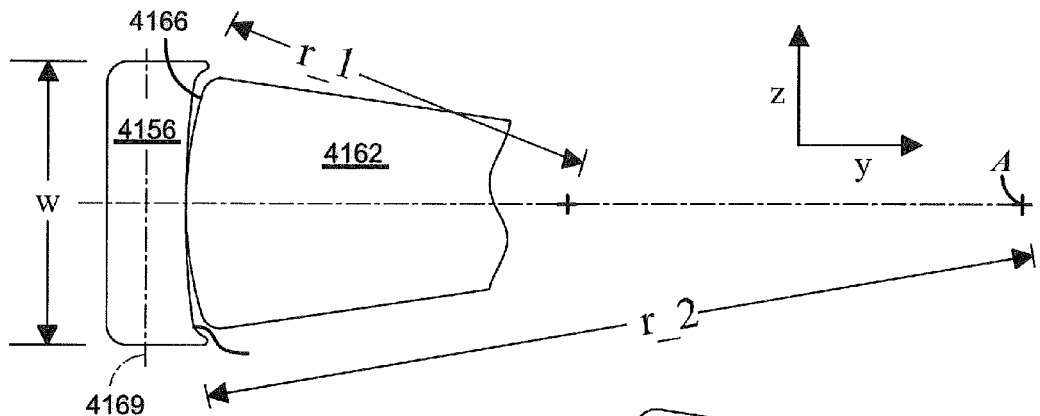
FIGS. 64-66 are details of a rocking joint in neutral and extreme positions.
Figure 65:
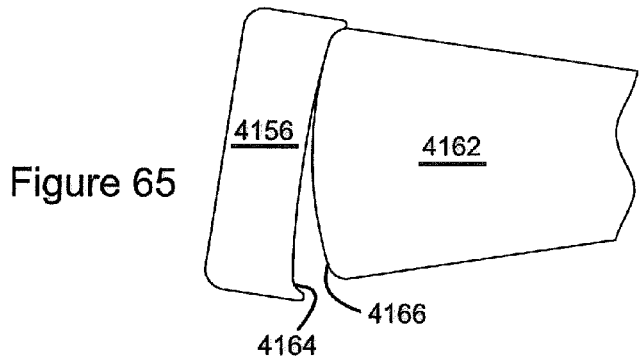
Figure 66:
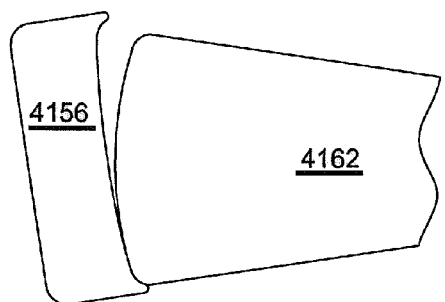

A portion of a rocking joint is shown in an exaggerated form in FIGS. 64, 65, and 66. A pin 4162, which is part of a bridge or other connector between the piston and connecting rod, has a pin bearing surface 4166 on which a rod bearing surface 4166 of bearing element 4156 rocks. During engine operation, pin 4162 reciprocates in the Y direction and the connecting rod reciprocates in the Y direction and moves in the Z direction as well. Rod bearing surface 4164 of bearing element 4156 rocks on rod bearing surface 4166 of pin 4162. Pin bearing surface 4166 is a convexly-curved surface forming a portion of a cylinder with a radius of curvature of r_1. In the embodiment shown in FIGS. 64, 65, and 66, pin bearing surface 4166 has a constant radius. Alternatively, the radius of curvature can vary along the surface. The magnitude of the radius of curvature of pin bearing surface 4166 is discussed below. Concavely-curved rod bearing surface 4164 of bearing element 4156 is a portion of a cylinder having a radius of curvature of r_2, in which r_1 is less than r_2. The value of r_2 is the distance from the rod bearing surface to the center of the crank pin (crank pin not shown, but illustrated as being located at A). As will be discussed below, the value of r_1 is determined at least based on the properties of the materials of bearing element 4156 and pin 4162 as well as the maximum force for which the joint is designed to transmit.

In FIG. 65, bearing element 4156 is shown at one extreme position, in which bearing element is tilted upwards. The force at the point of contact between bearing element 4156 and pin 4162 is substantially perpendicular to the pin- and rod-surfaces in all positions. The other extreme position, in which bearing element 4156 is tilted downwards, is shown in FIG. 66. The rocking joint in FIGS. 64-66 are exaggerated in that the radii of curvature, r_1 and r_2, are much smaller than would be found in most practical situations. Such small radii allow visualization of the curvature on the bearing element 4156 and pin 4162. In rocking joint of FIG. 62, bearing element 4056 rocks about 5 degrees with respect to pin 4062. Thus, the surfaces of bearing element 4056 and pin 4062 that are in contact appear nearly flat.

Figure 67:
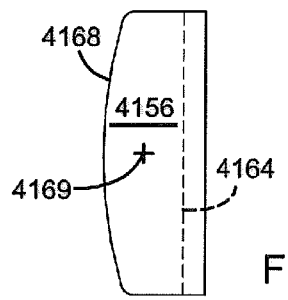
FIG. 67 shows a top view of the bearing element of FIGS. 64-66.

In embodiments with a bearing element 4036 such as illustrated in FIG. 61, a back side of bearing element 4036 that sits against a surface of opening 4046 has a convexly curved surface, such as can be seen in FIG. 67. Bearing element 4156 in FIG. 67 is a top view of bearing element 4156 of FIGS. 64-66. An axis 4169 parallel to a long direction of bearing element is shown in FIG. 64. A center of the radius of curvature of surface 4168 in FIG. 67 is roughly parallel with axis 4169 (visible as a point in FIG. 67). The curvature of surface 4168 is provided to compensate for any bending of the piston pin (or crosshead pin) during engine operation.

Relative motion between surfaces of the rocking joint is prevented when the forces are normal to the portions of the surfaces in contact. However, in some situations, there are modest side forces. The curvature of the bearing element (4156 of FIGS. 64-66) may be modified so that the resultant force is perpendicular to the bearing surfaces. However, in many practical devices, such as an internal combustion engine as shown in FIG. 1, the side forces are negligible. Furthermore, the magnitude of the side forces varies with engine speed. Thus, any accommodation for the side forces is a compromise at all speeds except for the design speed. In most embodiments, no accommodation is made for the side forces as the magnitude of the side forces is sufficiently small that no sliding occurs.

Figure 68:
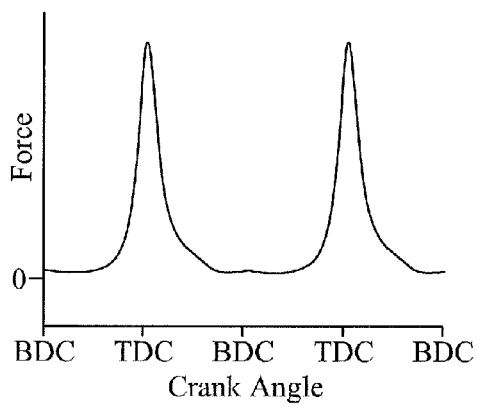
FIG. 68 is a graph of cylinder pressure as a function of crank angle degree for a two-stroke engine.

To ensure that the rocking joint can carry the forces, the radius of curvature of pin 4162 can be made larger. However, the penalty in doing so is that the width of the joint, W, is wider. It is desirable to have the joint as narrow as practical so that the connecting rod is compact. In one embodiment, surface 4164 has a constant radius, r_1, which is defined by the peak force that the joint is designed to transmit. In FIG. 68, the force at the joint is plotted as a function of crank angle degree for the highest cylinder pressure condition in the engine. The pressure peaks near TDC due to compression in the cylinder and from pressure increases due to combustion. However, the pressure falls off sharply on either side of the peak pressure. Thus, having a constant radius, r_1, that is defined by the peak cylinder pressure causes the radius of curvature to be greater than necessary at crank angle positions away from the peak pressure. In an alternative embodiment, the radius of curvature of the surface on the pin is not constant, but instead varies as a function of crank angle (or could be defined in relation to the connecting rod angle, b). The non-constant radius is chosen so that the pressure is smaller than an acceptable Hertz pressure, which is defined by the materials of the roller components at the line of contact between the pin and the bearing element. The minimum local radius, r_1 as a function of b, i.e., the embodiment in which r_1 is not constant and varies as a function of connecting rod angle, b. The minimum local radius on the pin is determined based on the maximum acceptable Hertz pressure, Hp. A characteristic radius for the joint, r, is defined as $$1/r = 1/r\_1 + 1/r\_2.$$

Figure 69:
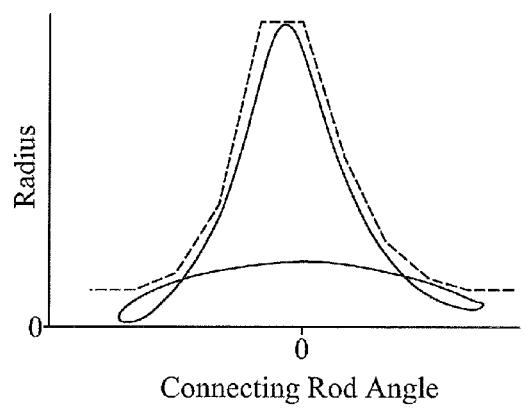
FIG. 69 is graph of the minimum radius of curvature for the pin for one embodiment as a function of connecting rod angle.

And, $Hp=[(F*C)/(r*L)]^{\wedge}0.5$ where F is the force carried by the joint, C is a material constant based on the materials of the pin and bearing element, and L is the contact length. The resulting r_1 as a function of the connecting rod angle is shown in the solid line in FIG. 69. The dashed line in FIG. 69 is a safe minimum radius that may be employed. By providing a non-constant radius according to the dashed line in FIG. 69, the width of the joint can be made smaller than would be the case if r_1 were a constant defined by the peak force expected to be encountered.

Referring to FIG. 62, bearing element 4056 is a separate element from end cap 4054. Alternatively, end cap 4054 includes bearing element 4056. Advantages of bearing element 4056 being separate are ease in machining the curved surface and allowing material to be selected that may not be desirable for end cap 4054. Advantages of having bearing element 4056 integral with end cap 4054 include reduced part count and improved ease of assembly.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depends on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An opposed-piston, opposed-cylinder engine, comprising:
    a first cylinder having a first inner piston and a first outer piston disposed therein;
    a second cylinder having a second inner piston and a second outer piston disposed therein, the second cylinder having a central axis substantially collinear with a central axis of the first cylinder;
    a unitary crankshaft disposed between the first and second cylinders, the crankshaft having a first main bearing, a first outer eccentric journal, a center eccentric journal, a second outer eccentric journal and a second main bearing;
    a first pushrod coupling the first inner piston with the center eccentric journal;
    a second pushrod coupling the second inner piston with the center eccentric journal wherein both the first and second pushrods lie in a plane perpendicular to a centerline of the center eccentric journal and such plane intersects the center eccentric journal;
    a first pullrod with a first end of the first pullrod coupled to the first outer piston and a second end of the first pullrod wrapped around a portion of the first outer eccentric journal;
    a second pullrod with a first end of the second pullrod coupled to the first outer piston and a second end of the second pullrod wrapped around a portion of the second outer eccentric journal;
    a third pullrod with a first end of the third pullrod coupled to the second outer piston and a second end of the third pullrod wrapped around a portion of the first outer eccentric journal; and
    a fourth pullrod with a first end of the fourth pullrod coupled to the second outer piston and a second end of the fourth pullrod wrapped around a portion of the second outer eccentric journal.

2. The engine of claim 1 wherein the unitary crankshaft is comprised of a single forged piece.

3. The engine of claim 1 wherein the unitary crankshaft is machined from a single piece.

4. The engine of claim 1 wherein the first and second pushrods are substantially included in a plane that radially bisects the center eccentric journal.

5. The engine of claim 1 wherein the first and third pullrods are substantially included in a plane that radially bisects the first outer eccentric journal and second and fourth pullrods are substantially included in a plane that radially bisects the second outer eccentric journal.

6. The engine of claim 1 wherein the bearings are arranged with the main bearings outside of the outer eccentric bearings and the center eccentric bearing between the outer eccentric bearings.

7. The engine of claim 1, further comprising:
    a first bearing cap secured to the first pullrod;
    a second bearing cap secured to the second pullrod;
    a third bearing cap secured to the third pullrod; and
    a fourth bearing cap secured to the fourth pullrod, wherein the first, second, third, and fourth bearing caps each having three fingers; a pair of the fingers of the first bearing cap mesh with a finger of the third bearing cap; a pair of the fingers of the third bearing cap mesh with a finger of the first bearing cap; a pair of the fingers of the second bearing cap mesh with a finger of the fourth bearing cap; and a pair of the fingers of the fourth bearing cap mesh with a finger of the second bearing cap.

8. An opposed-piston, opposed-cylinder engine, comprising:
    a first cylinder having a first intake piston and a first exhaust piston disposed therein;
    a second cylinder having a second intake piston and a second exhaust piston disposed therein, the second cylinder having a central axis substantially collinear with a central axis of the first cylinder;
    a crankshaft comprised of a single piece disposed between the first and second cylinders, the crankshaft having a first outer main bearing, a first outer eccentric journal, a center eccentric journal, a second outer eccentric journal and a second outer main bearing;
    a first pushrod coupling the first exhaust piston with the center eccentric journal;
    a second pushrod coupling the second exhaust piston with the center eccentric journal;
    a first pullrod with a first end of the first pullrod coupled to the first intake piston and a second end of the first pullrod coupled to the first outer eccentric journal via a first bearing cap;
    a second pullrod with a first end of the second pullrod coupled to the first intake piston and a second end of the second pullrod coupled to the second outer eccentric journal via a second bearing cap;
    a third pullrod with a first end of the third pullrod coupled to the second intake piston and a second end of the third pullrod coupled to the first outer eccentric journal via a third bearing cap; and a fourth pullrod with a first end of the fourth pullrod coupled to the second intake piston and a second end of the fourth pullrod coupled to the second outer eccentric journal via a fourth bearing cap wherein the eccentric journals are arranged on the crankshaft such that the exhaust pistons reach their extreme in travel before the intake pistons with a phase angle difference in the range of 5 to 25 crank angle degrees; and a center of gravity of the crankshaft is displaced from the axis of rotation of the crankshaft to counteract roughly half of an unbalanced inertia force that is generated by the phase angle difference between the intake and exhaust pistons.

9. The engine of claim 8 wherein the first, second, third, and fourth bearing caps each having three fingers; a pair of the fingers of the first bearing cap mesh with a finger of the third bearing cap; a pair of the fingers of the third bearing cap mesh with a finger of the first bearing cap; a pair of the fingers of the second bearing cap mesh with a finger of the fourth bearing cap; and a pair of the fingers of the fourth bearing cap mesh with a finger of the second bearing cap.

10. The engine of claim 8, further comprising: a plurality of intake ports defined in the first and second cylinders wherein the phase angle difference is in the range of 15-25 crank angle degrees in engine intakes in which flow is unimpeded by a valve proximate the intake ports.

11. The engine of claim 8, further comprising:
a first plurality of intake ports defined in the first and second cylinders at a first predetermined distance from an axis of rotation of the crankshaft;
a second plurality of intake ports defined in the first and second cylinders at a second predetermined distance from the axis of rotation of the crankshaft; and
normally-closed, unidirectional flow valves disposed upstream of the first plurality of intake ports wherein the unidirectional valves open when pressure on the upstream side of the unidirectional valves exceeds pressure on the downstream side of the unidirectional valves.

12. The engine of claim 11 wherein the phase angle difference is in the range of 5-15 crank angle degrees.

13. A method to couple pistons to a crankshaft of an opposed-piston, opposed-cylinder engine, the method comprising:
placing a first pushrod over a center eccentric journal of the crankshaft;
placing a second pushrod over a center eccentric journal of the crankshaft;
placing a first retainer over the center eccentric journal opposite the first pushrod; engaging the first retainer with a shoulder on the second pushrod;
placing a second retainer over the center eccentric journal opposite the second pushrod; and
engaging the second retainer with a shoulder on the first pushrod wherein the first pushrod is coupled to a first inner piston on an end of the first pushrod distal from the crankshaft and the second pushrod is coupled to a second inner piston an end of the second pushrod.

14. The method of claim 13, further comprising:
placing a first bearing cap over a first outer eccentric journal wherein the first bearing cap has first and second fingers extending away from a top of the first bearing cap and a third finger extending away from a bottom of the first bearing cap; and
meshing a second bearing cap with the first bearing cap, wherein the second bearing cap has first and second fingers extending away from the bottom of the second bearing cap and a third finger extending away from a top of the second bearing cap wherein the meshing comprises: the third finger of the first bearing cap sliding into a gap between the first and second fingers of the second bearing cap and the third finger of the second bearing cap sliding into a gap between the first and second fingers of the first bearing cap.

15. The method of claim 14, further comprising:
placing a third bearing cap over a second outer eccentric journal wherein the third bearing cap has first and second fingers extending away from a top of the third bearing cap and a third finger extending away from a bottom of the third bearing cap; and
meshing a fourth bearing cap with the third bearing cap, wherein the fourth bearing cap has first and second fingers extending away from the bottom of the fourth bearing cap and a third finger extending away from a top of the fourth bearing cap wherein the meshing comprises: the third finger of the third bearing cap sliding into a gap between the first and second fingers of the fourth bearing cap and the third finger of the third bearing cap sliding into a gap between the first and second fingers of the fourth bearing cap.

16. The method of claim 15, further comprising:
placing first and second portions of a pushrod bearing shell onto the center eccentric journal;
fastening the first and second pushrod bearing shell portions together;
placing first and second portions of a pullrod bearing shell onto the first outer eccentric journal;
placing third and fourth portions of a pullrod bearing shell onto the second outer eccentric journal;
wherein:
placing the pushrod bearing shell portions and fastening the first and second pushrod bearing shell portions precede placing first and second pushrods over the journal;
placing the pullrod bearing shell portions and fastening the pullrod bearing shell portions precede placing first and second pullrods over the journal; and
placing the pullrod bearing shell portions and fastening the third and fourth pullrod bearing shell portions precede placing third and fourth pullrods over the journal.

17. The method of claim 15, further comprising:
placing a first pullrod onto an outside surface of the second bearing cap wherein a first end of the first connecting rod is adapted to couple with a first outer piston; a first corner on a second end of the first pullrod has a single tab having an orifice; a second corner on a second end of the first pullrod has two tabs each having an orifice, the single tab meshing with the second and third fingers of the second bearing cap; the first finger of the second bearing cap meshing with the two tabs;
inserting a first pin through the orifice in the single tab of the first pullrod and the orifices in the second and third fingers of the first bearing cap;
inserting a second pin through the orifices in the two tabs of the first pullrod and the orifice in the first finger of the first bearing cap;
placing a second pullrod onto an outside surface of the first bearing cap wherein a first end of the second pullrod is adapted to couple with a reciprocating element; a first corner on a second end of the second pullrod has a single tab having an orifice; a second corner on a second end of the second pullrod has two tabs each having an orifice, the single tab meshing with the second and third fingers of the first bearing cap; the first finger of the first bearing cap meshing with the two tabs;

inserting a third pin through the orifice in the single tab of the second pullrod and the orifices in the second and third fingers of the second bearing cap; and inserting a fourth pin through the orifices in the two tab of the second pullrod and the orifice in the first finger of the second bearing cap.

18. The method of claim 17, further comprising:

installing a first snap ring proximate the first pin;

installing a second snap ring proximate the second pin;

installing a third snap ring proximate the third pin; and installing a fourth snap ring proximate the fourth pin.

\* \* \* \* \*